United States Patent [19]
Hoshi et al.

[11] Patent Number: 5,815,320
[45] Date of Patent: Sep. 29, 1998

[54] ZOOM LENS

[75] Inventors: Kouji Hoshi; Takeshi Koyama; Yoshinori Itoh; Makoto Misaka; Akihiro Nishio, all of Kanagawa-ken, Japan

[73] Assignee: Canon Kabushiki Kaisha, Tokyo, Japan

[21] Appl. No.: 799,403

[22] Filed: Feb. 12, 1997

Related U.S. Application Data

[63] Continuation of Ser. No. 177,603, Jan. 3, 1994, abandoned.

[30] Foreign Application Priority Data

| Jan. 14, 1993 | [JP] | Japan | 5-005021 |
| Jan. 14, 1993 | [JP] | Japan | 5-005023 |
| Jan. 25, 1993 | [JP] | Japan | 5-029922 |
| Feb. 24, 1993 | [JP] | Japan | 5-035559 |
| Feb. 25, 1993 | [JP] | Japan | 5-036588 |

[51] Int. Cl.$^6$ .................................................. G02B 15/14
[52] U.S. Cl. .......................... 359/686; 359/683; 359/684
[58] Field of Search ..................... 359/683, 684, 359/686

[56] References Cited

U.S. PATENT DOCUMENTS

| 3,367,734 | 2/1968 | Bystricky et al. | 359/686 |
| 3,653,749 | 4/1972 | Kawazu | 359/686 |
| 5,002,373 | 3/1991 | Yamanashi | 359/684 |

FOREIGN PATENT DOCUMENTS

| 56-128911 | 10/1981 | Japan . |
| 57-201213 | 12/1982 | Japan . |
| 6055314 | 3/1985 | Japan . |
| 60-263113 | 12/1985 | Japan . |
| 6150112 | 3/1986 | Japan . |
| 350516 | 3/1991 | Japan . |
| 388508 | 4/1991 | Japan . |
| 388509 | 4/1991 | Japan . |
| 3249614 | 11/1991 | Japan . |
| 416764 | 1/1992 | Japan . |
| 467114 | 3/1992 | Japan . |

*Primary Examiner*—Scott J. Sugarman
*Attorney, Agent, or Firm*—Fitzpatrick, Cella, Harper & Scinto

[57] ABSTRACT

A zoom lens is disclosed comprising, from front to rear, a first lens unit having a positive refractive power, a second lens unit having a positive or negative refractive power, a third lens unit having a positive refractive power, and a fourth lens unit having a negative refractive power, wherein rules of design are set forth in order to minimize the bulk and size of the lens system.

35 Claims, 56 Drawing Sheets

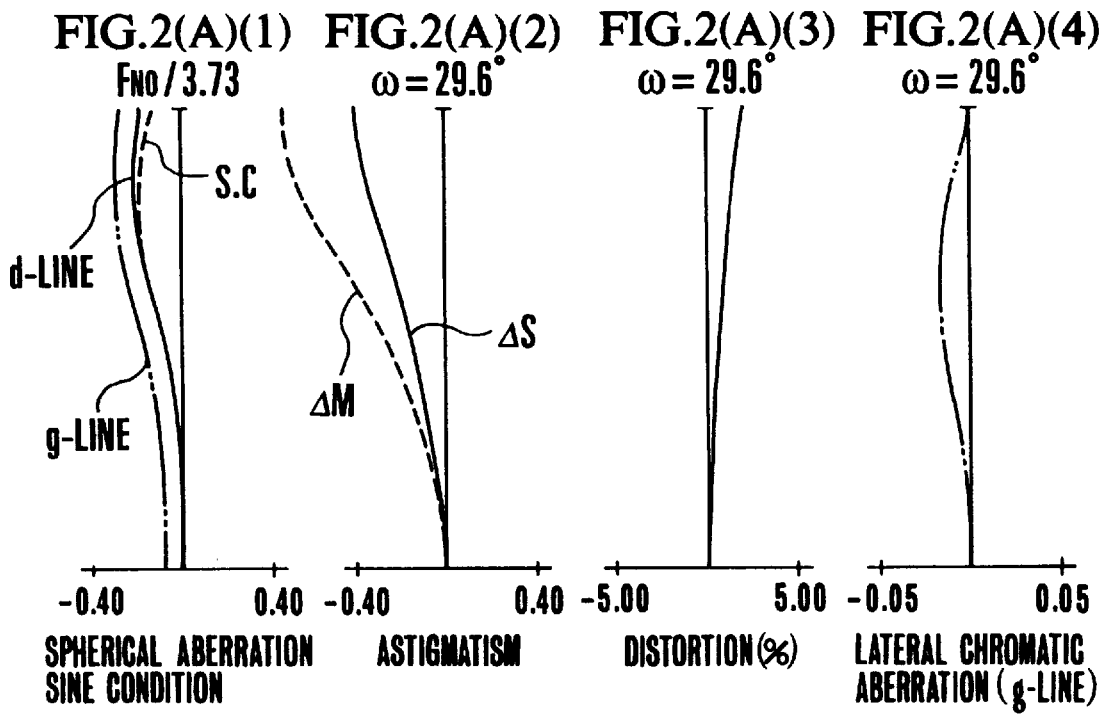
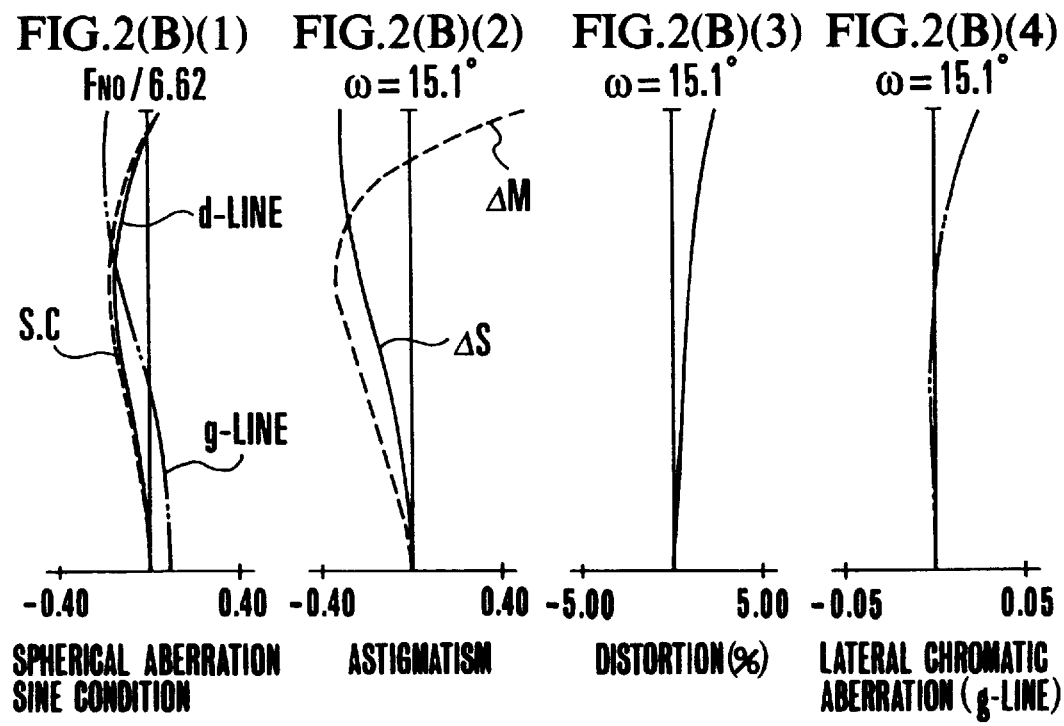

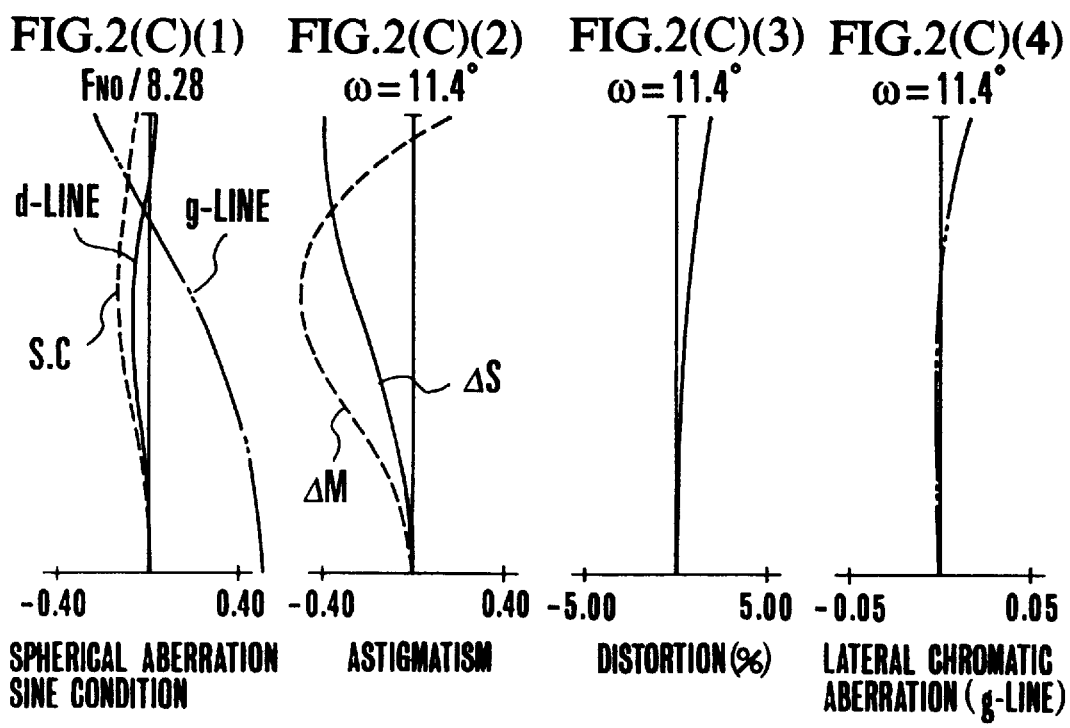

W

T

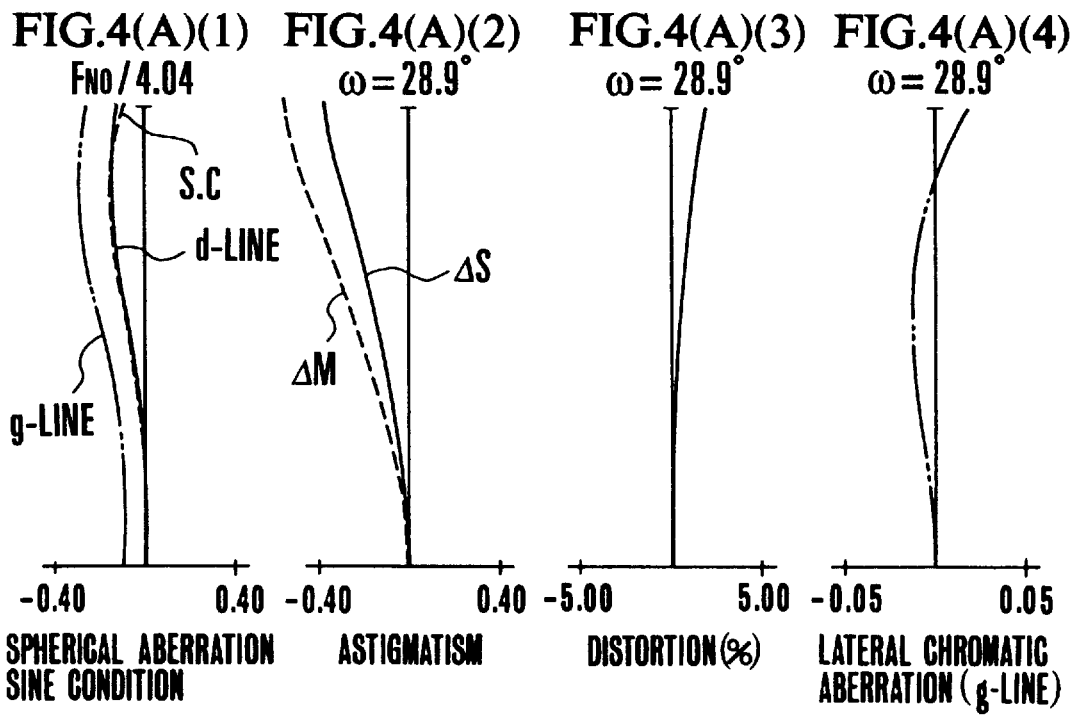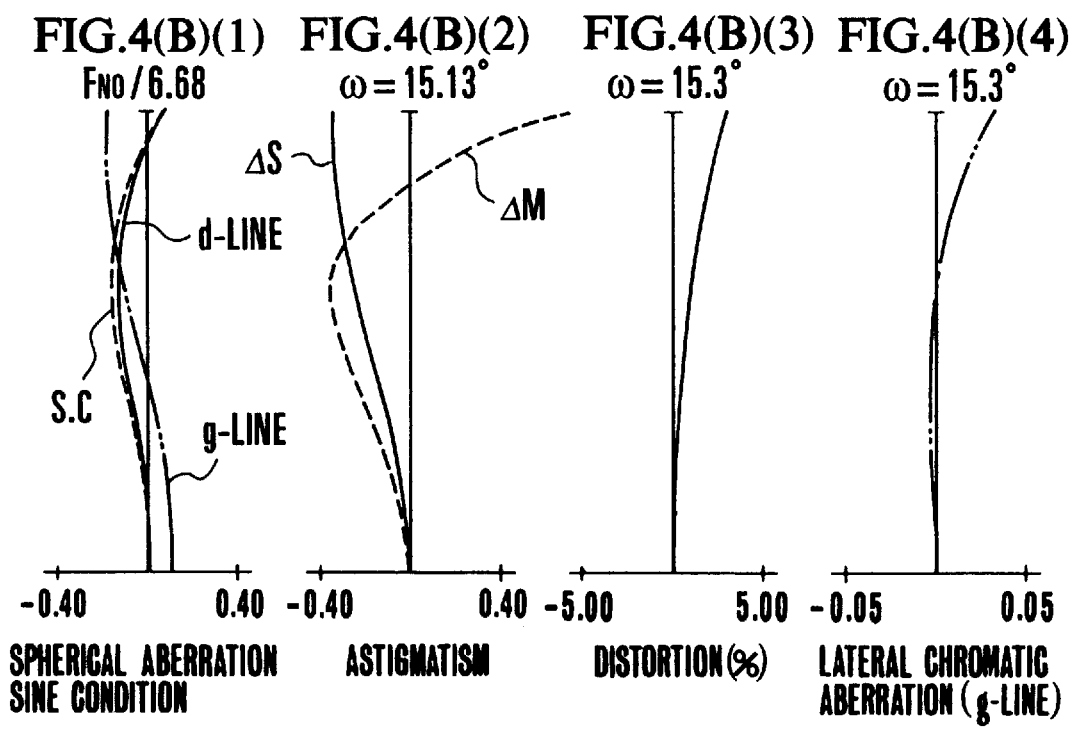

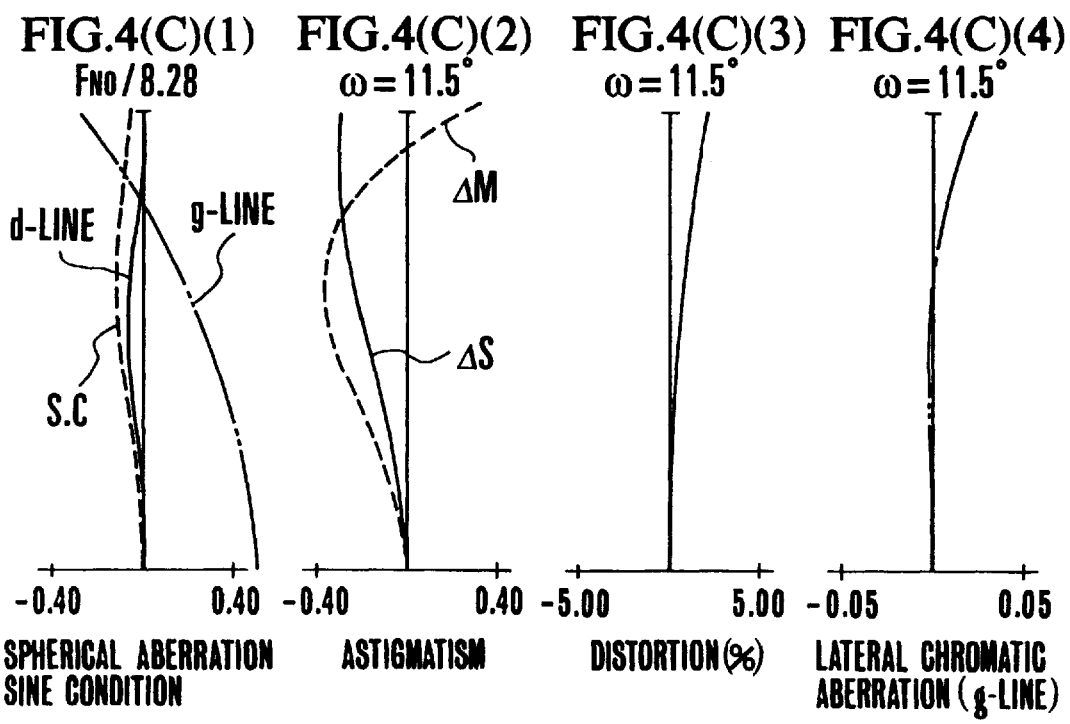

W

T

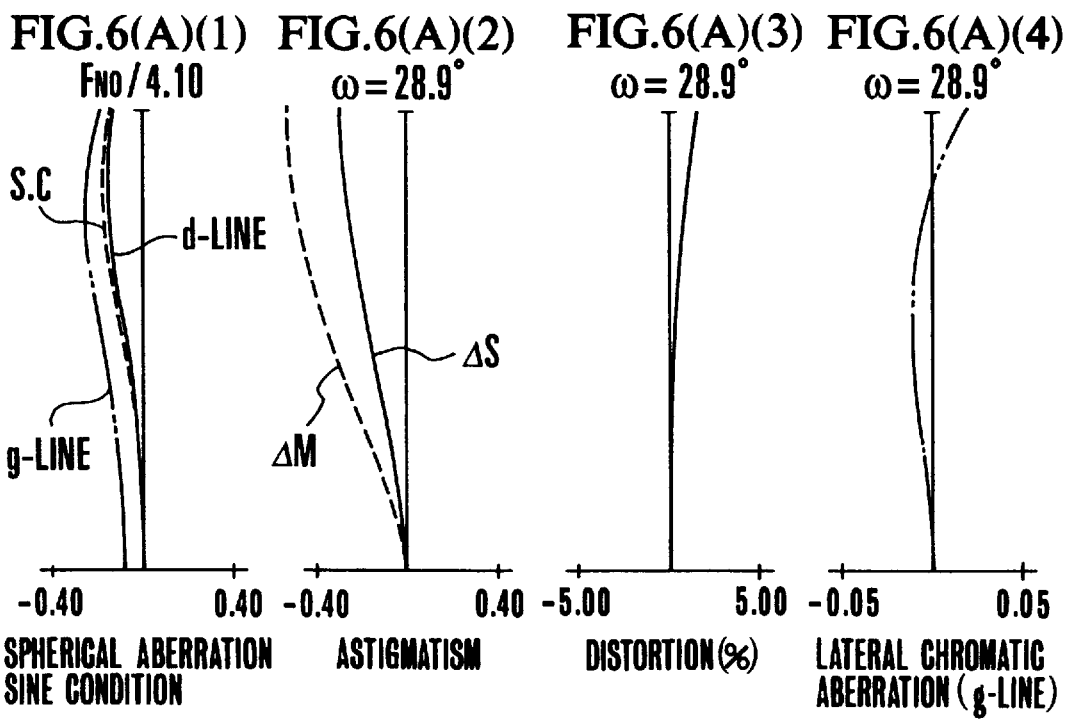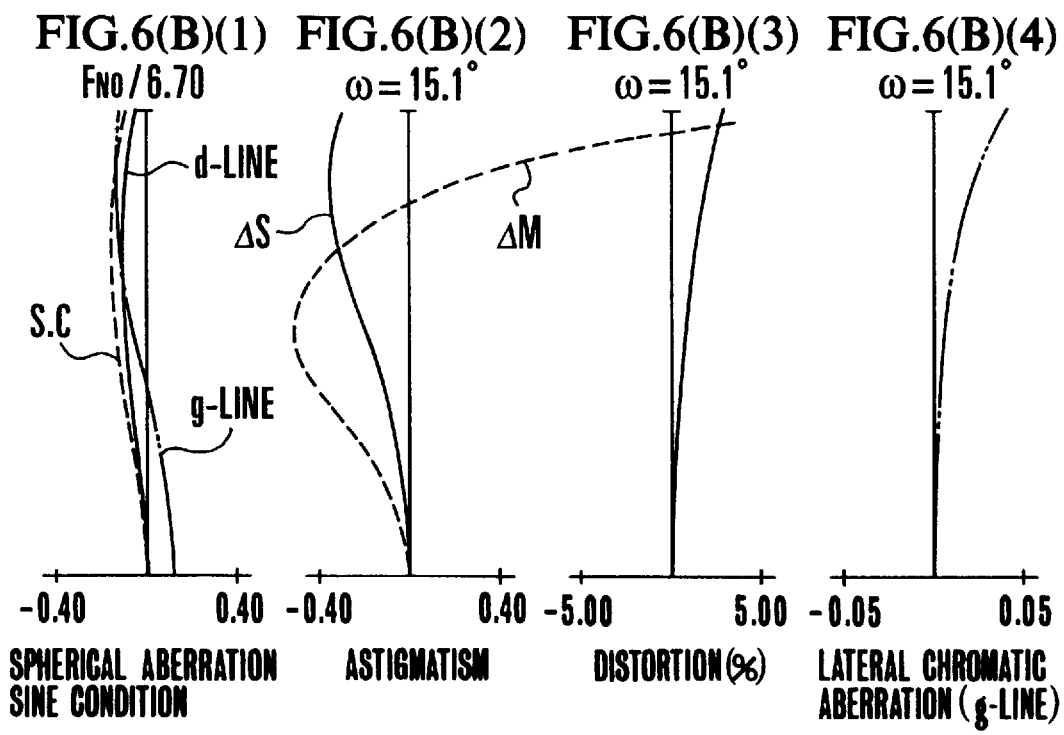

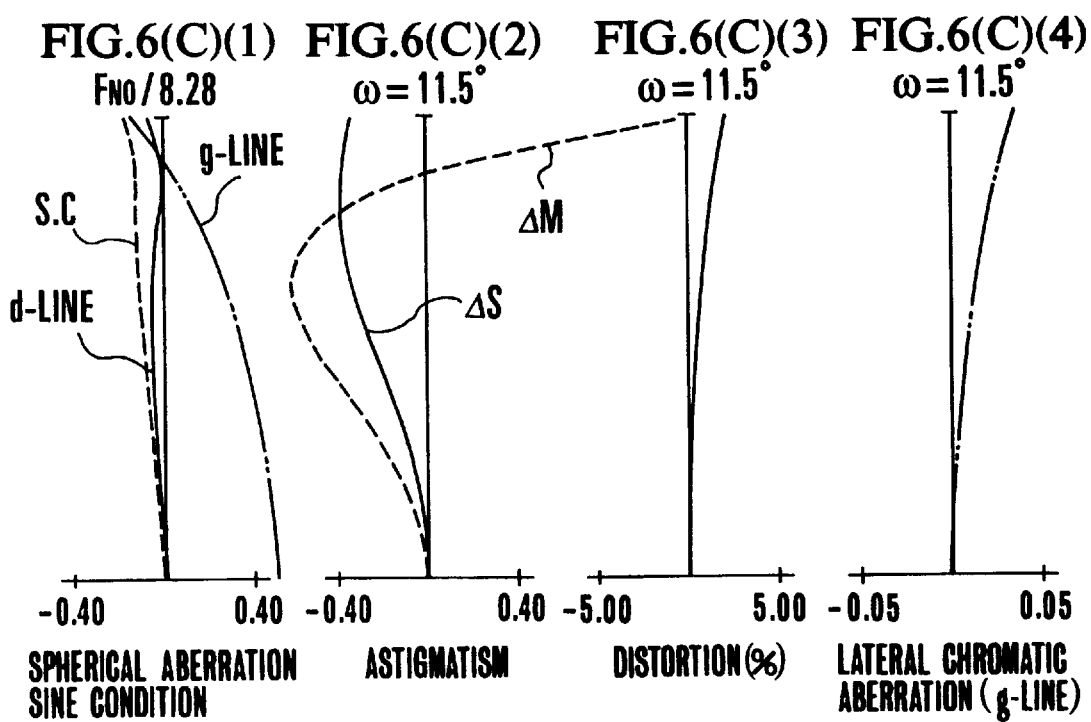

F I G. 7(A)
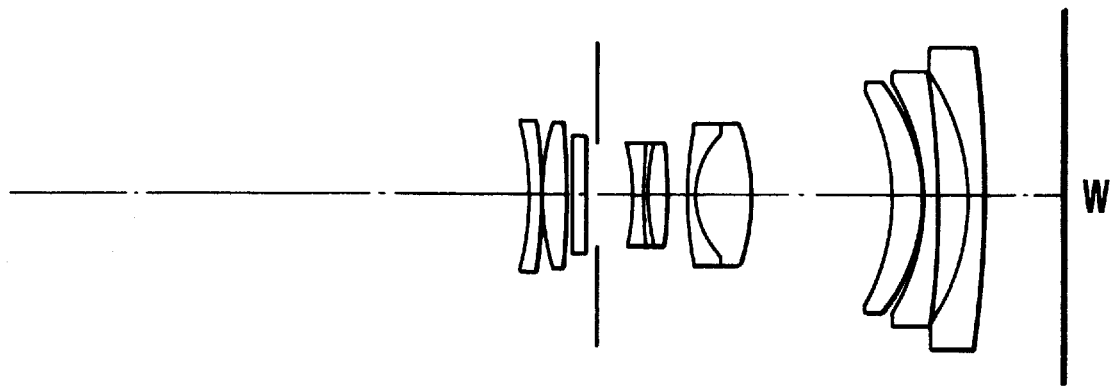
F I G. 7(B)
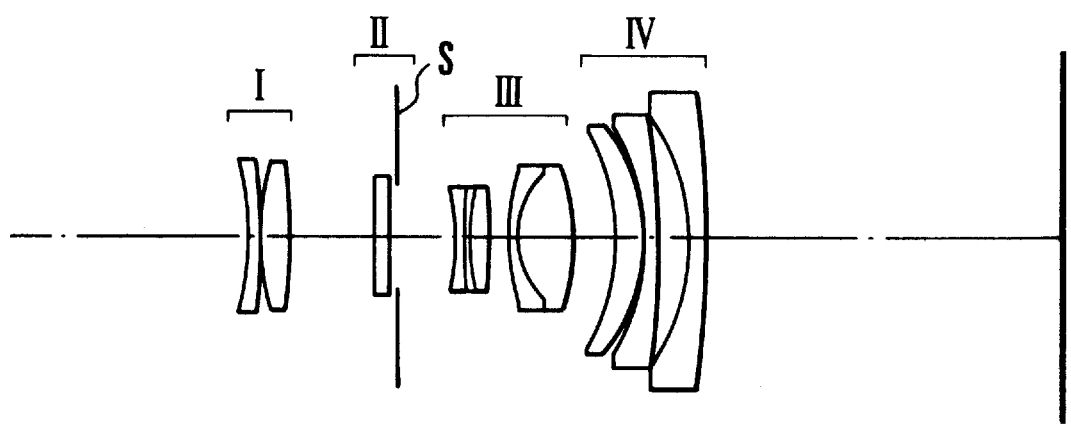
F I G. 7(C)
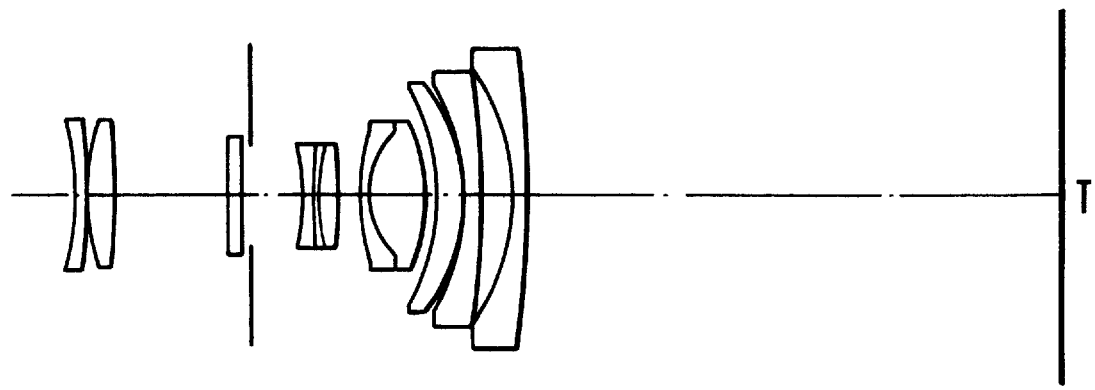

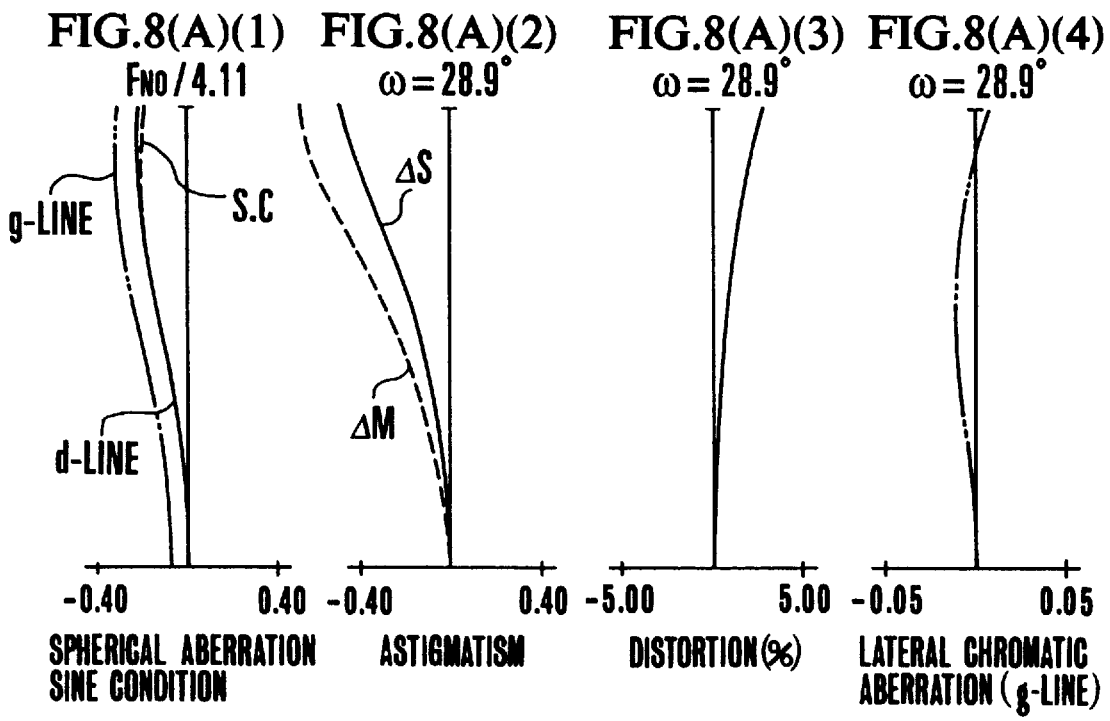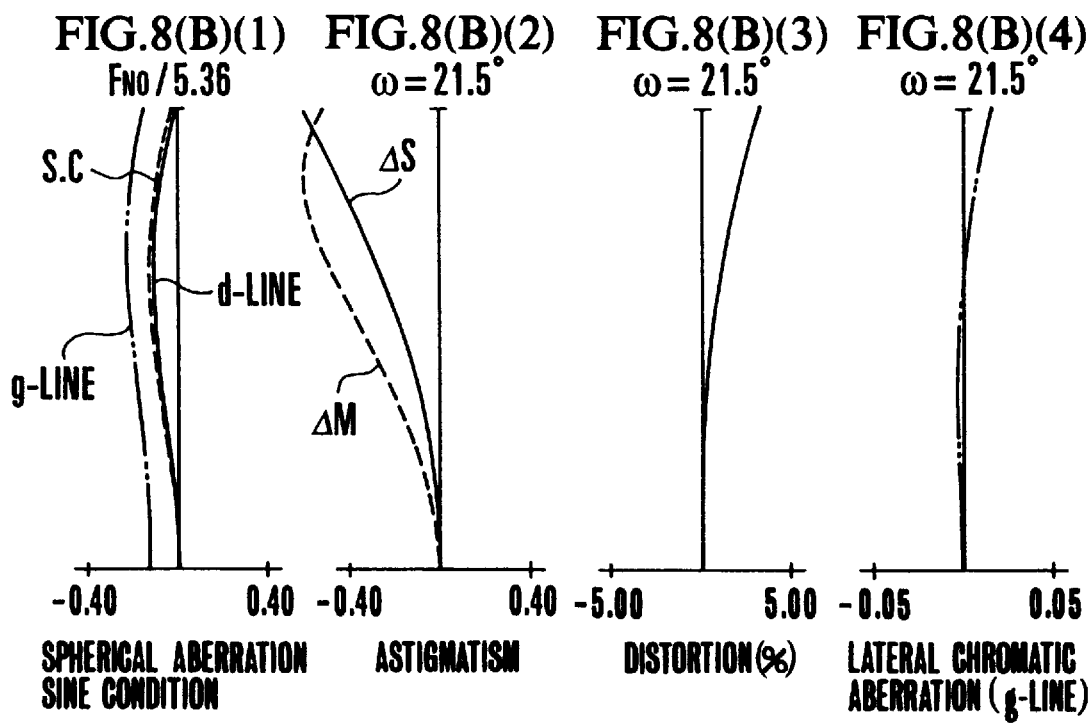

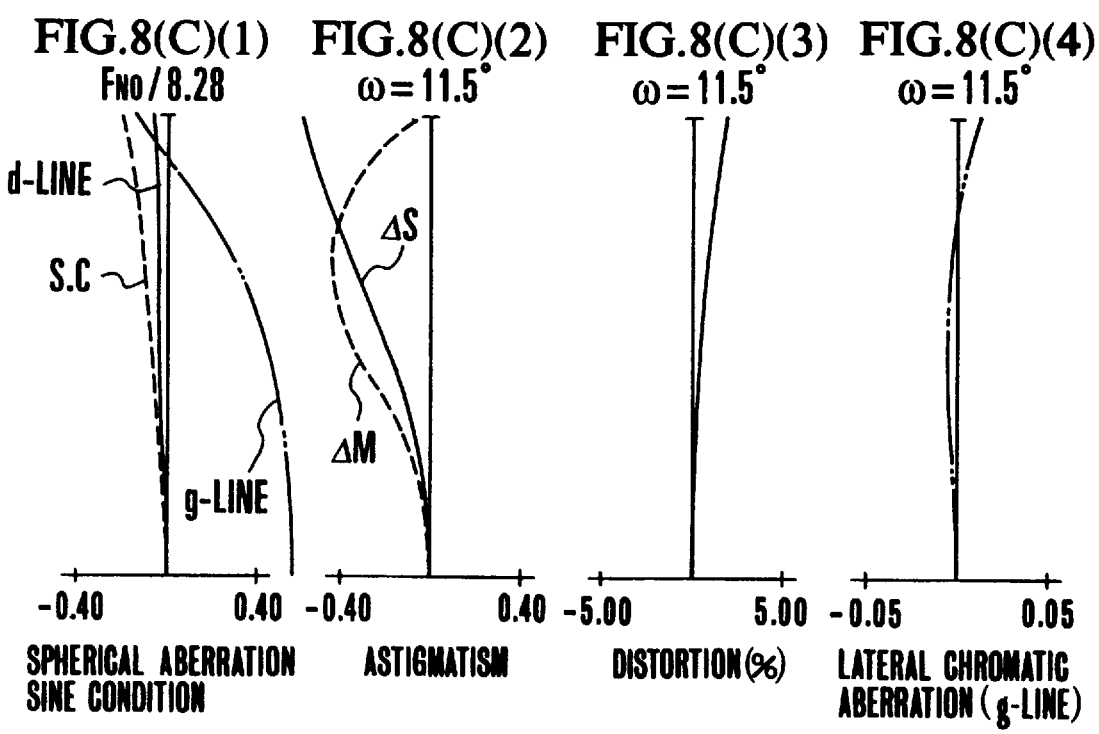

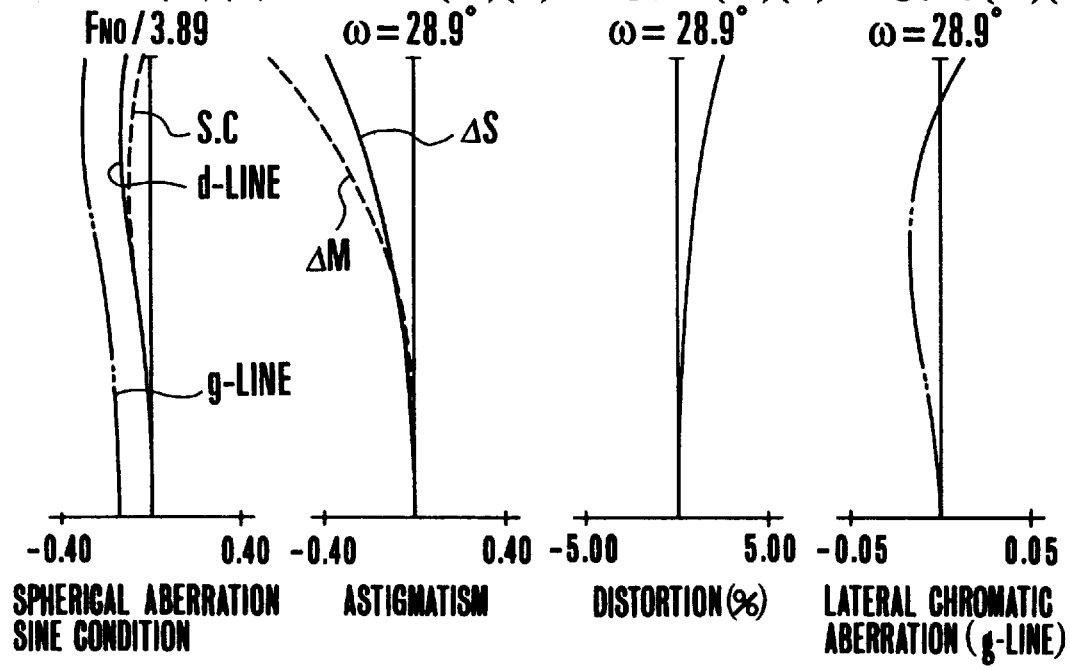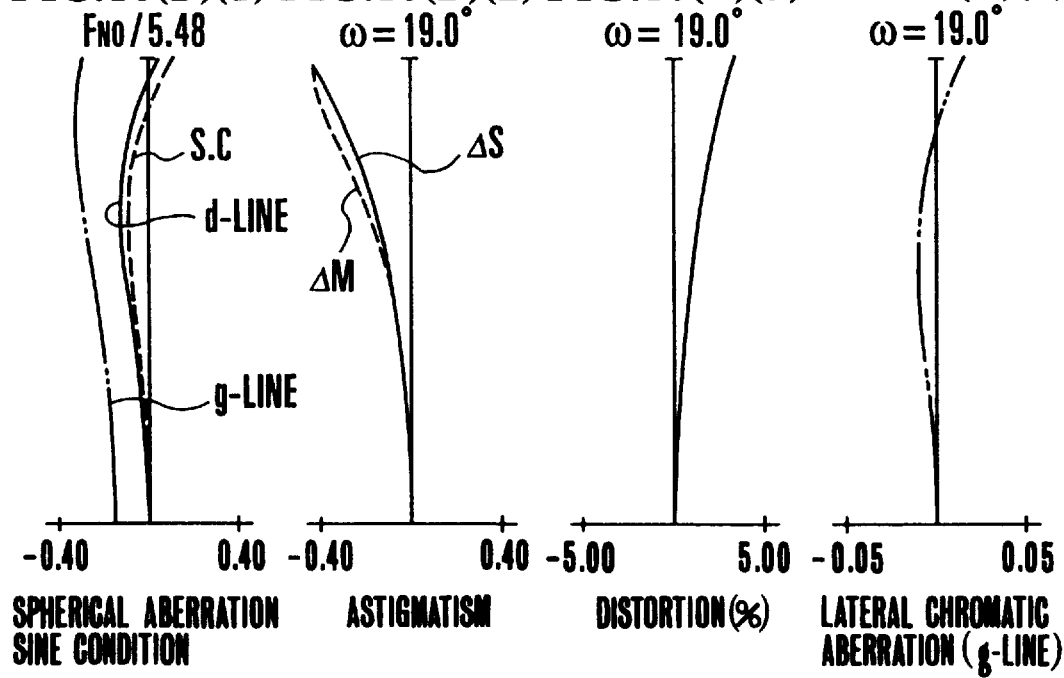

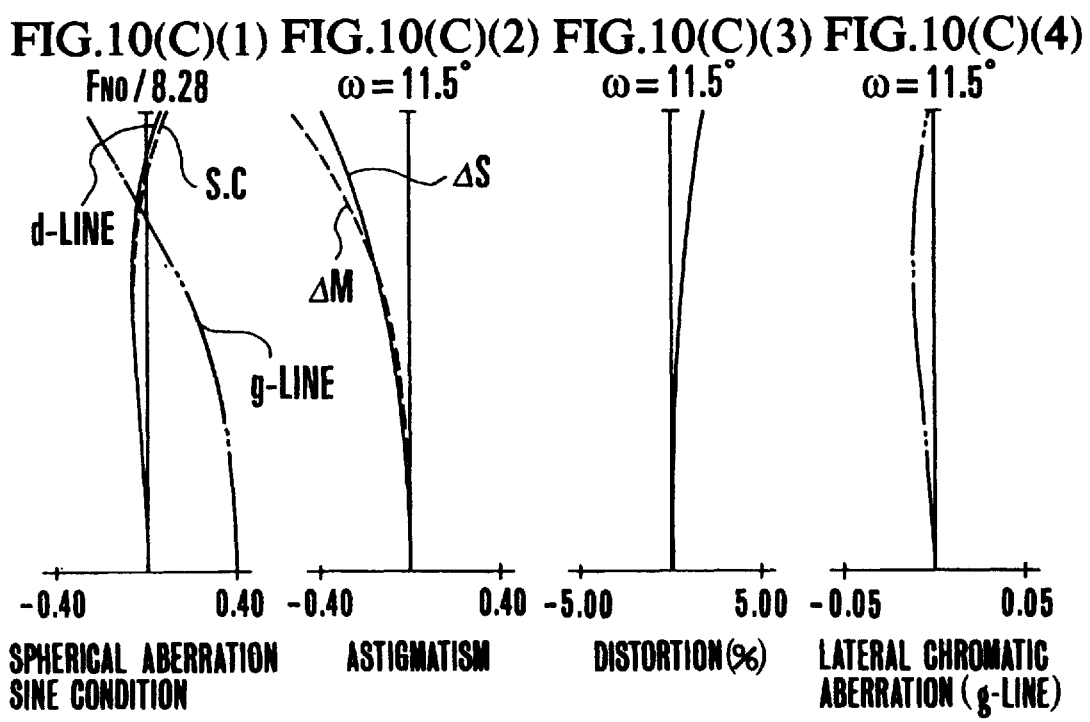

W

T

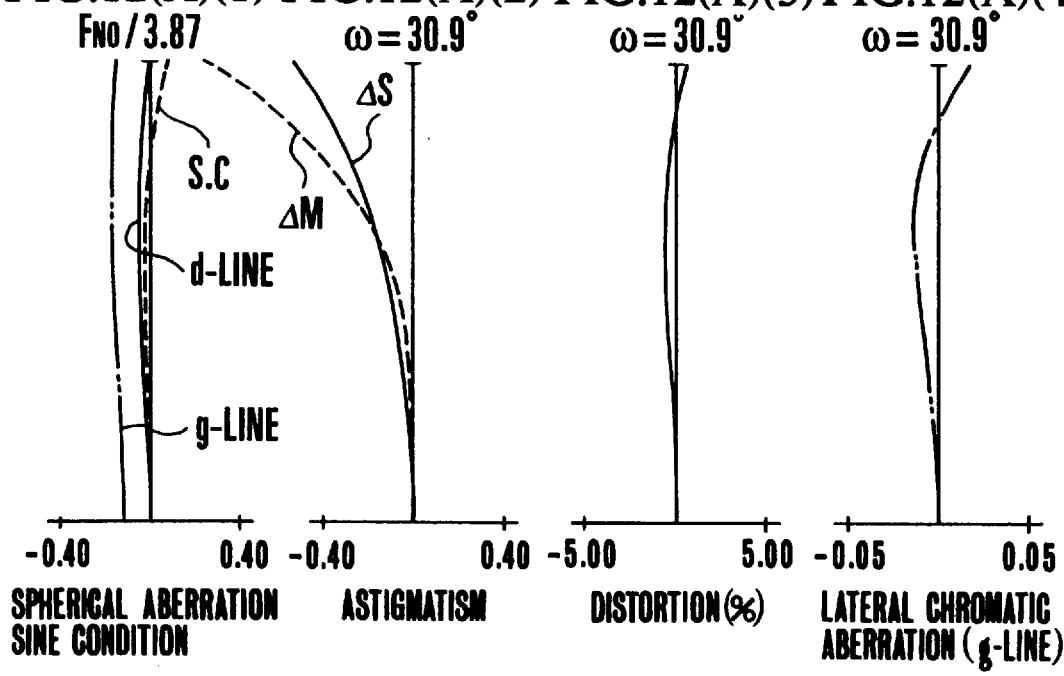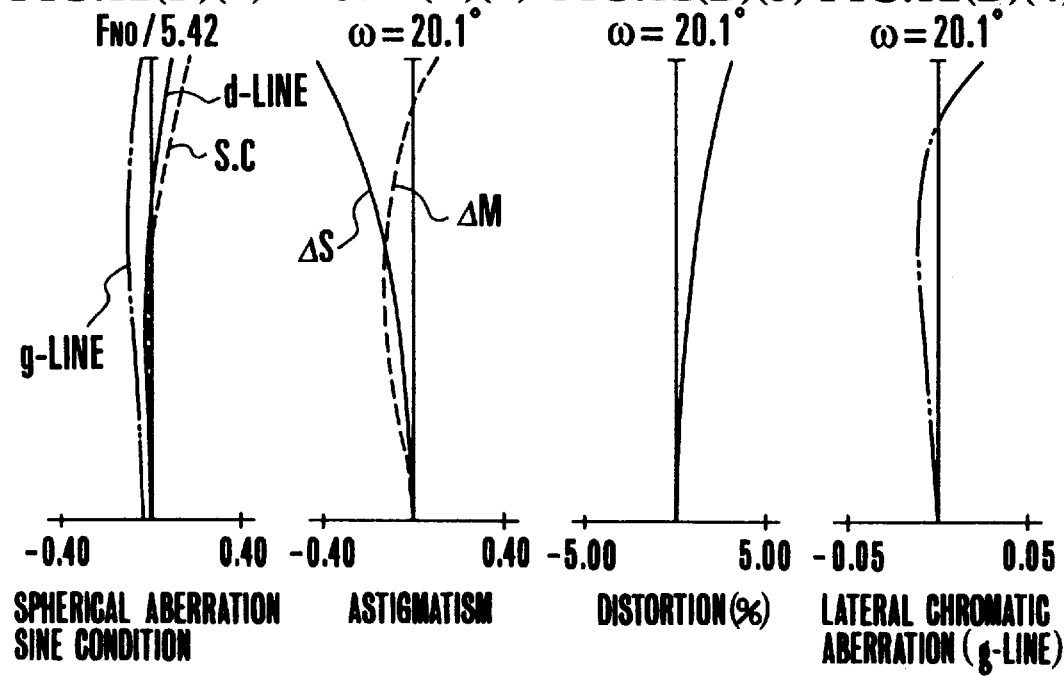

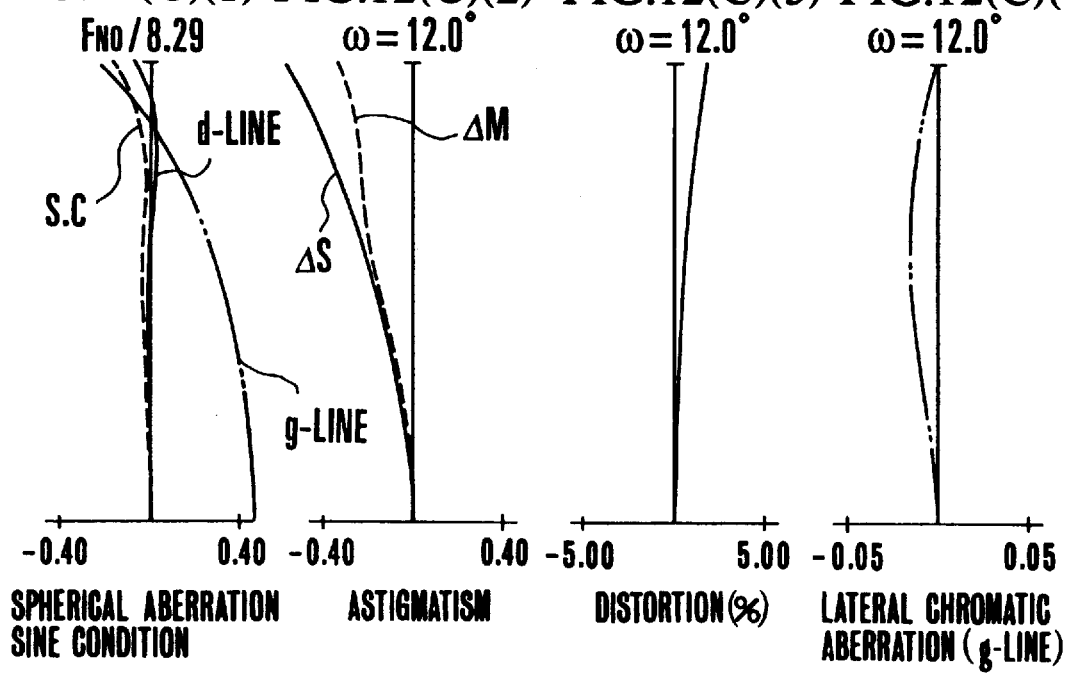

W

T

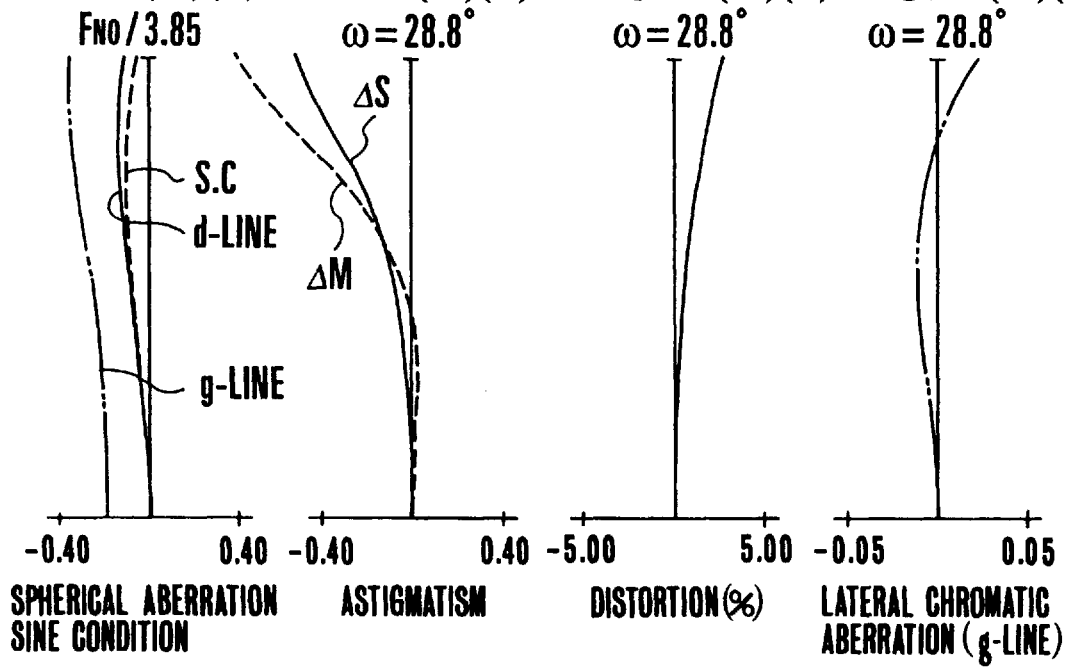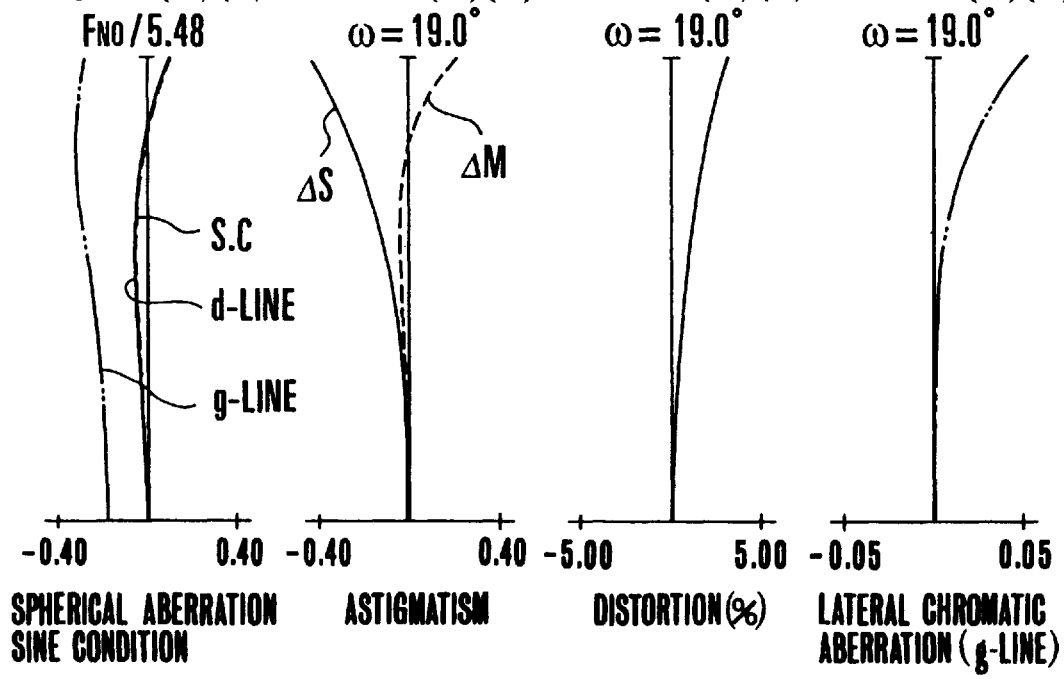

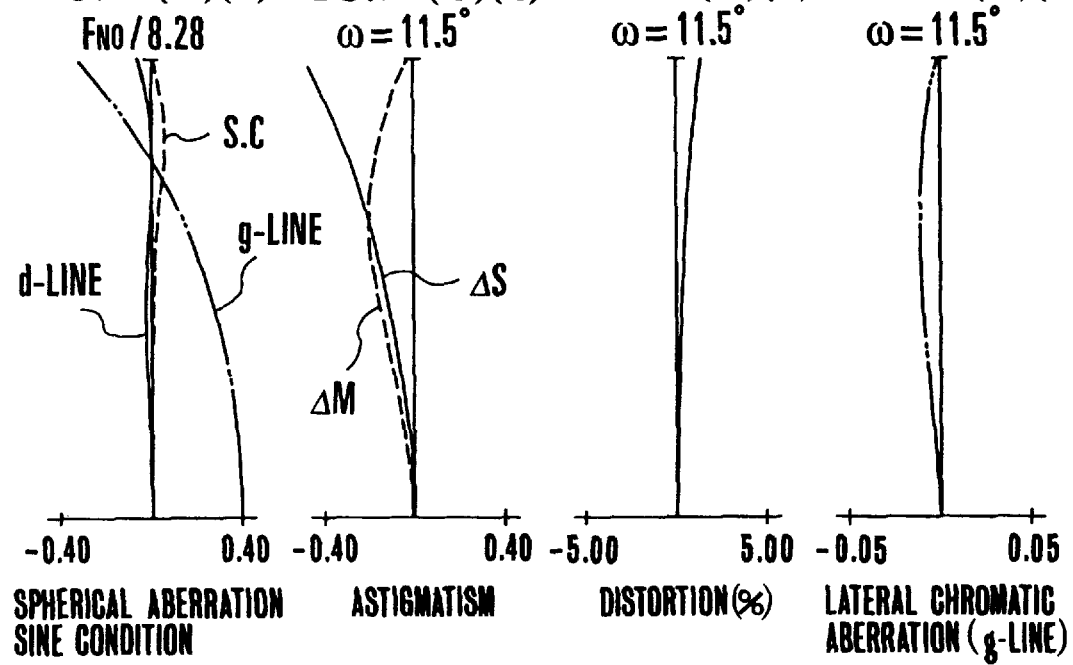

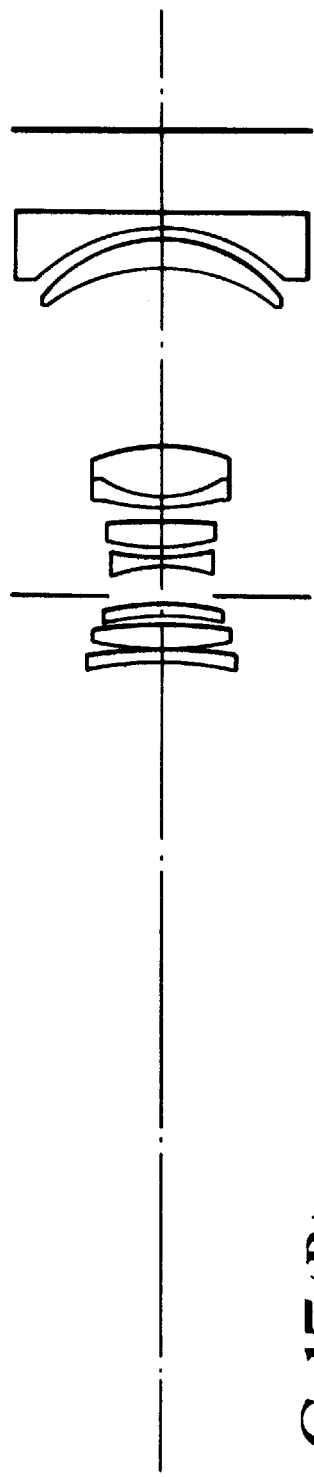
F I G.15(A)
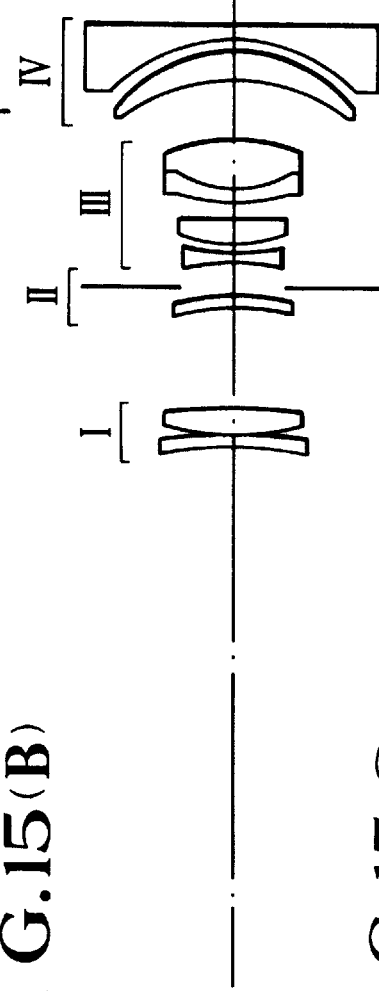
F I G.15(B)
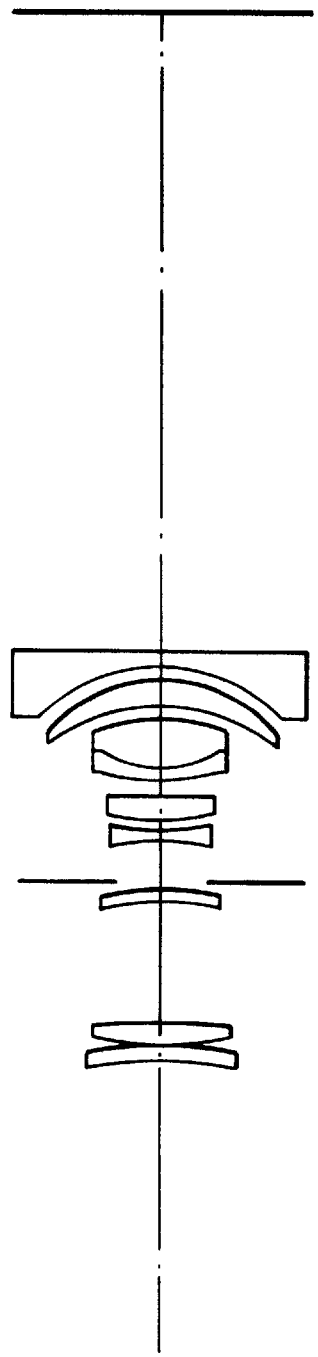
F I G.15(C)

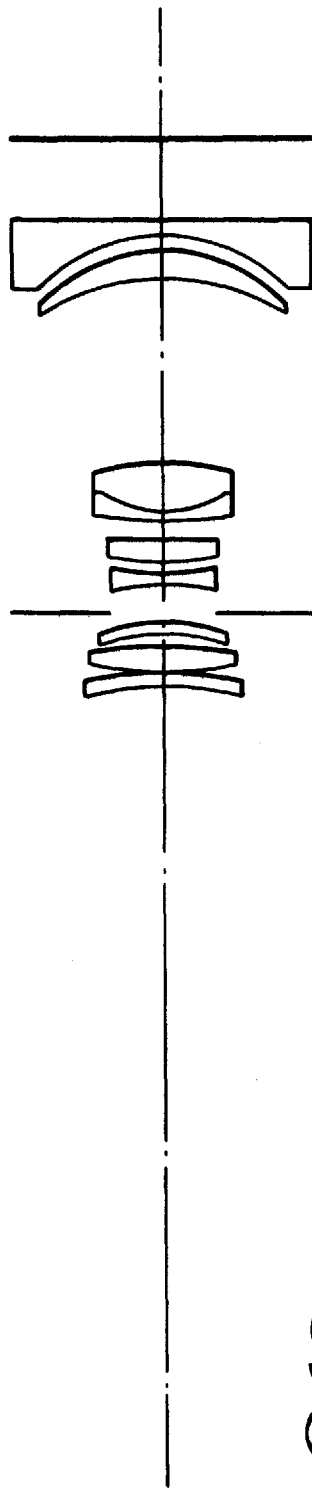
F I G.16(A)
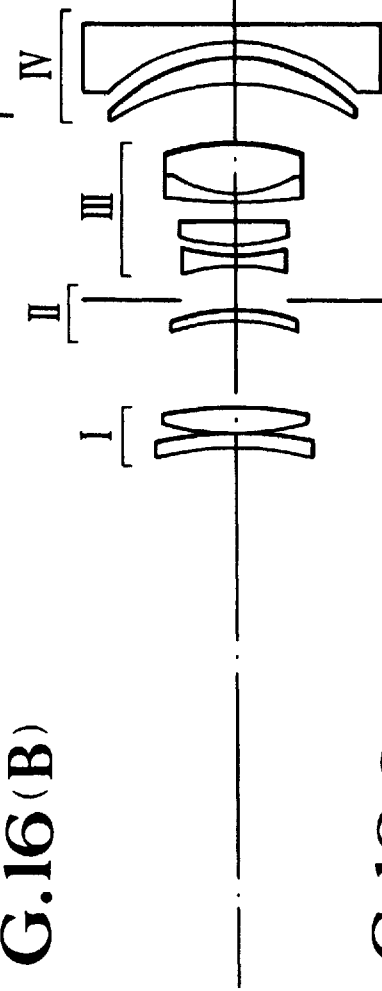
F I G.16(B)
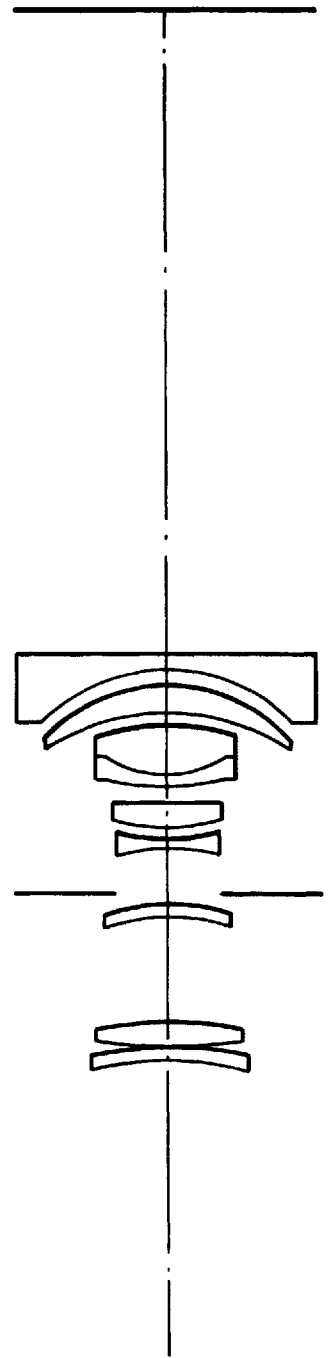
F I G.16(C)

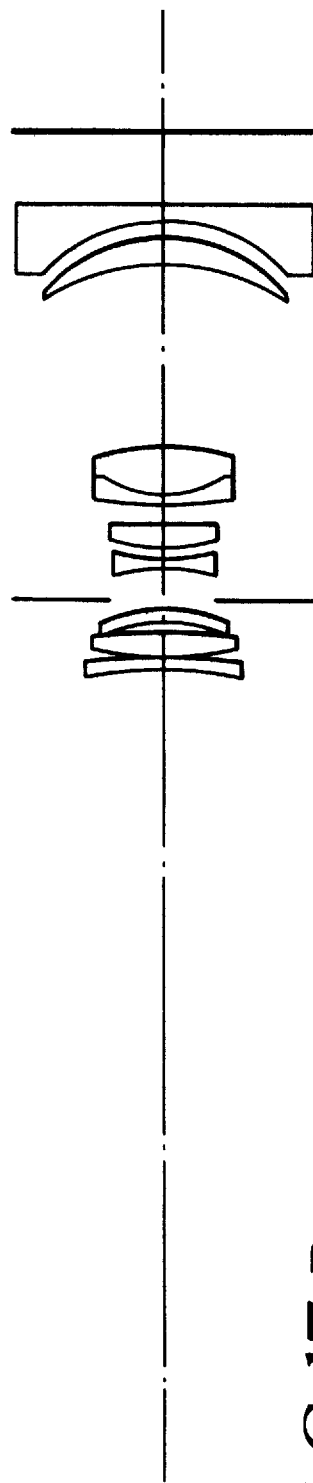
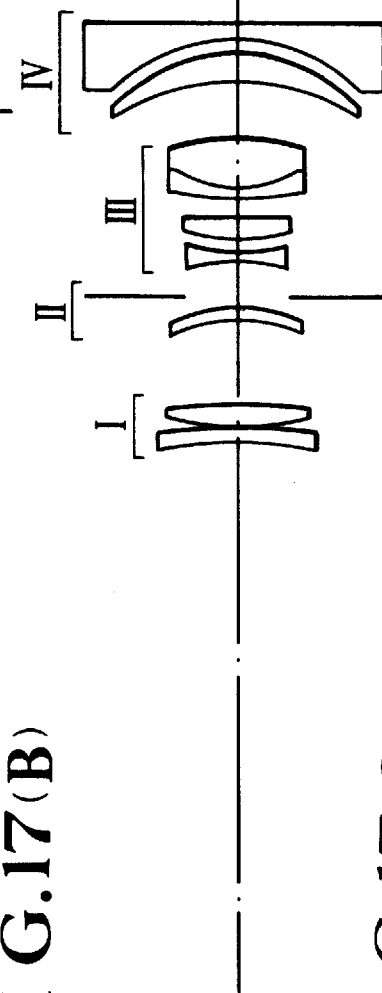
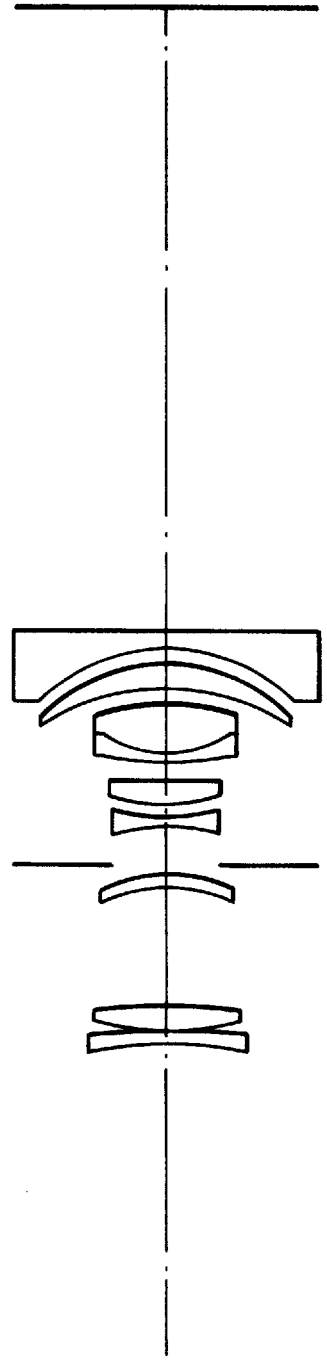
F I G. 17(A)　　F I G. 17(B)　　F I G. 17(C)

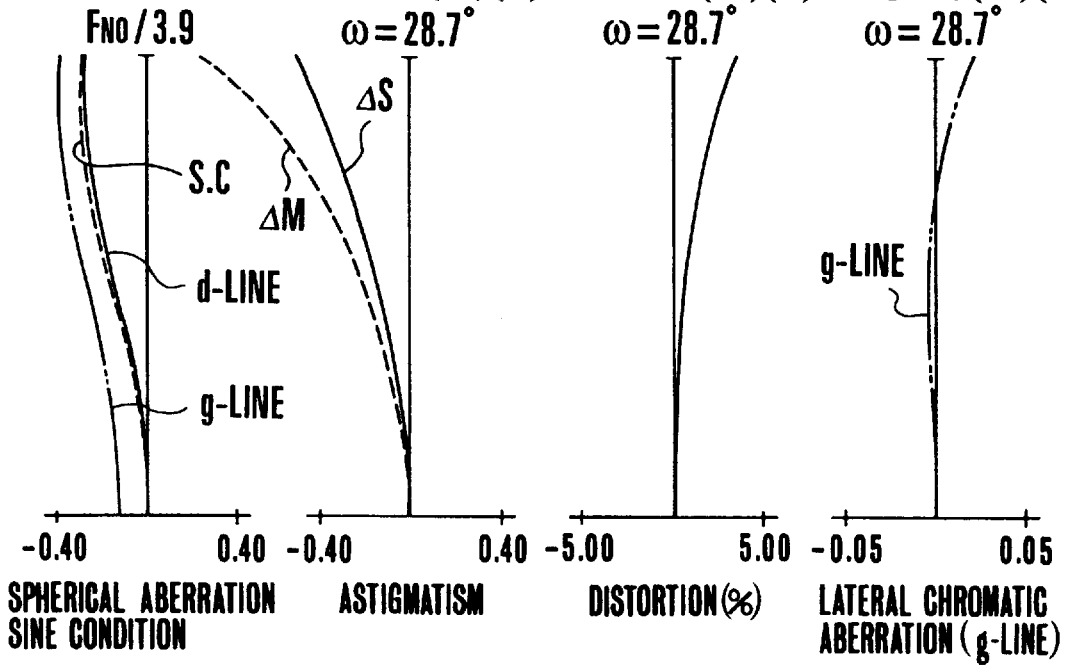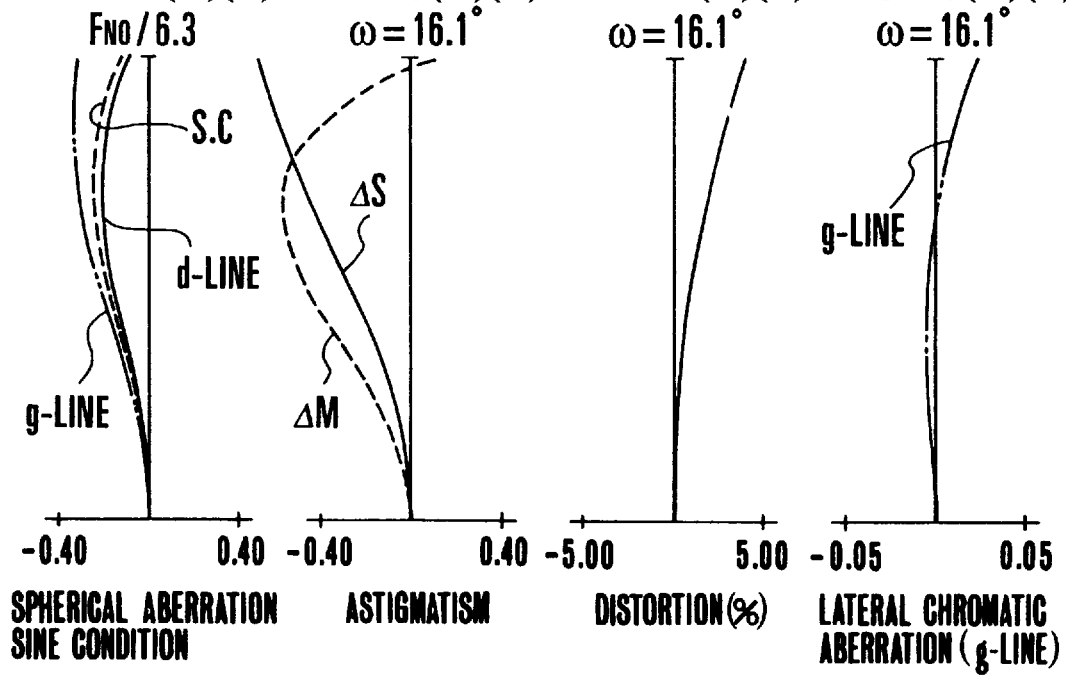

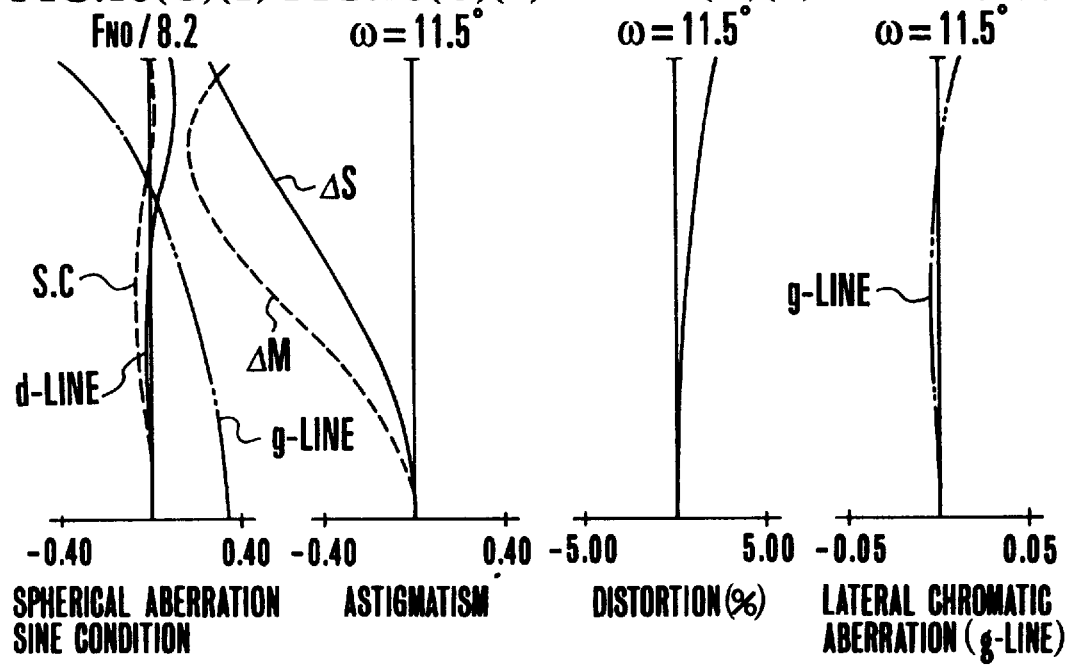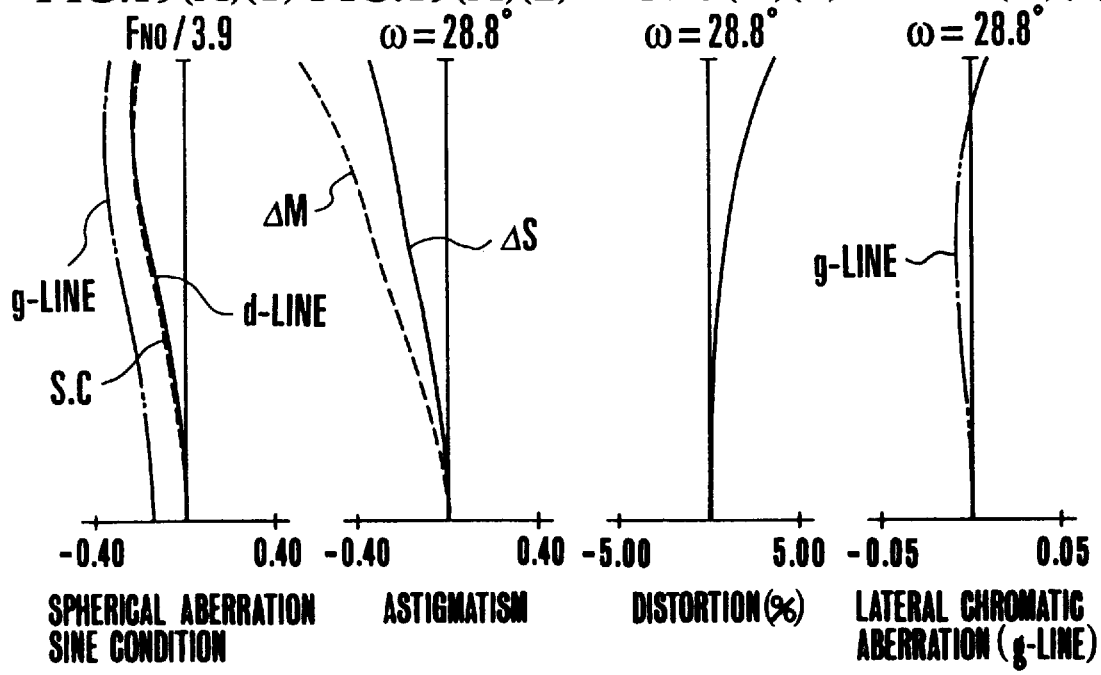

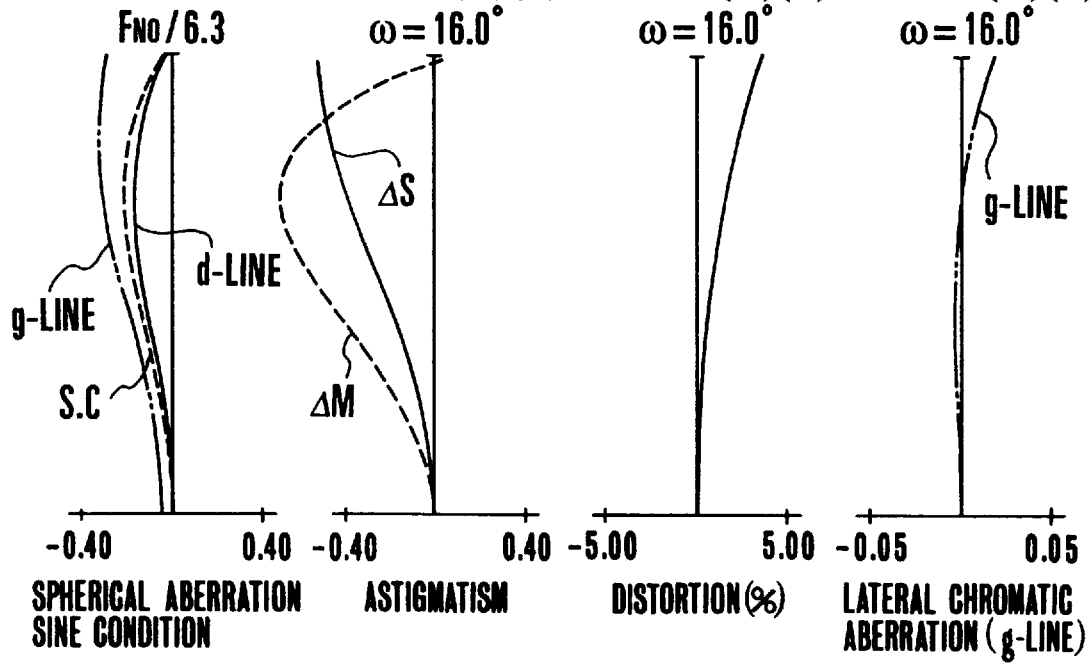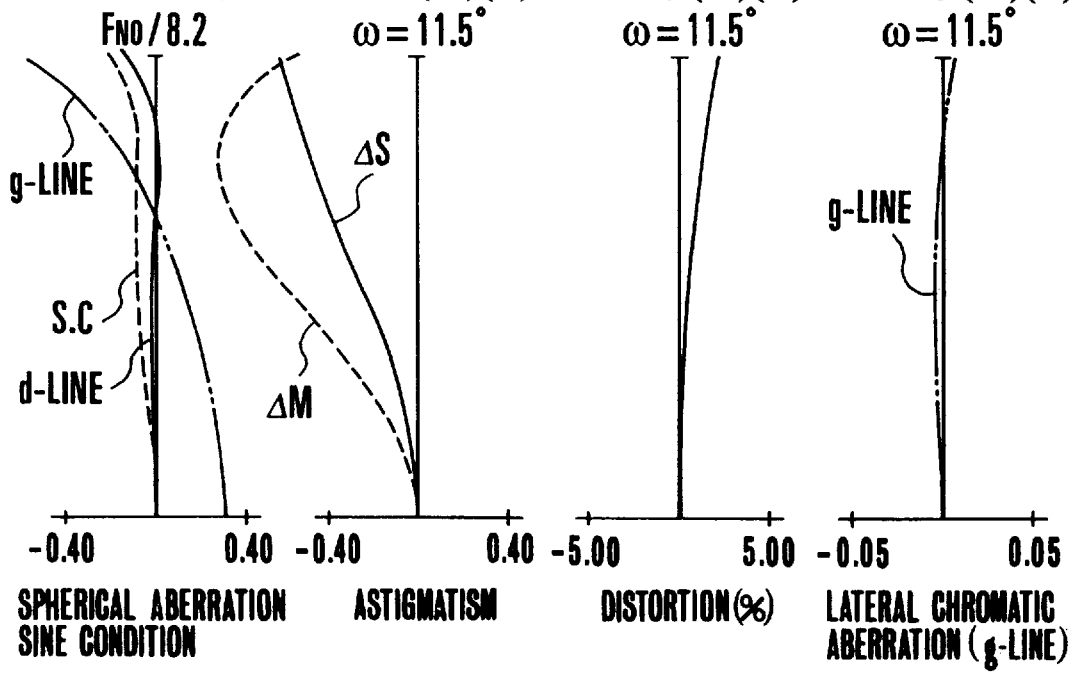

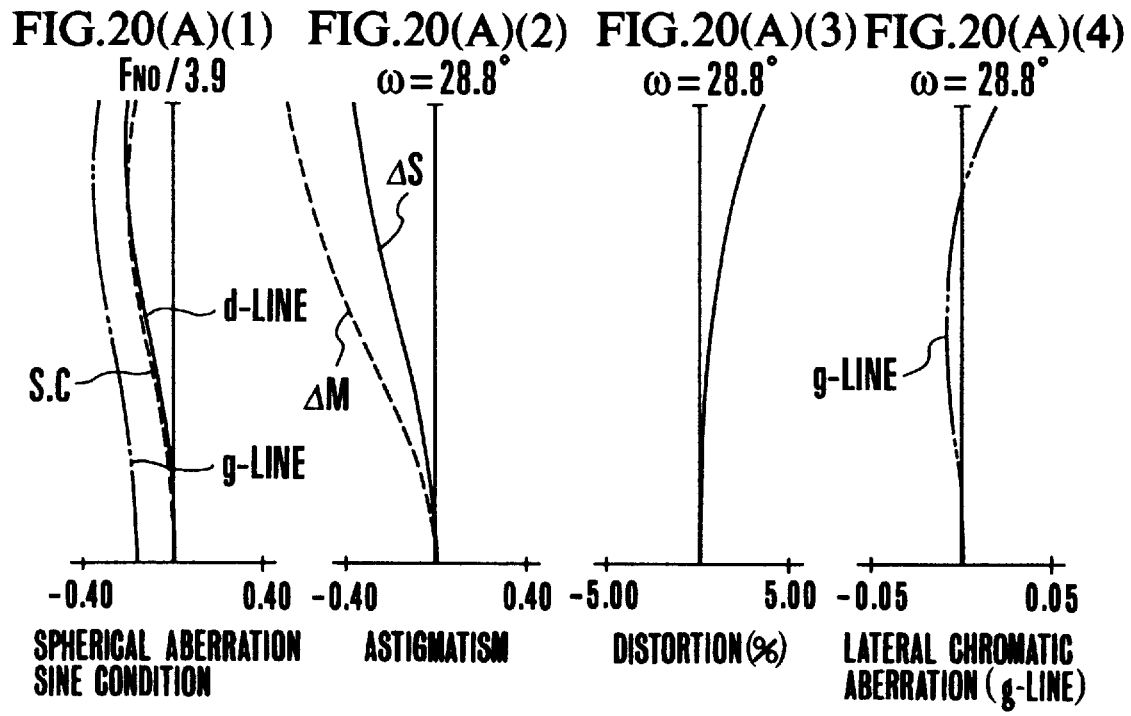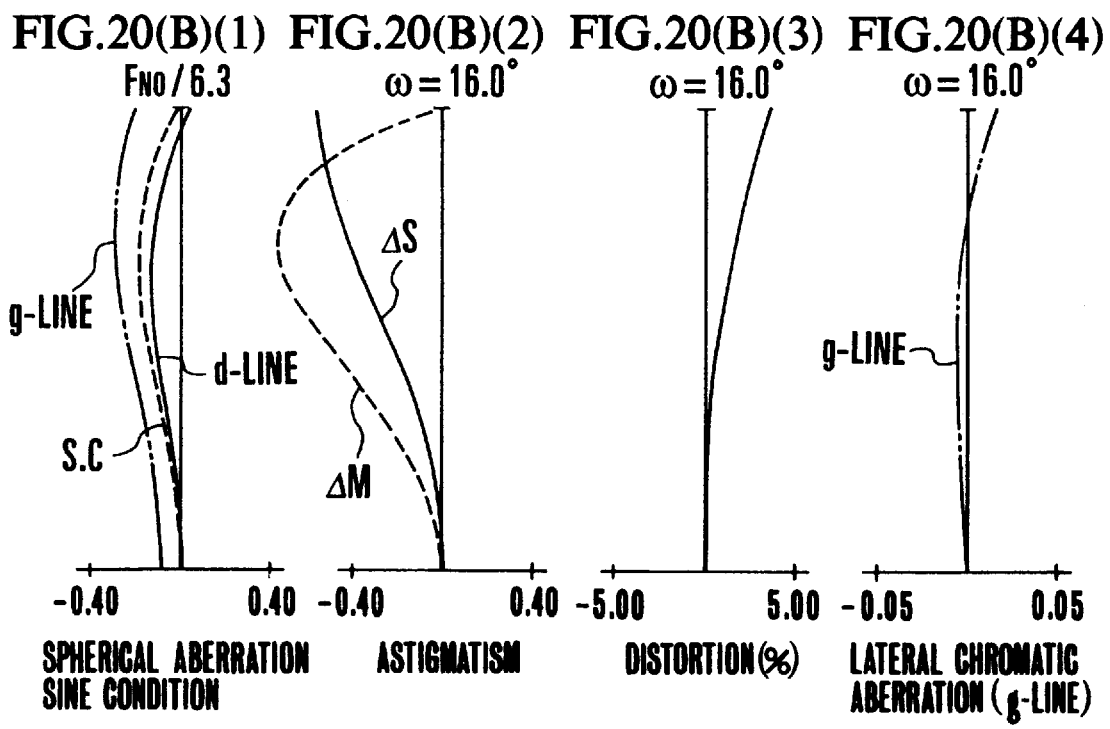

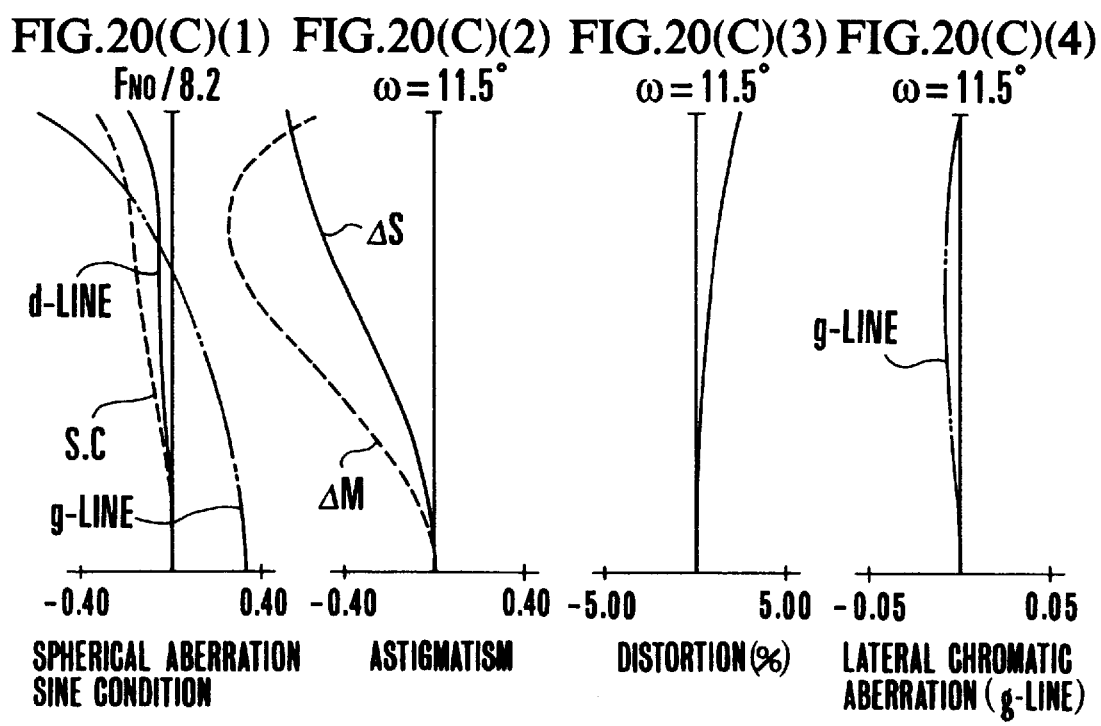

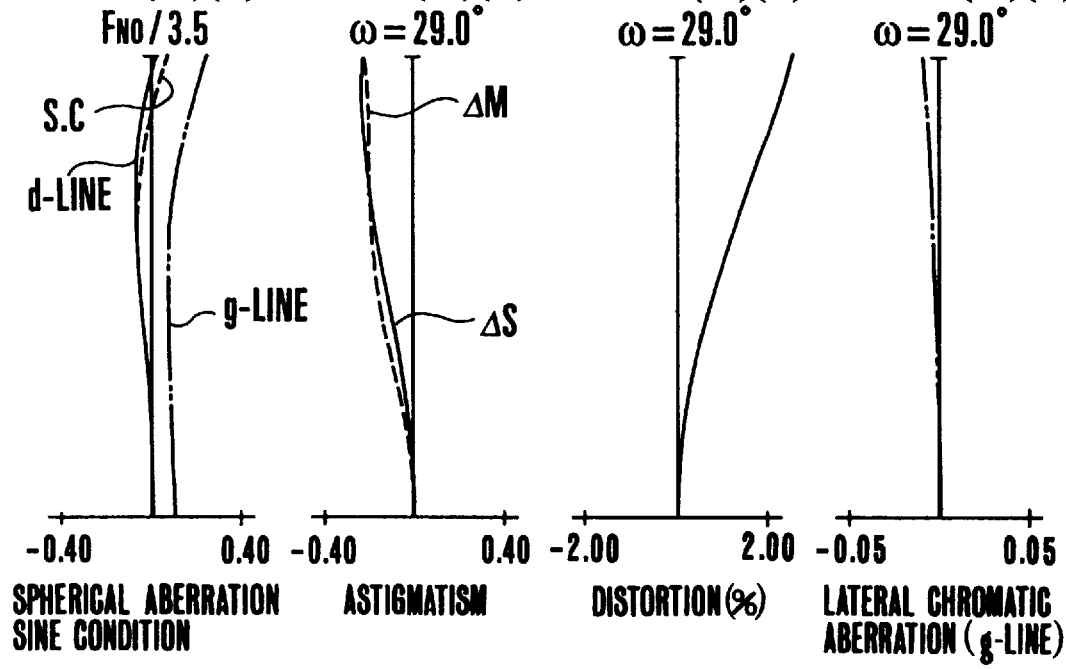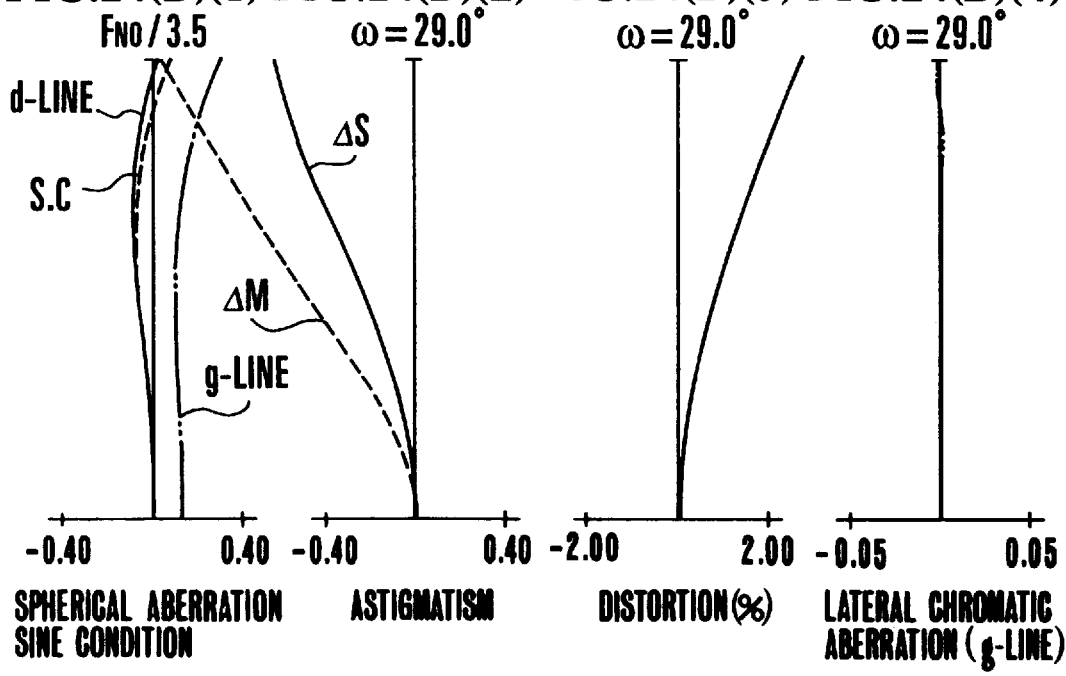

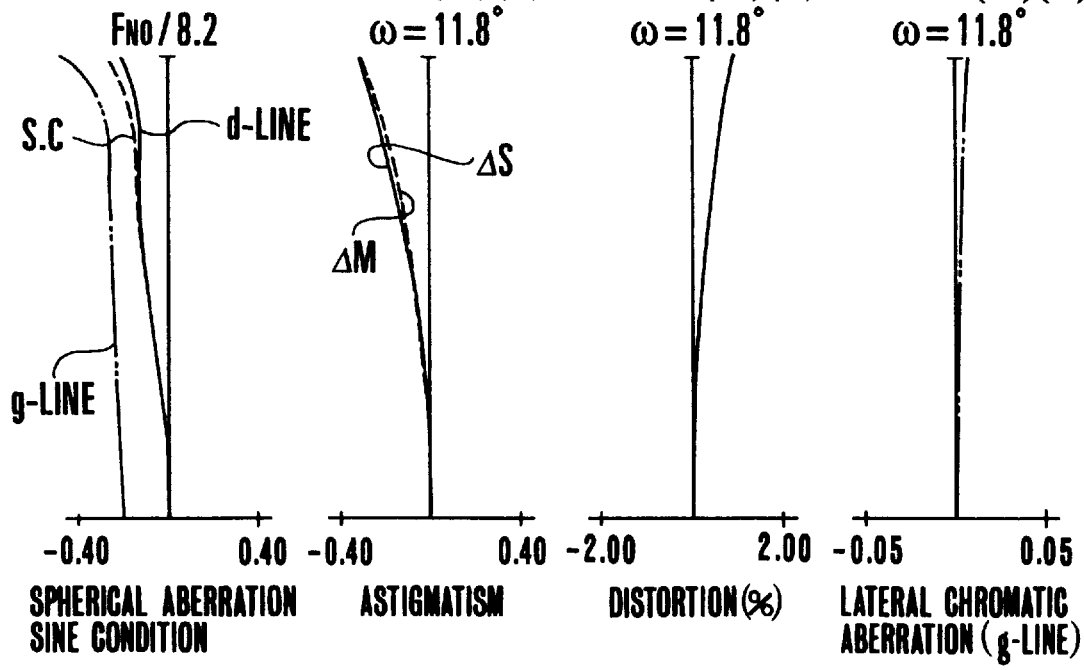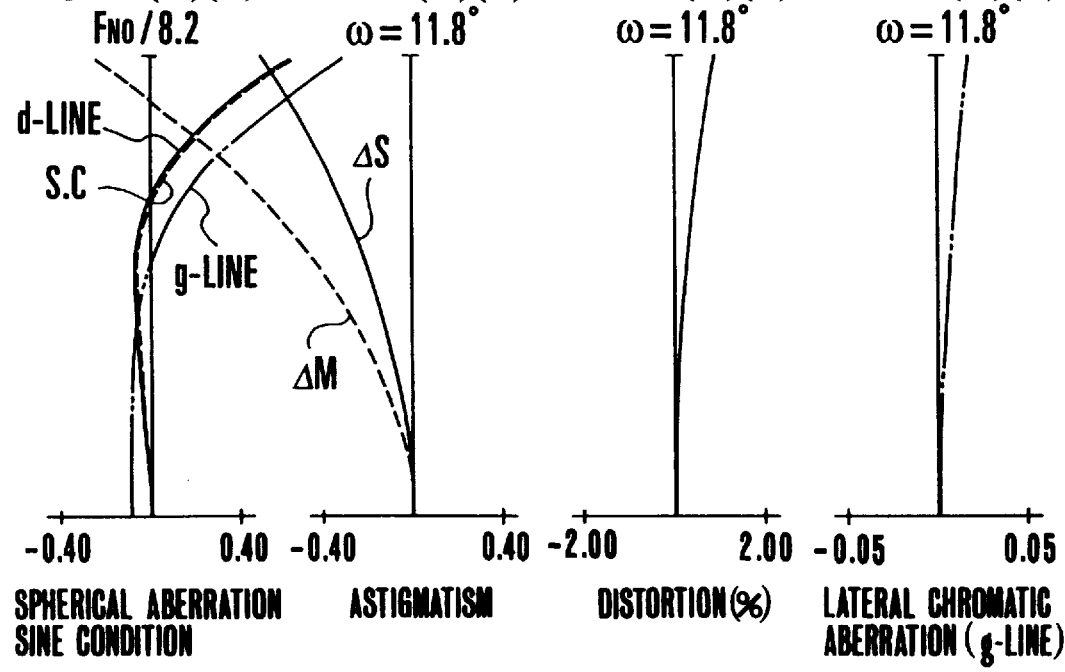

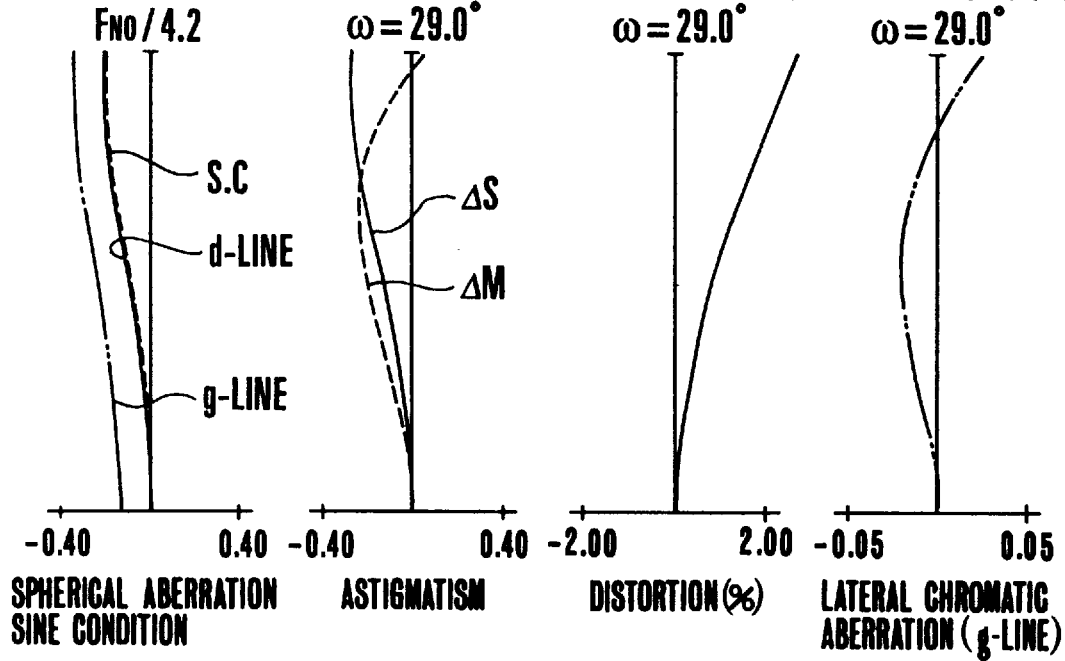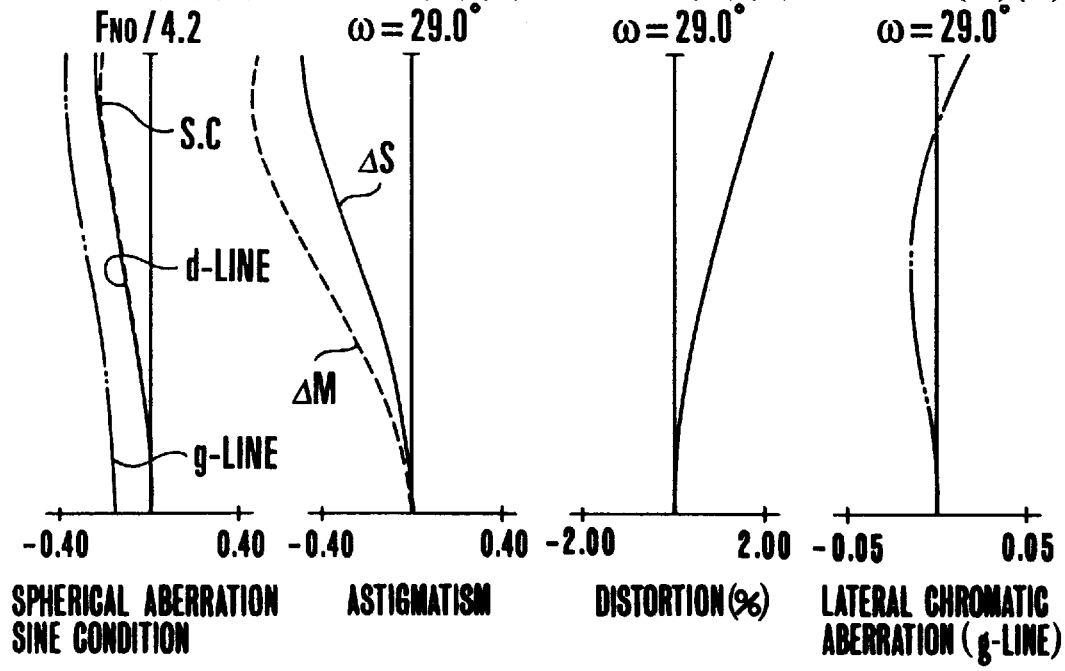

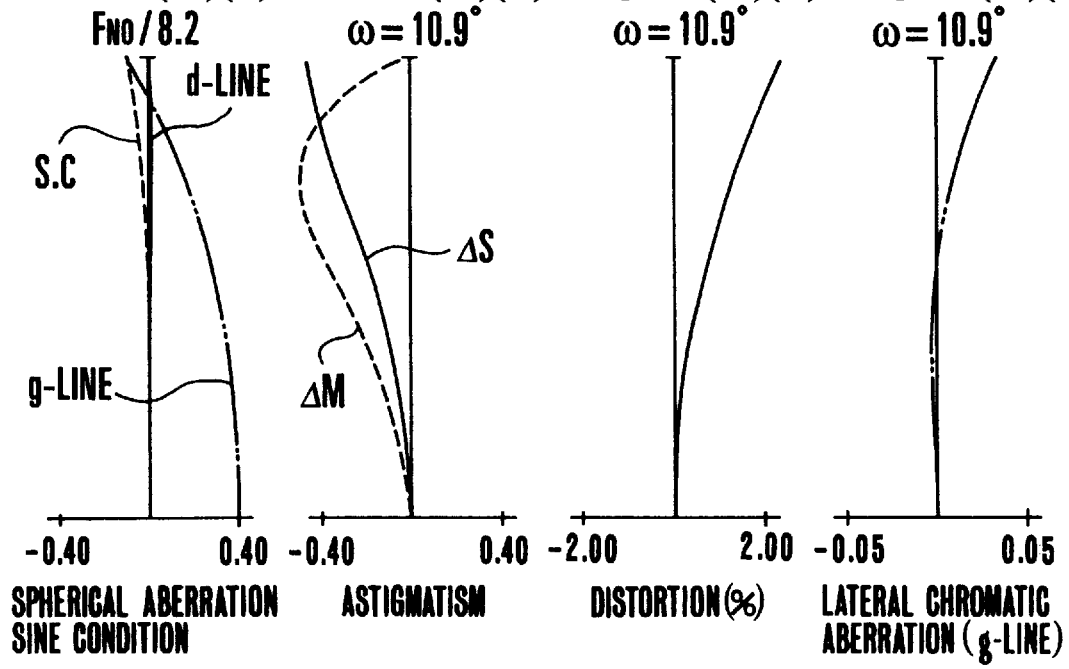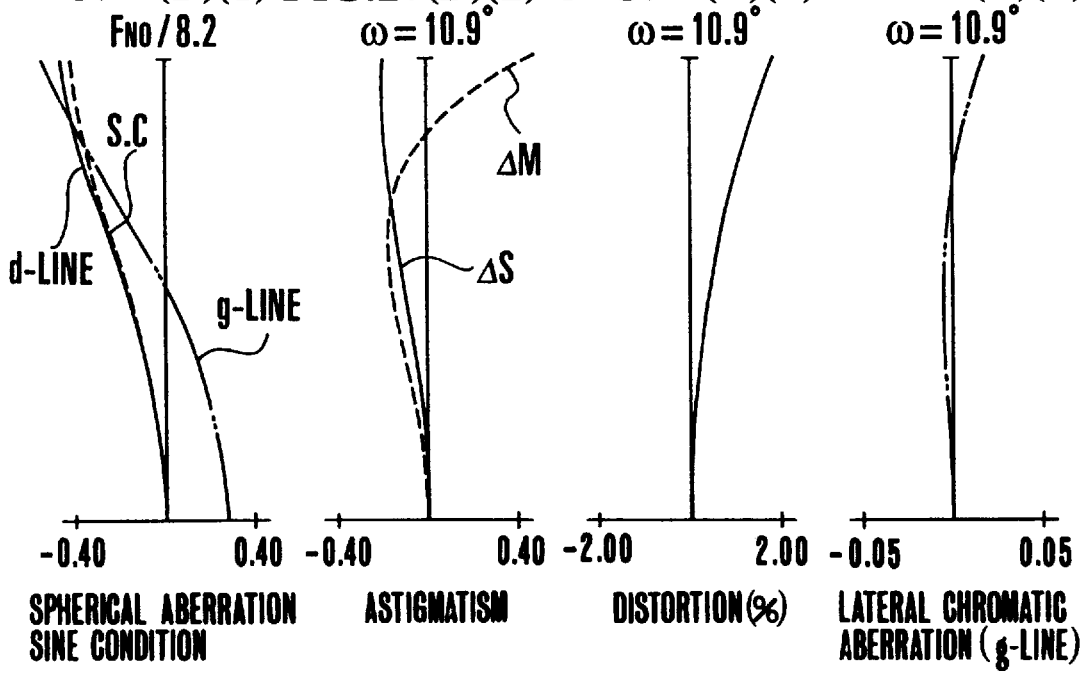

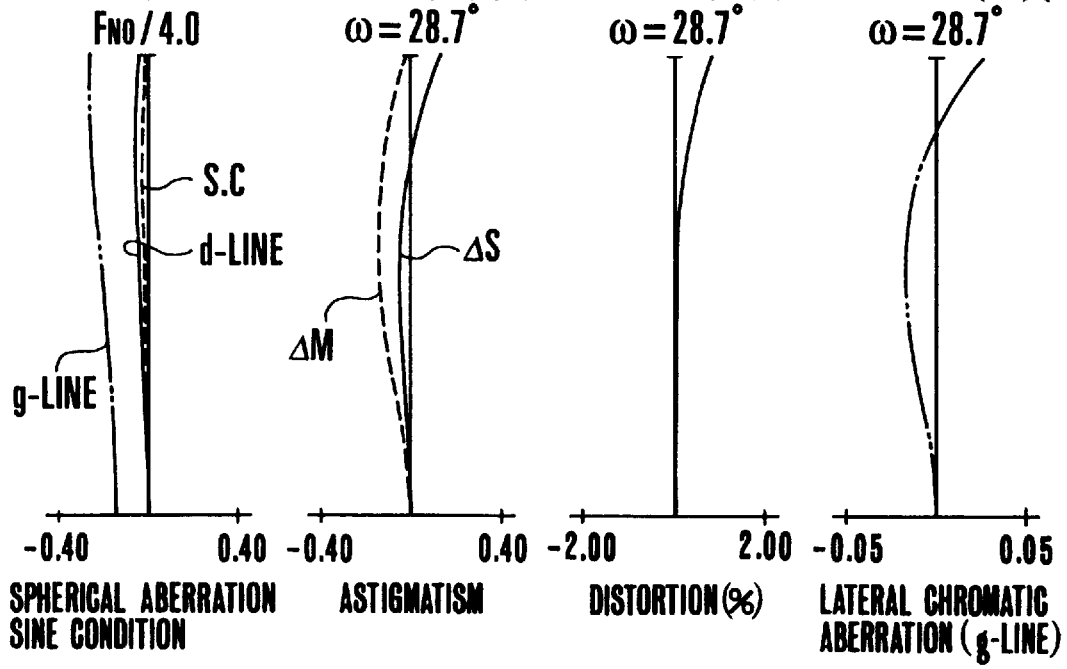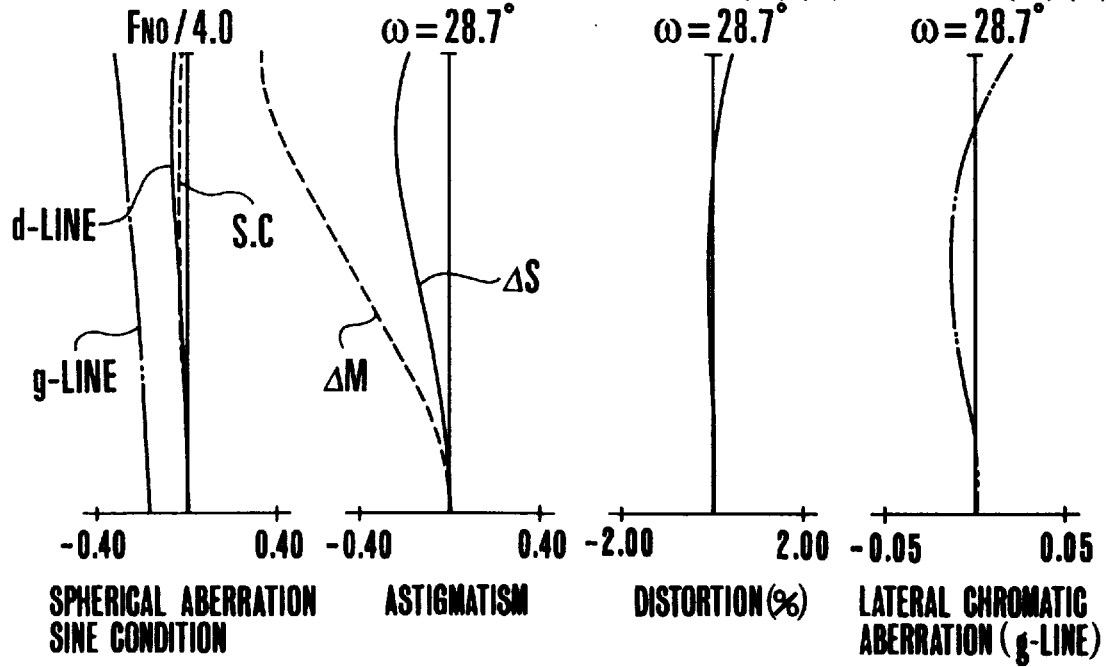

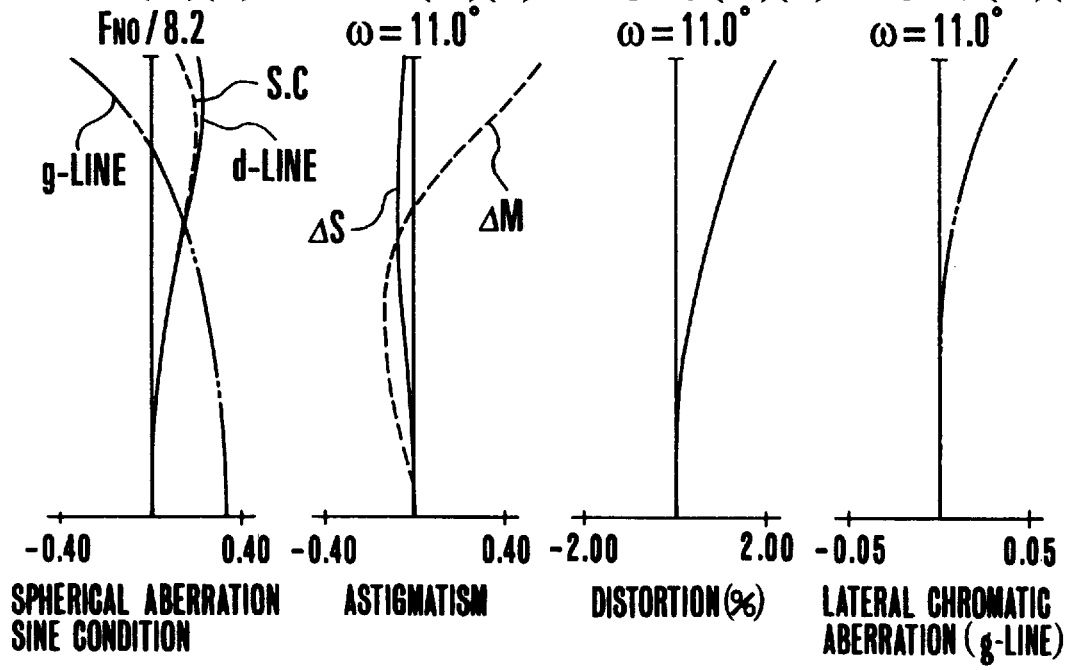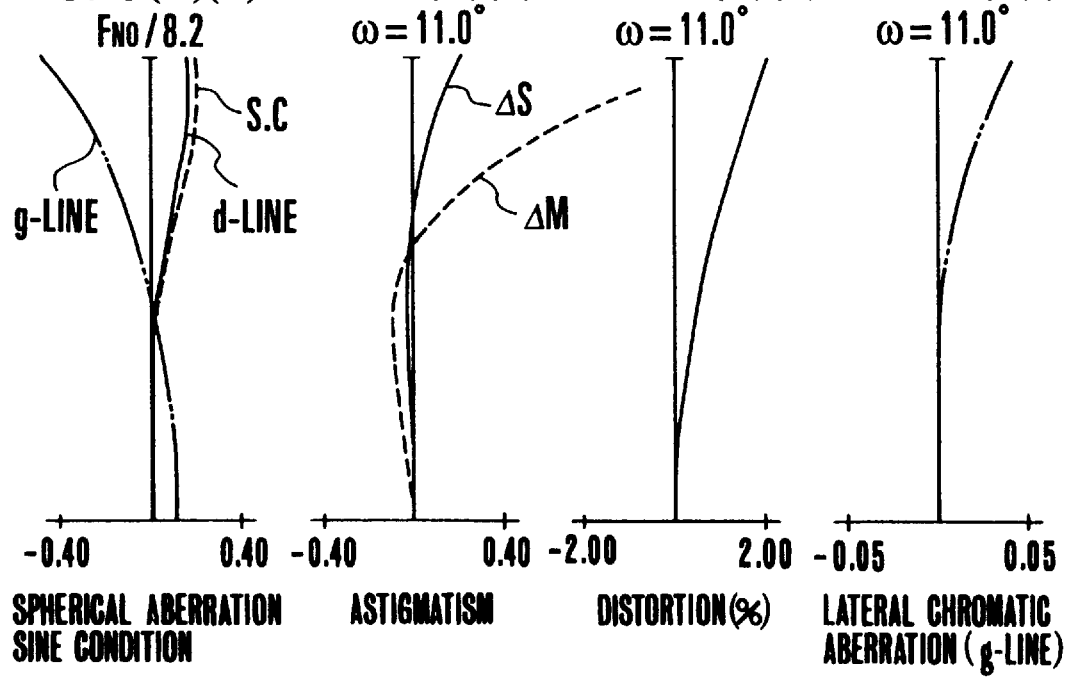

FIG.33(A)(1)
F_{NO}/3.73
FIG.33(A)(2)
ω=29.58°
FIG.33(A)(3)
ω=29.58°
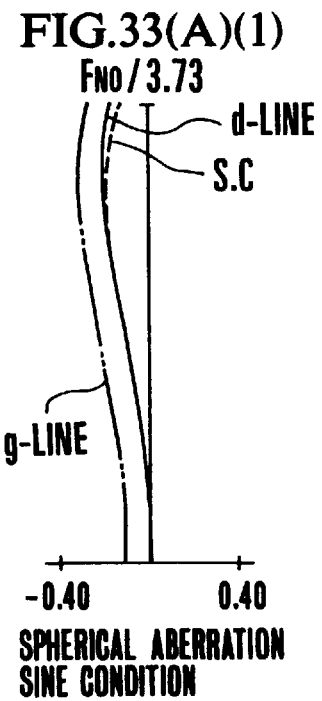
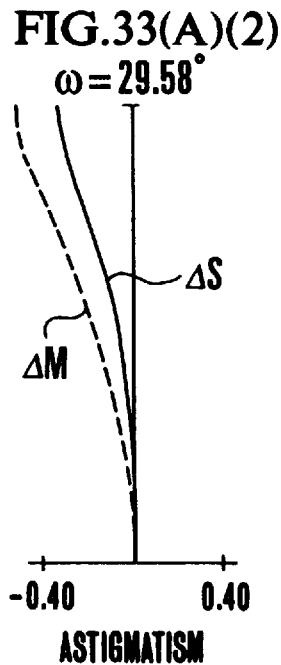
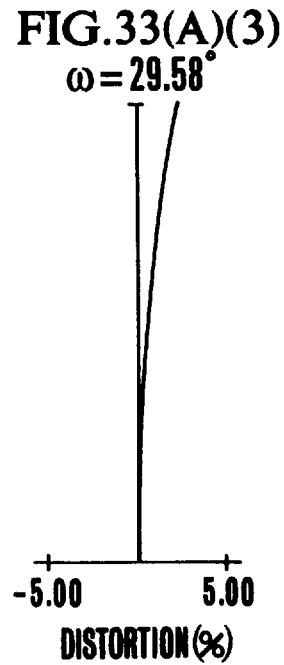
SPHERICAL ABERRATION
SINE CONDITION
ASTIGMATISM
DISTORTION(%)
FIG.33(B)(1)
F_{NO}/5.74
FIG.33(B)(2)
ω=18.41°
FIG.33(B)(3)
ω=18.41°
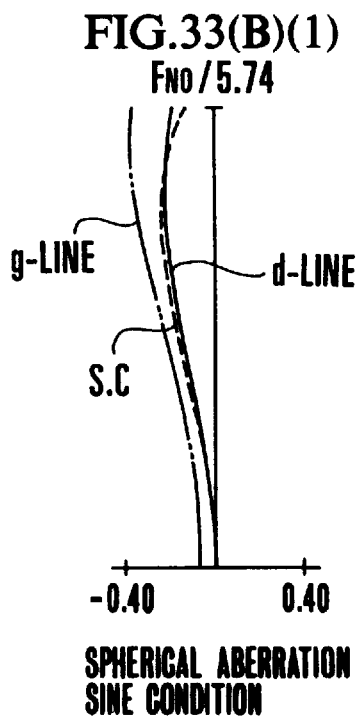
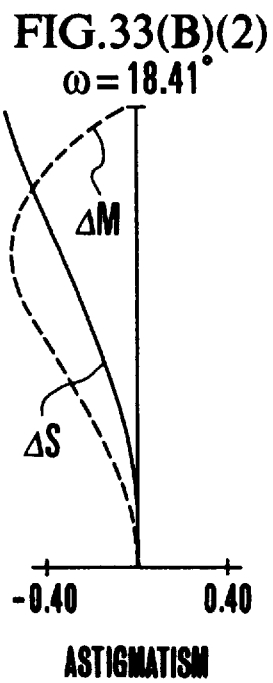
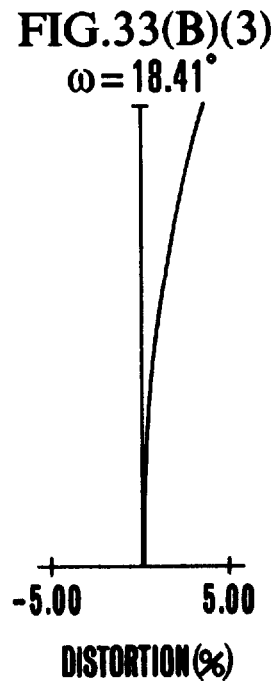
SPHERICAL ABERRATION
SINE CONDITION
ASTIGMATISM
DISTORTION(%)

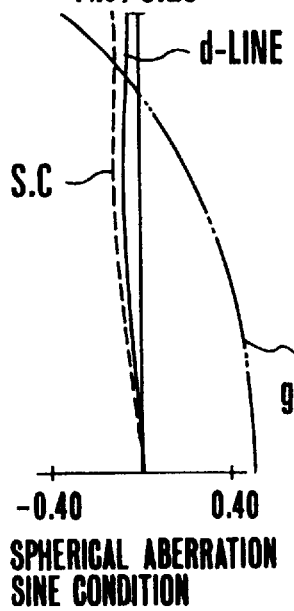
FIG.33(C)(1)
F_NO/8.28
SPHERICAL ABERRATION
SINE CONDITION
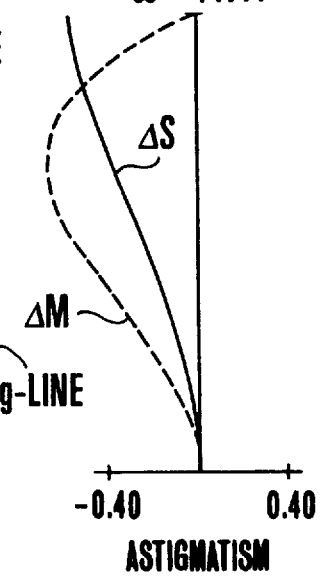
FIG.33(C)(2)
ω=11.41°
ASTIGMATISM
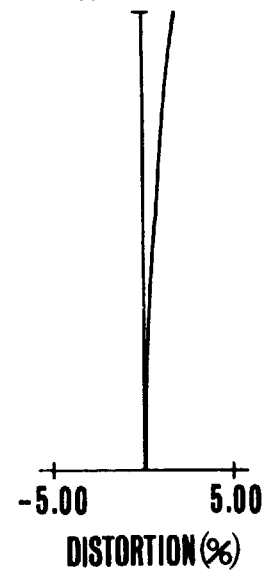
FIG.33(C)(3)
ω=11.41°
DISTORTION(%)
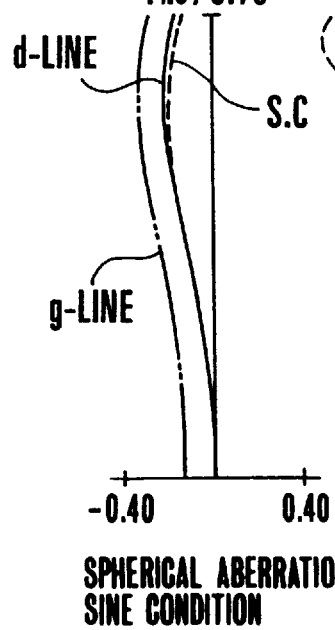
FIG.34(A)(1)
CLOSEST = 600mm
F_NO/3.73
SPHERICAL ABERRATION
SINE CONDITION
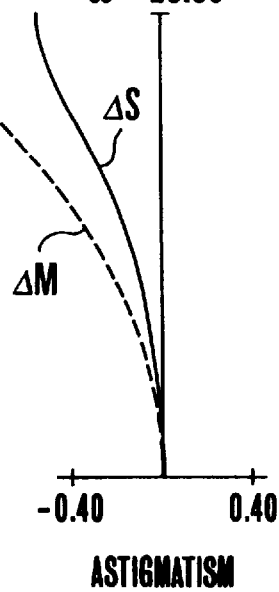
FIG.34(A)(2)
ω=29.58°
ASTIGMATISM
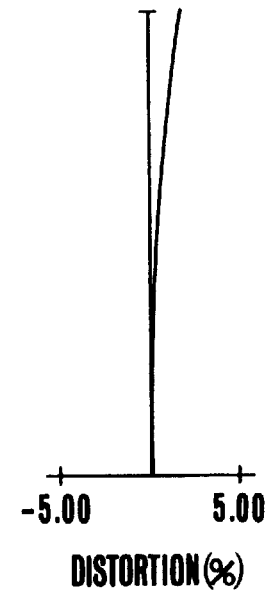
FIG.34(A)(3)
ω=29.58°
DISTORTION(%)

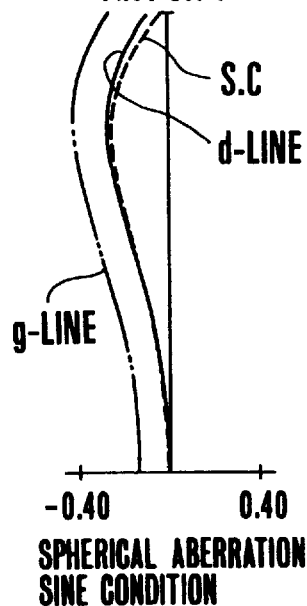
FIG.34(B)(1)
FNO/5.74
FIG.34(B)(2)
ω=18.41°
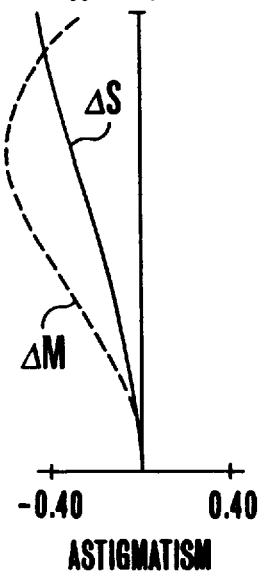
FIG.34(B)(3)
ω=18.41°
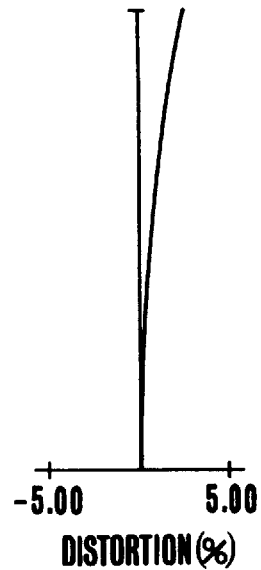
FIG.34(C)(1)
FNO/8.28
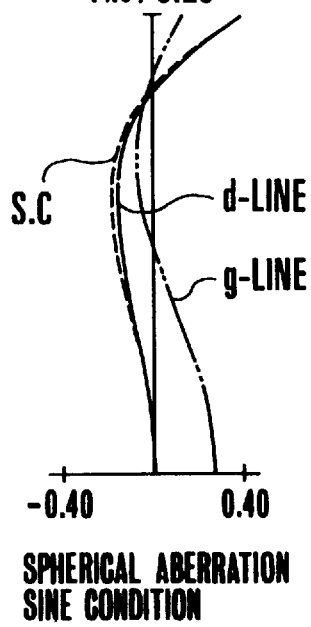
FIG.34(C)(2)
ω=11.41°
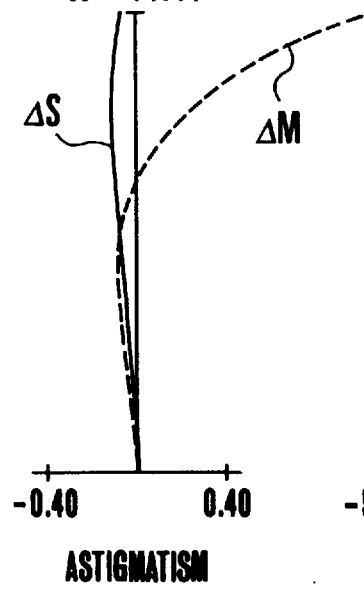
FIG.34(C)(3)
ω=11.41°
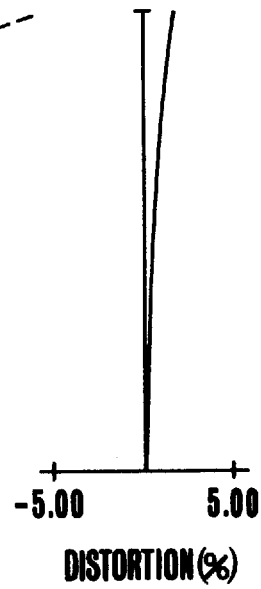

FIG.35(A)(1) 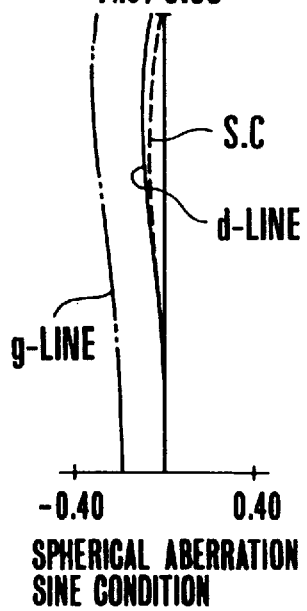
FIG.35(A)(2) 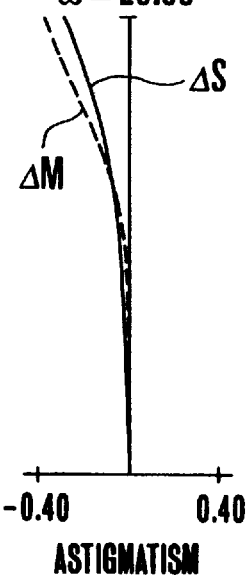
FIG.35(A)(3) 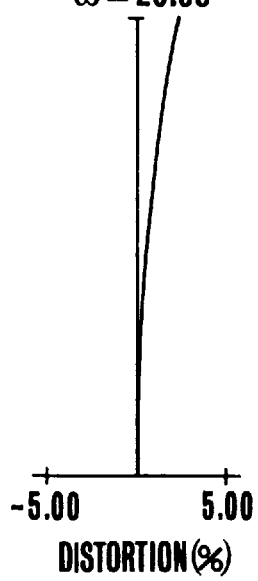
FIG.35(B)(1) 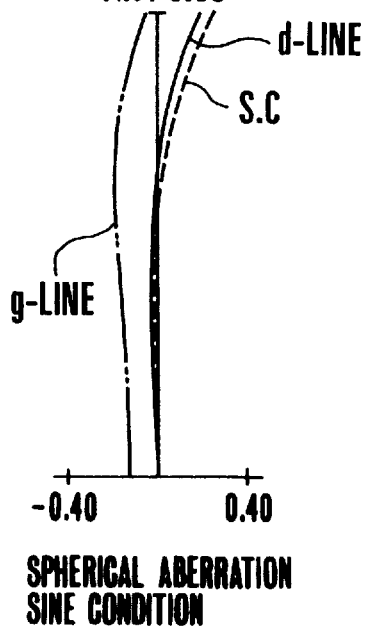
FIG.35(B)(2) 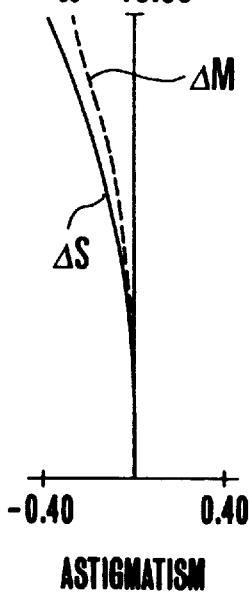
FIG.35(B)(3) 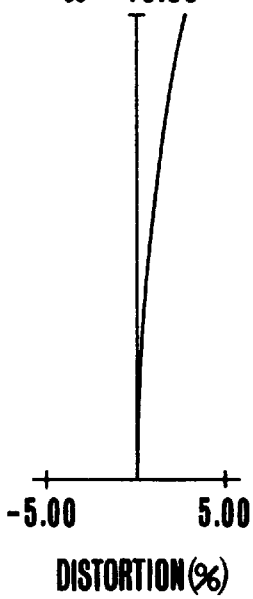

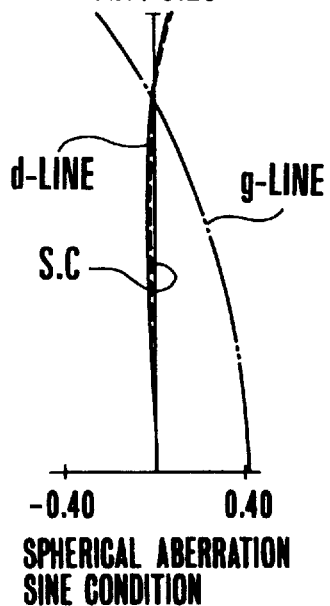
FIG.35(C)(1)
FNO/8.28
SPHERICAL ABERRATION
SINE CONDITION
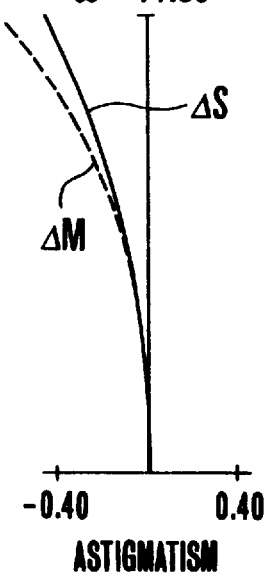
FIG.35(C)(2)
ω=11.50°
ASTIGMATISM
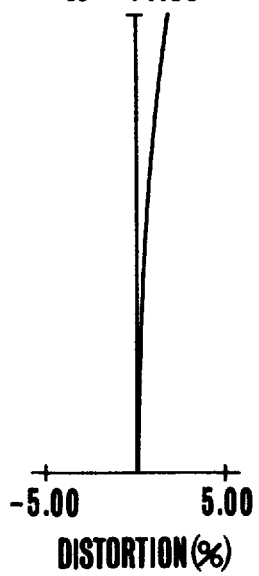
FIG.35(C)(3)
ω=11.50°
DISTORTION(%)
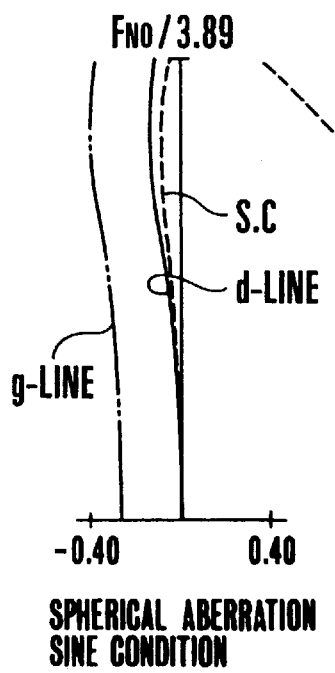
FIG.36(A)(1)
CLOSEST = 600mm
FNO/3.89
SPHERICAL ABERRATION
SINE CONDITION
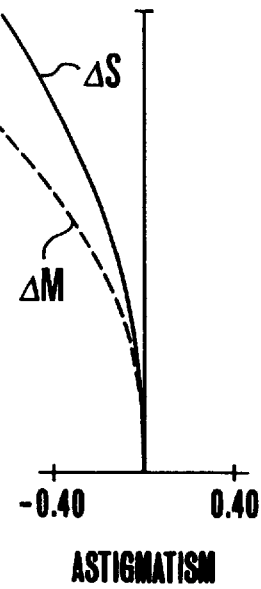
FIG.36(A)(2)
ω=28.85°
ASTIGMATISM
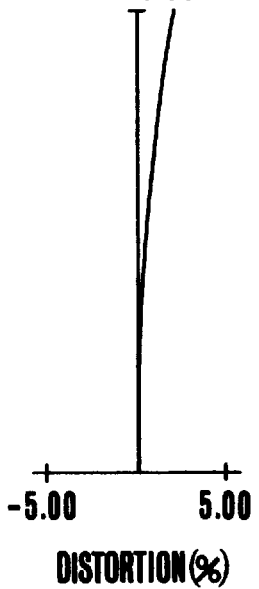
FIG.36(A)(3)
ω=28.85°
DISTORTION(%)

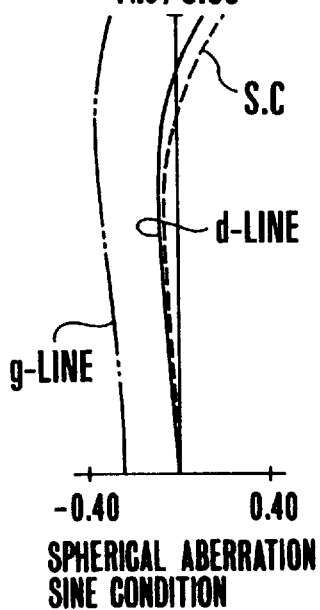
FIG.36(B)(1)
FNO/5.69
g-LINE
d-LINE
S.C
-0.40　　0.40
SPHERICAL ABERRATION
SINE CONDITION
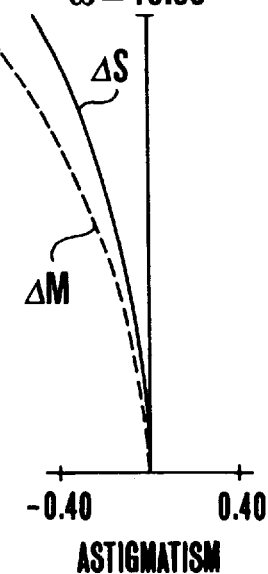
FIG.36(B)(2)
ω = 18.63°
ΔS
ΔM
-0.40　　0.40
ASTIGMATISM
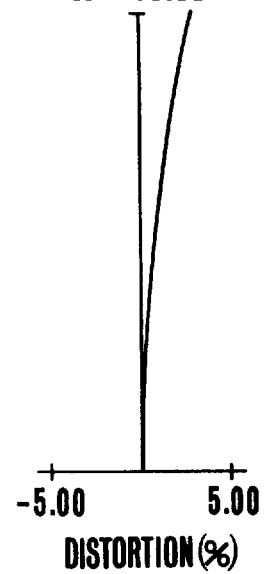
FIG.36(B)(3)
ω = 18.63°
-5.00　　5.00
DISTORTION(%)
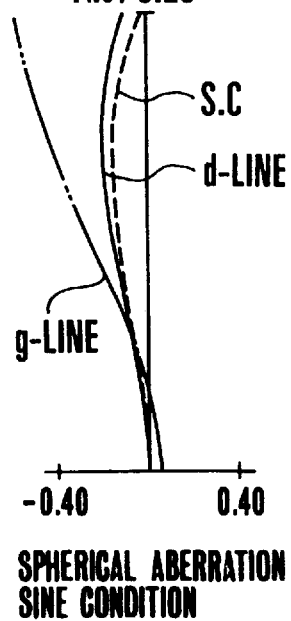
FIG.36(C)(1)
FNO/8.28
S.C
d-LINE
g-LINE
-0.40　　0.40
SPHERICAL ABERRATION
SINE CONDITION
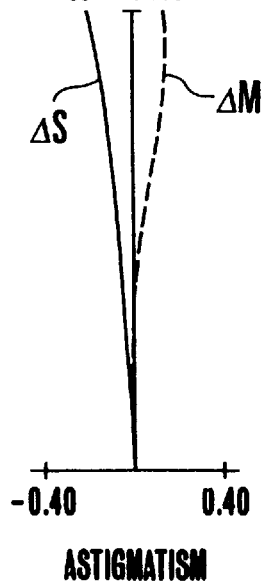
FIG.36(C)(2)
ω = 11.5°
ΔS
ΔM
-0.40　　0.40
ASTIGMATISM
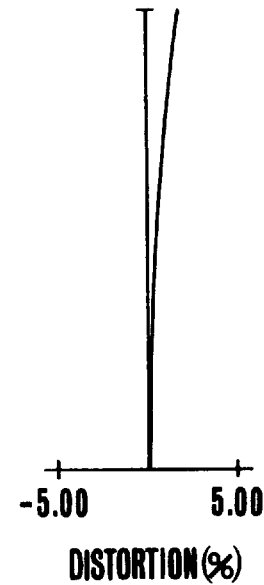
FIG.36(C)(3)
ω = 11.5°
-5.00　　5.00
DISTORTION(%)

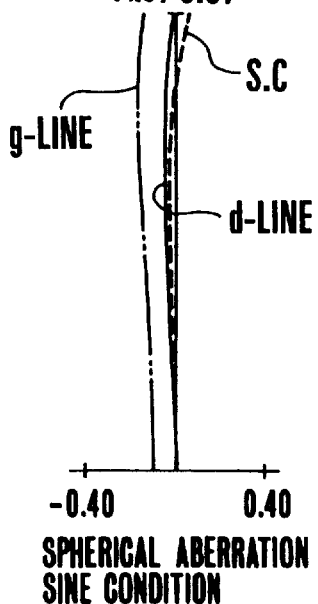
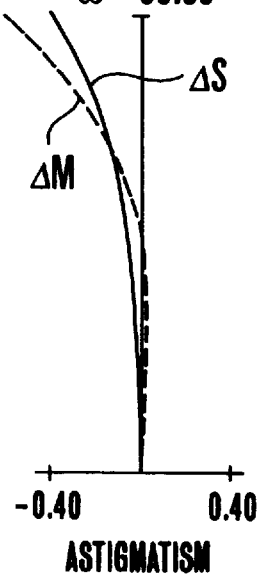
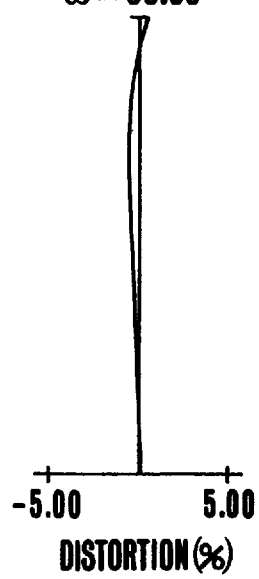
FIG.37(A)(1) F_{NO}/3.87
FIG.37(A)(2) ω=30.93°
FIG.37(A)(3) ω=39.93°
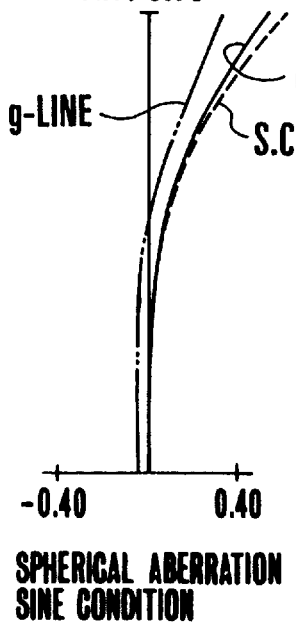
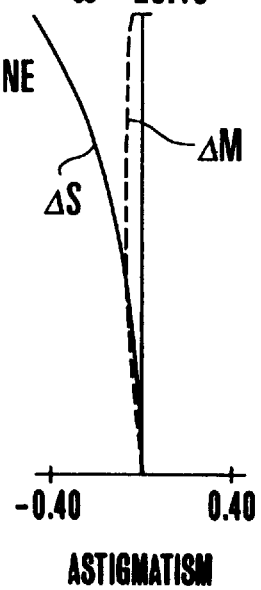
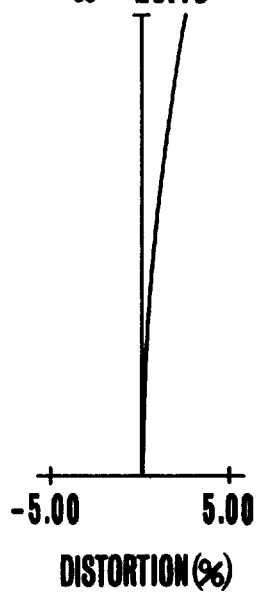
FIG.37(B)(1) F_{NO}/5.73
FIG.37(B)(2) ω=20.18°
FIG.37(B)(3) ω=20.18°

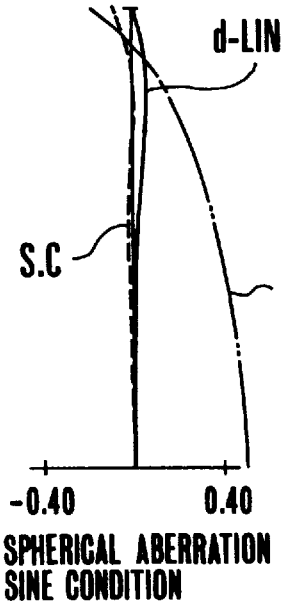
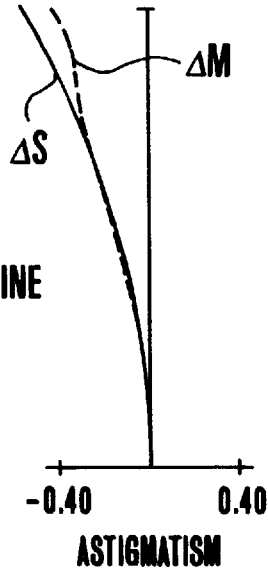
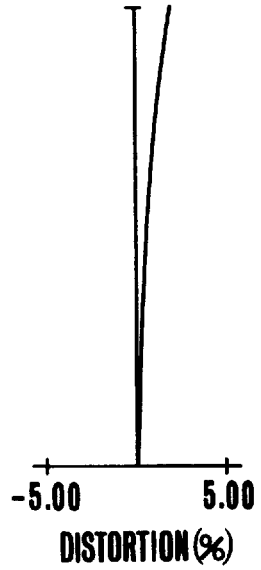
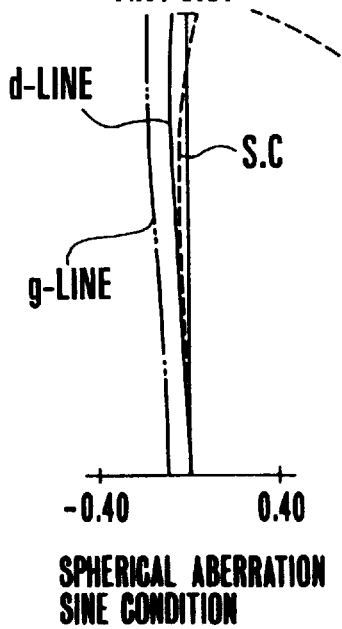
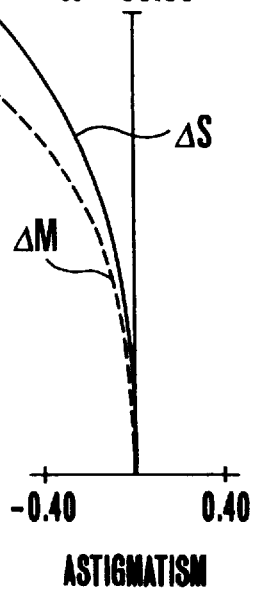
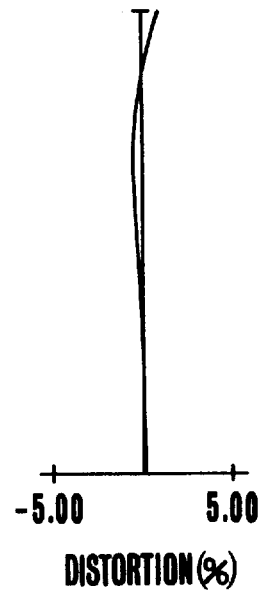

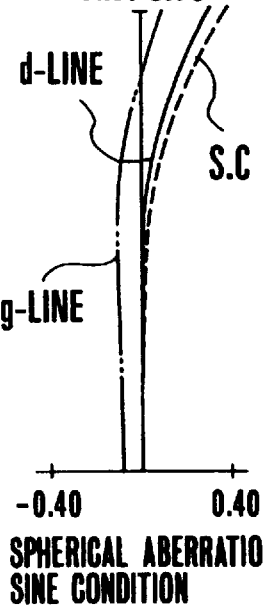
FIG.38(B)(1)
F_NO/5.73
d-LINE
S.C
g-LINE
-0.40  0.40
SPHERICAL ABERRATION
SINE CONDITION
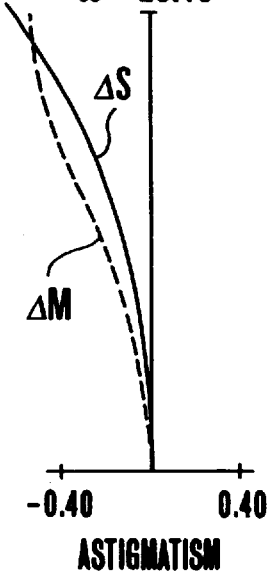
FIG.38(B)(2)
ω=20.18°
ΔS
ΔM
-0.40  0.40
ASTIGMATISM
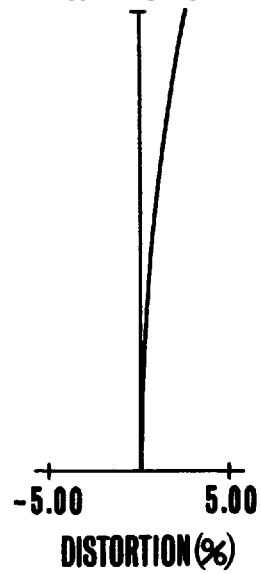
FIG.38(B)(3)
ω=20.18°
-5.00  5.00
DISTORTION(%)
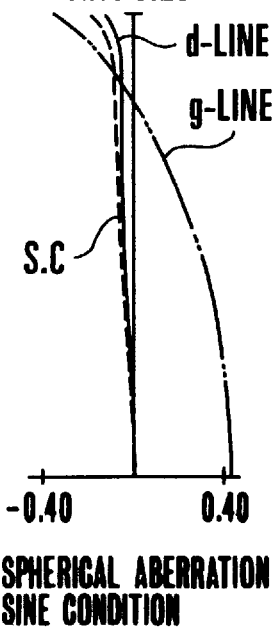
FIG.38(C)(1)
F_NO/8.28
d-LINE
g-LINE
S.C
-0.40  0.40
SPHERICAL ABERRATION
SINE CONDITION
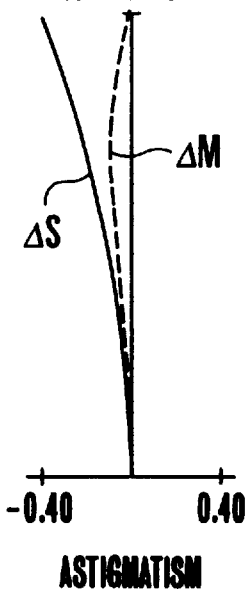
FIG.38(C)(2)
ω=12.02°
ΔM
ΔS
-0.40  0.40
ASTIGMATISM
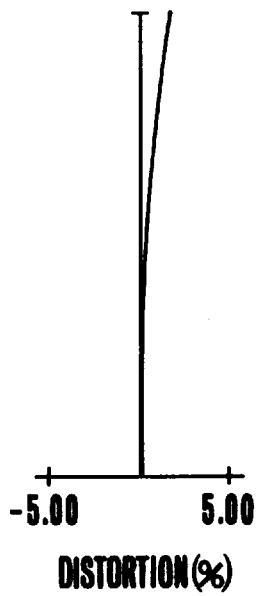
FIG.38(C)(3)
ω=12.02°
-5.00  5.00
DISTORTION(%)

F I G. 41
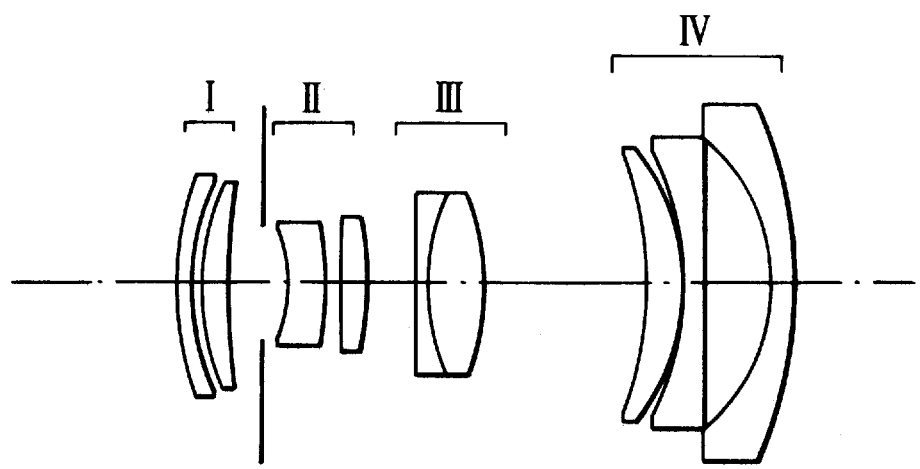
F I G. 42
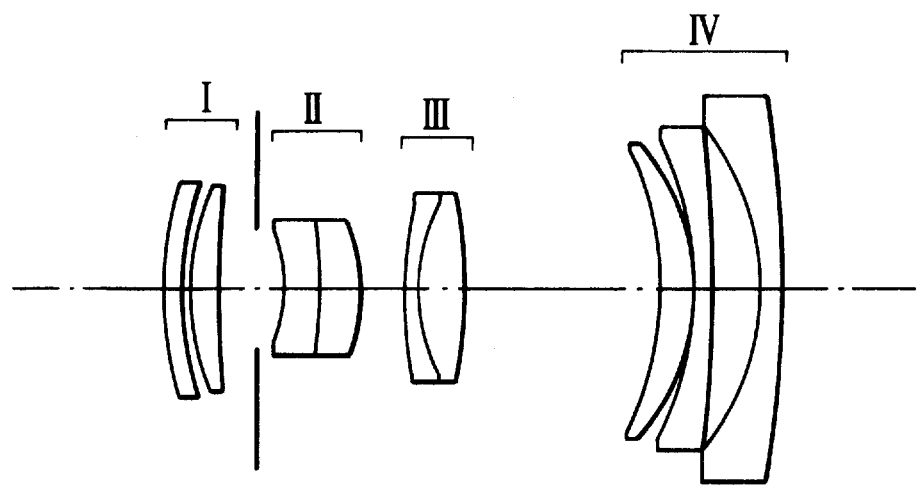

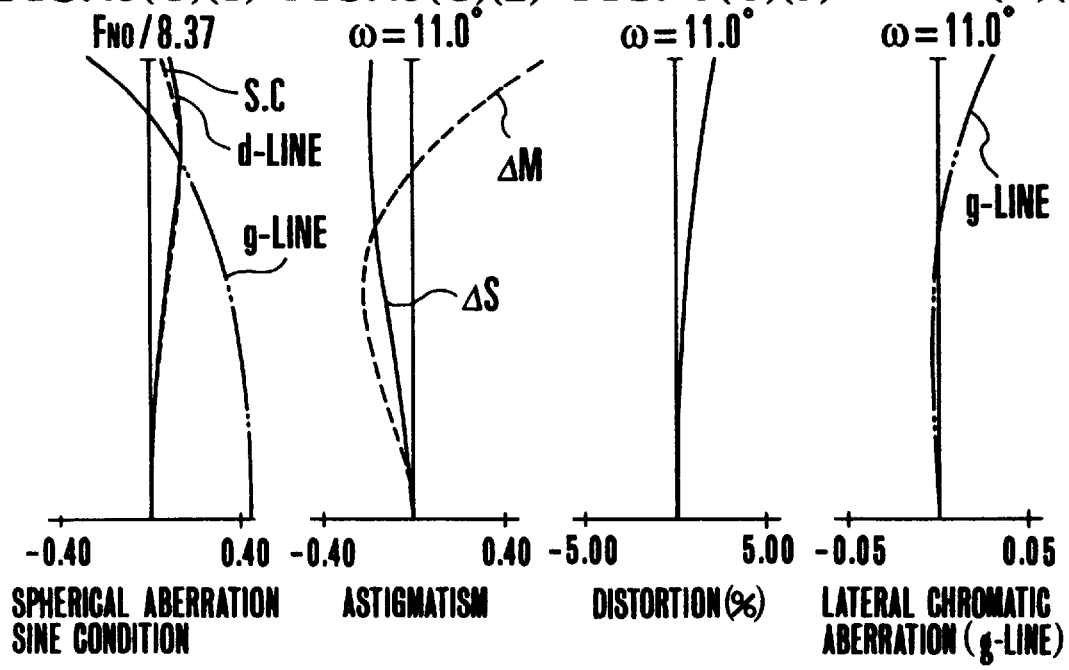
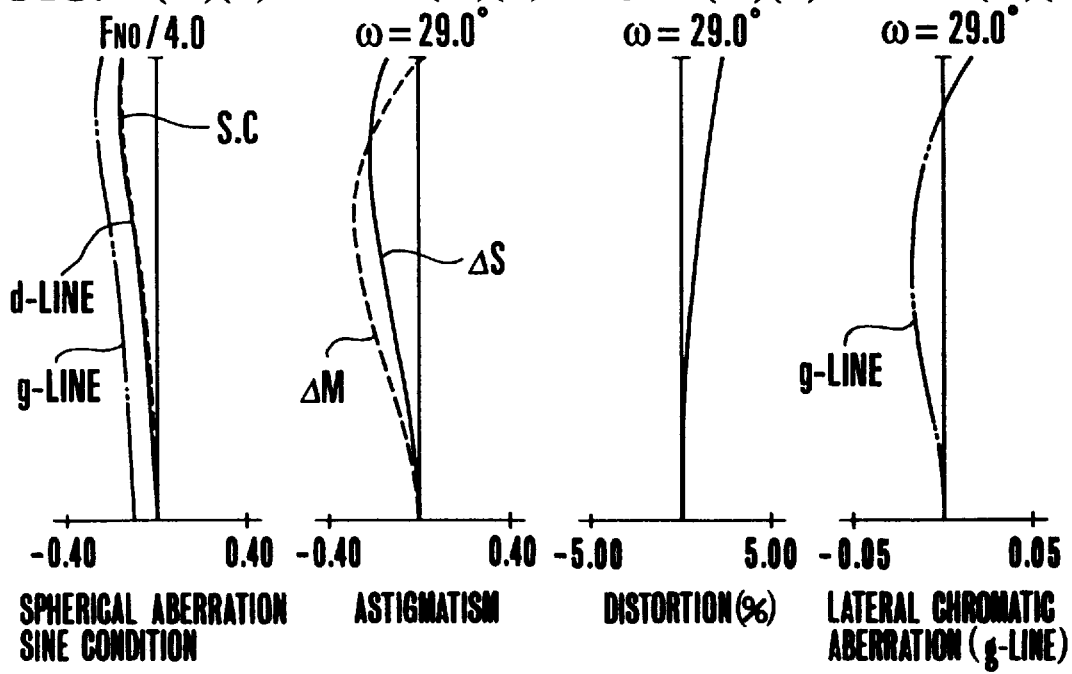

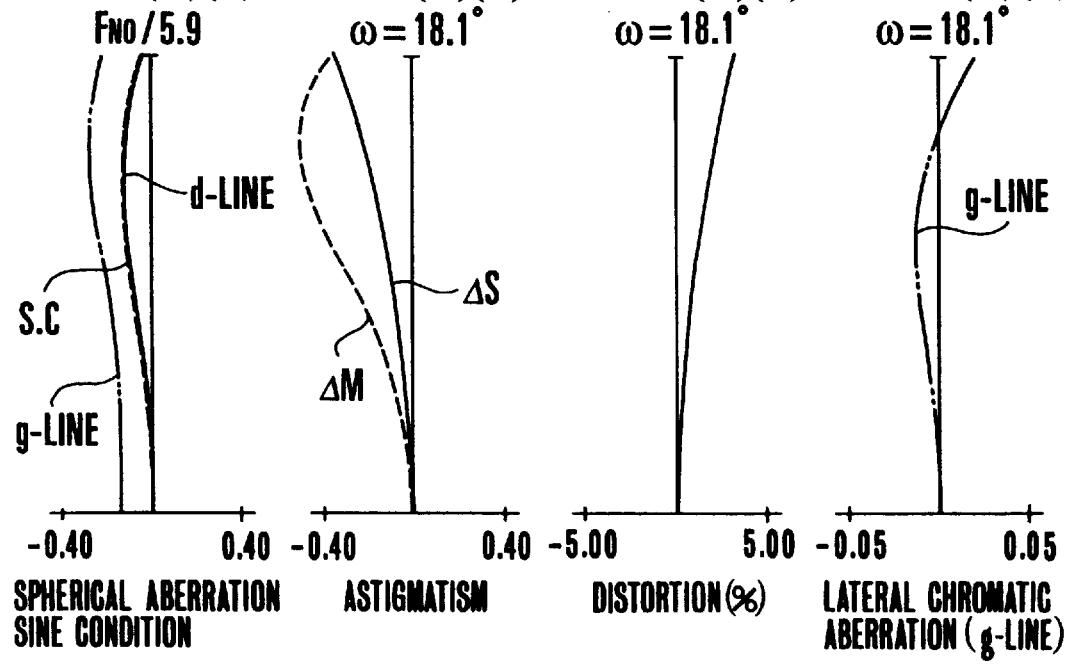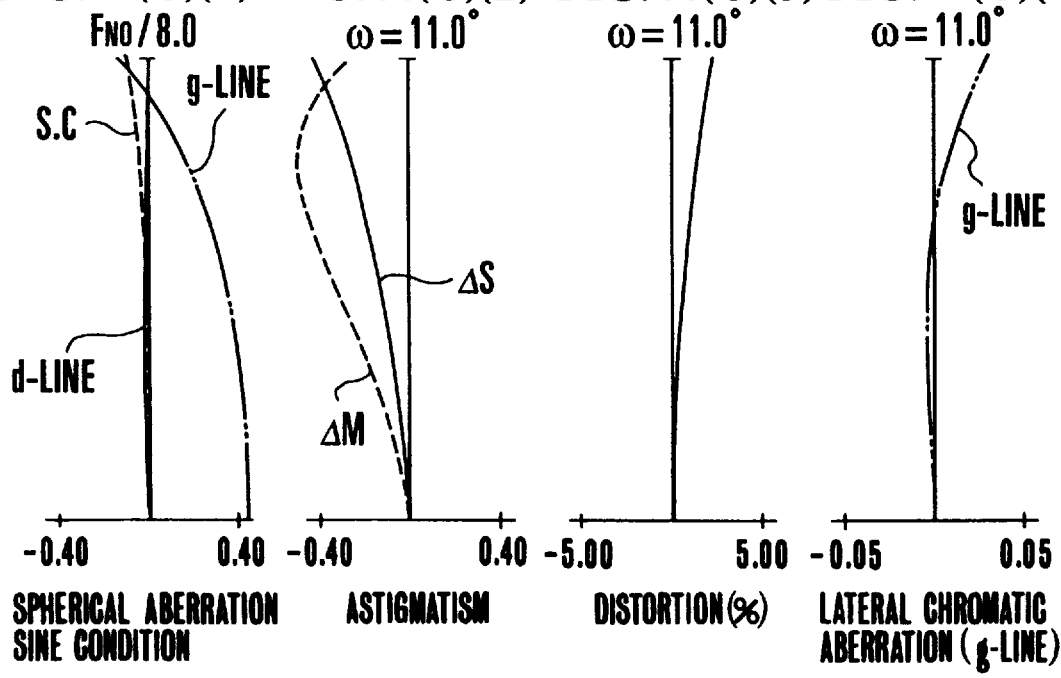

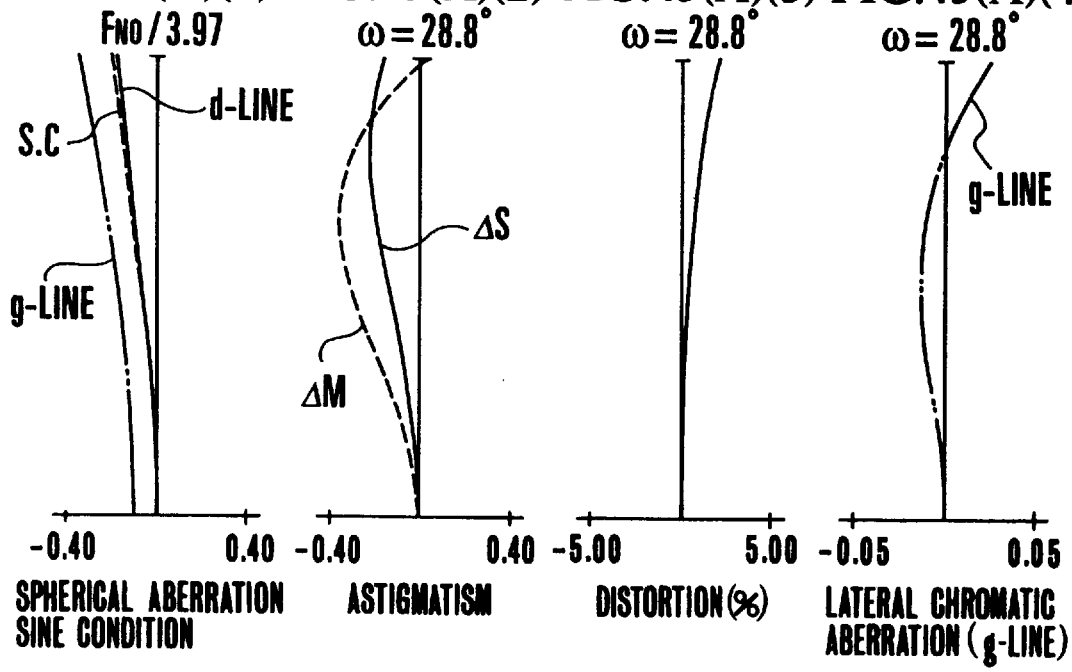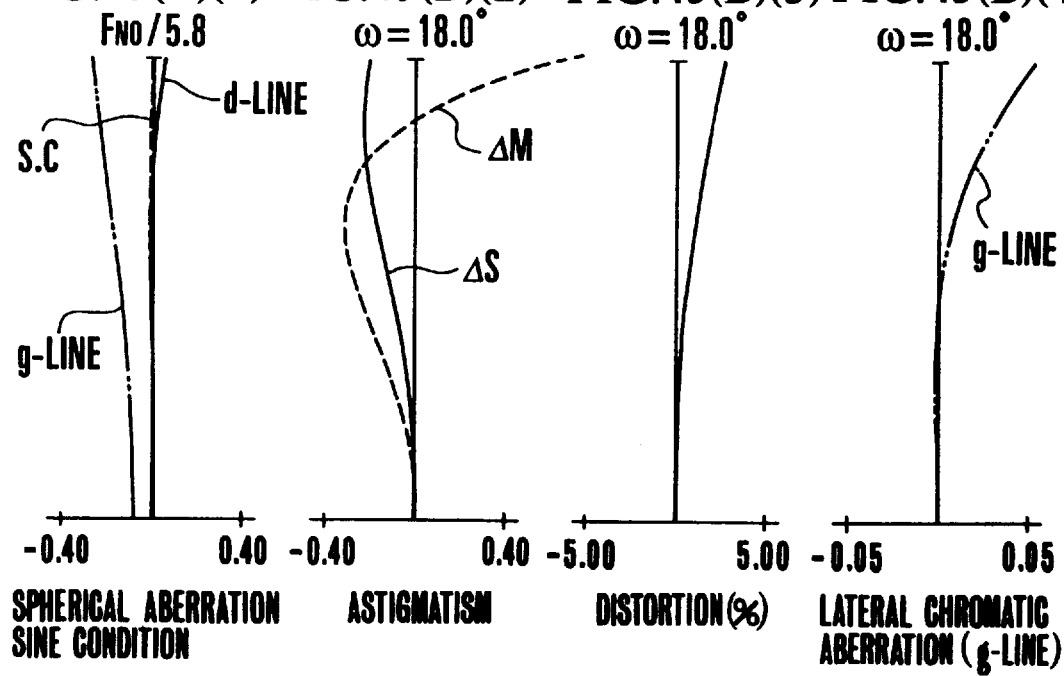

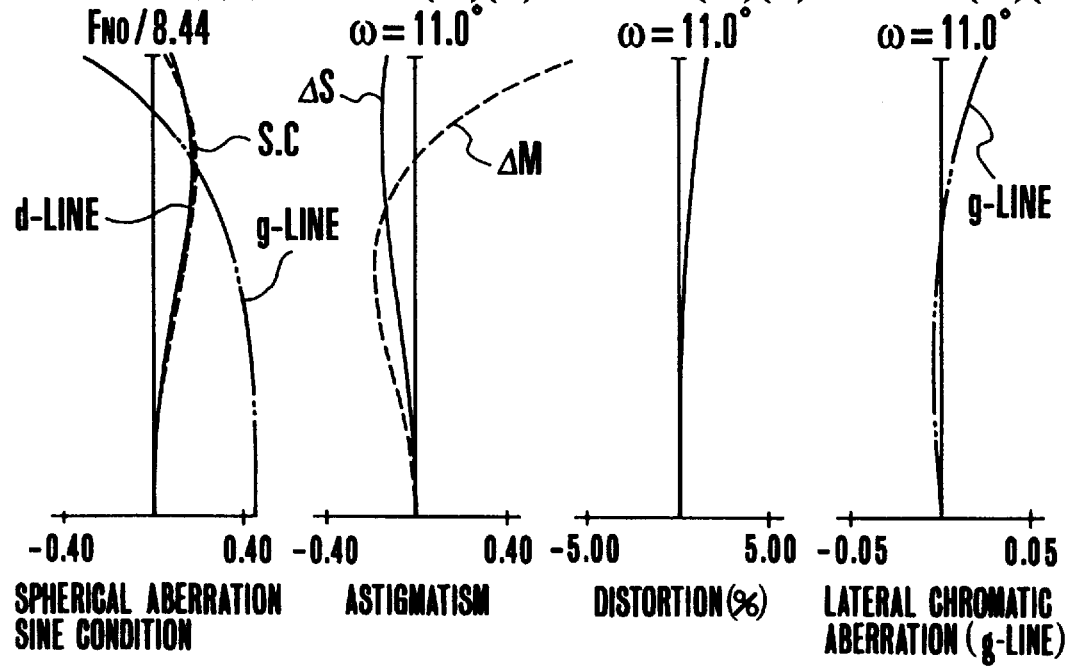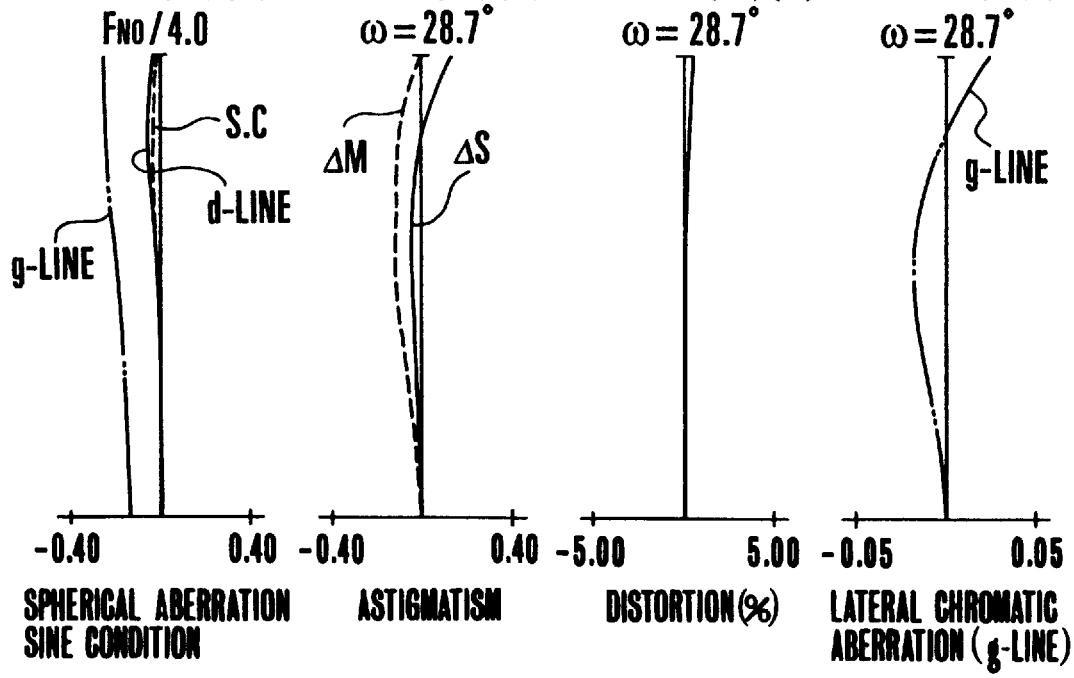

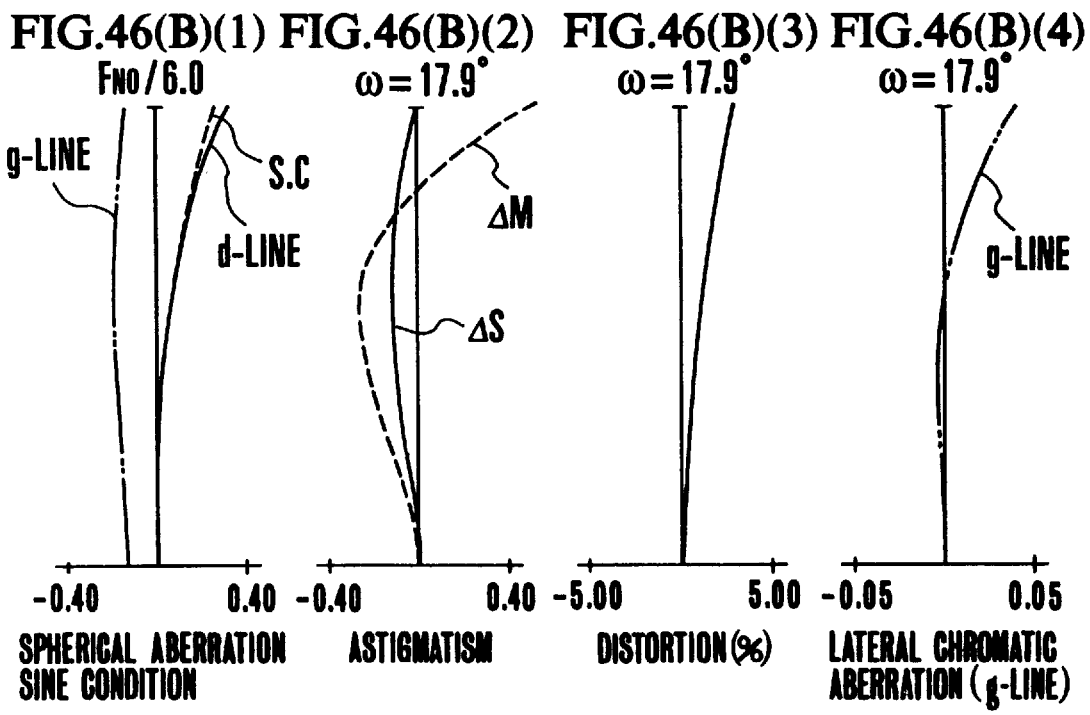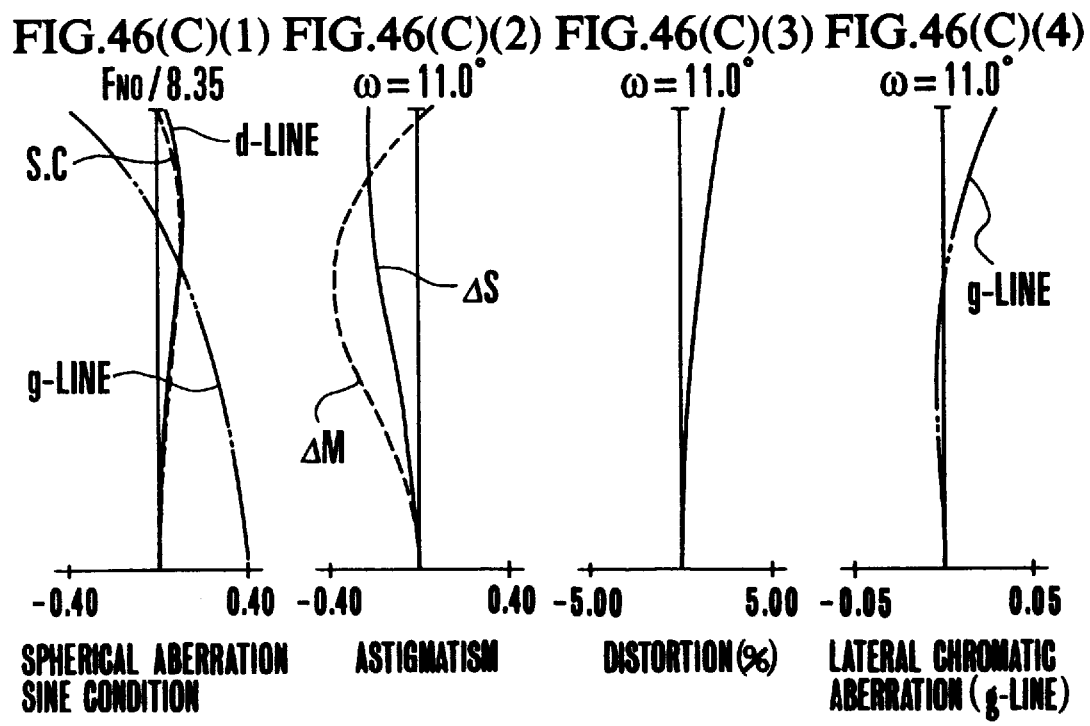

ZOOM LENS

This application is a continuation of application Ser. No. 08/177,603 filed Jan. 3, 1994, now abandoned.

BACKGROUND OF THE INVENTION

1. Field of the Invention

This invention relates to compact zoom lenses and, more particularly, to zoom lenses of high range suited to leaf shutter cameras.

2. Description of the Related Art

Of the conventional zoom lenses, as far as the relatively compact form is concerned, there are the 2-unit zoom lens of plus-minus power arrangement in this order from the object side, as is known in Japanese Laid-Open Patent Applications Nos. Sho 56-128911 and Sho 57-201213, and also the 3-unit zoom lens of plus-plus-minus power arrangement in this order from the object side, as is known in Japanese Patent Publication No. Hei 4-16764, Japanese Laid-Open Patent Application No. Sho 60-263113 and U.S. Pat. No. 5,002,373, and further the 4-unit zoom lens of plus-minus-plus-minus power arrangement in this order from the object side as is known in Japanese Laid-Open Patent Applications Nos. Sho 61-50112 and Hei 4-67114. For the single lens reflex camera, as it requires a relatively long back focal distance, its interchangeable 4-unit zoom lens of plus-minus-plus-minus power arrangement in this order from the object side is known in Japanese Laid-Open Patent Applications Nos. Sho 60-55314 and Sho 63-113410.

Besides these, for the zoom lens comprising four lens units of positive, positive, positive and negative powers in this order from the object side, there has been a previous proposal for varying all the air separations between the individual lens units in Japanese Laid-Open Patent Applications Nos. Hei 3-50516, Hei 3-88508, Hei 3-88509 and Hei 3-249614.

To give the zoom lens a higher zoom ratio, the use of the 3-unit type is more advantageous than the 2-unit one, and the use of the 4-unit type more than the 3-unit one. With such a zoom lens in the prior art, the total number of lens elements is relatively large. This would lead to a high production cost.

SUMMARY OF THE INVENTION

A first object of the invention is to provide a zoom lens of increased range, while still permitting reduction of the total number of lens elements to be achieved.

Another or second object of the invention is to provide a zoom lens having good stability of optical performance over the focusing range and suited to minimization of the size thereof.

A further object of the invention is to provide a zoom lens suited to a camera using silver halide film or a leaf shutter camera, as the back focal distance is shortened.

BRIEF DESCRIPTION OF THE DRAWINGS

FIGS. 2(A)(1)–2(A)(4), 2(B)(1)–2(B)(4) and 2(C)(1)–2(C)(4) are graphic representations of the aberrations of the numerical example 1 of the invention.

FIGS. 4(A)(1)–4(A)(4), 4(B)(1)–4(B)(4) and 4(C)(1)–4(C)(4) are graphic representations of the aberrations of the numerical example 2 of the invention.

FIGS. 6(A)(1)–6(A)(4), 6(B)(1)–6(B)(4) and 6(C)(1)–6(C)(4) are graphic representations of the aberrations of the numerical example 3 of the invention.

FIGS. 7(A), 7(B) and 7(C) are lens block diagrams of a numerical example 4 of the invention.

FIGS. 8(A)(1)–8(A)(4), 8(B)(1)–8(B)(4) and 8(C)(1)–8(C)(4) are graphic representations of the aberrations of the numerical example 4 of the invention.

FIGS. 10(A)(1)–10(A)(4), 10(B)(1)–10(B)(4) and 10(C)(1)–10(C)(4) are graphic representations of the aberrations of the numerical example 5 of the invention.

FIGS. 12(A)(1)–12(A)(4), 12(B)(1)–12(B)(4) and 12(C)(1)–12(C)(4) are graphic representations of the aberrations of the numerical example 6 of the invention.

FIGS. 14(A)(1)–14(A)(4), 14(B)(1)–14(B)(4) and 14(C)(1)–14(C)(4) are graphic representations of the aberrations of the numerical example 7 of the invention.

FIGS. 15(A), 15(B) and 15(C) are lens block diagrams of a numerical example 8.

FIGS. 16(A), 16(A) and 16(C) are lens block diagrams of a numerical example 9.

FIGS. 17(A), 17(B) and 17(C) are lens block diagrams of a numerical example 10.

FIGS. 18(A)(1)–18(A)(4), 18(B)(1)–18(B)(4) and 18(C)(1)–18(C)(4) are graphic representations of the aberrations of the numerical example 8.

FIGS. 19(A)(1)–19(A)(4), 19(B)(1)–19(B)(4) and 19(C)(1)–19(C)(4) are graphic representations of the aberrations of the numerical example 9.

FIGS. 20(A)(1)–20(A)(4), 20(B)(1)–20(B)(4) and 20(C)(1)–20(C)(4) are graphic representations of the aberrations of the numerical example 10.

FIGS. 24(A)(1)–24(A)(4), and 24(B)(1)–24(B)(4) are graphic representations of the aberrations of the numerical example 11 of the invention in the wide-angle end.

FIGS. 25(A)(1)–25(A)(4) and 25(B)(1)–25(B)(4) are graphic representations of the aberrations of the numerical example 11 of the invention in the telephoto end.

FIGS. 26(A)(1)–26(A)(4) and 26(B)(1)–26(B)(4) are graphic representations of the aberrations of the numerical example 12 of the invention in the wide-angle end.

FIGS. 27(A)(1)–27(A)(4) and 27(B)(1)–27(B)(4) are graphic representations of the aberrations of the numerical example 12 of the invention in the telephoto end.

FIGS. 28(A)(1)–28(A)(4) and 28(B)(1)–28(B)(4) are graphic representations of the aberrations of the numerical example 13 of the invention in the wide-angle end.

FIGS. 29(A)(1)–29(A)(4) and 29(B)(1)–29(B)(4) are graphic representations of the aberrations of the numerical example 13 of the invention in the telephoto end.

FIGS. 33(A)(1)–33(A)(4), 33(B)(1)–33(B)(4) and 33(C)(1)–33(C)(4) are graphic representations of the aberrations for an infinitely distant object of the numerical example 14 of the invention.

FIGS. 34(A)(1)–34(A)(4), 34(B)(1)–34(B)(4) and 34(C)(1)–34(C)(4) are graphic representations of the aberrations for an object at the minimum distance of the numerical example 14 of the invention.

FIGS. 35(A)(1)–35(A)(4), 35(B)(1)–35(B)(4) and 35(C)(1)–35(C)(4) are graphic representations of the aberrations for an infinitely distant object of the numerical example 15 of the invention.

FIGS. 36(A)(1)–36(A)(4), 36(B)(1)–36(B)(4) and 36(C)(1)–36(C)(4) are graphic representations of the aberrations for an object at the minimum distance of the numerical example 15 of the invention.

FIGS. 37(A)(1)–37(A)(4), 37(B)(1)–37(B)(4) and 37(C)(1)–37(C)(4) are graphic representations of the aberrations for an infinitely distant object of the numerical example 16 of the invention.

FIGS. 38(A)(1)–38(A)(4), 38(B)(1)–38(B)(4) and 38(C)(1)–38(C)(4) are graphic representations of the aberrations for an object at the minimum distance of the numerical example 16 of the invention.

FIG. 41 is a lens block diagram of a numerical example 19 of the invention.

FIG. 42 is a lens block diagram of a numerical example 20 of the invention.

FIGS. 43(A)(1)–43(A)(4), 43(B)(1)–43(B)(4) and 43(C)(1)–43(C)(4) are graphic representations of the aberrations of the numerical example 17.

FIGS. 44(A)(1)–44(A)(4), 44(B)(1)–44(B)(4) and 44(C)(1)–44(C)(4) are graphic representations of the aberrations of the numerical example 18.

FIGS. 45(A)(1)–45(A)(4), 45(B)(1)–45(B)(4) and 45(C)(1)–45(C)(4) are graphic representations of the aberrations of the numerical example 19.

FIGS. 46(A)(1)–46(A)(4), 46(B)(1)–46(B)(4) and 46(C)(1)–46(C)(4) are graphic representations of the aberrations of the numerical example 20.

Figure 1A:
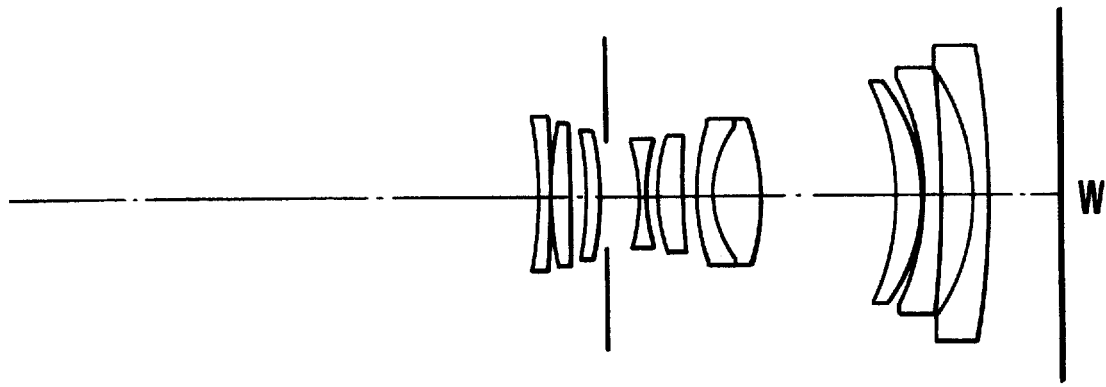
FIGS. 1(A), 1(B) and 1(C) are lens block diagrams of a numerical example 1 of the invention.
Figure 1B:
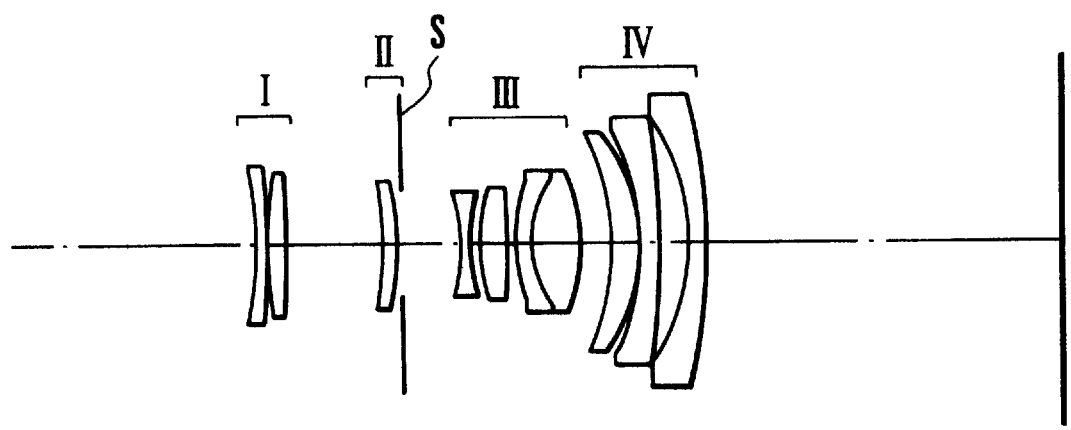
Figure 1C:
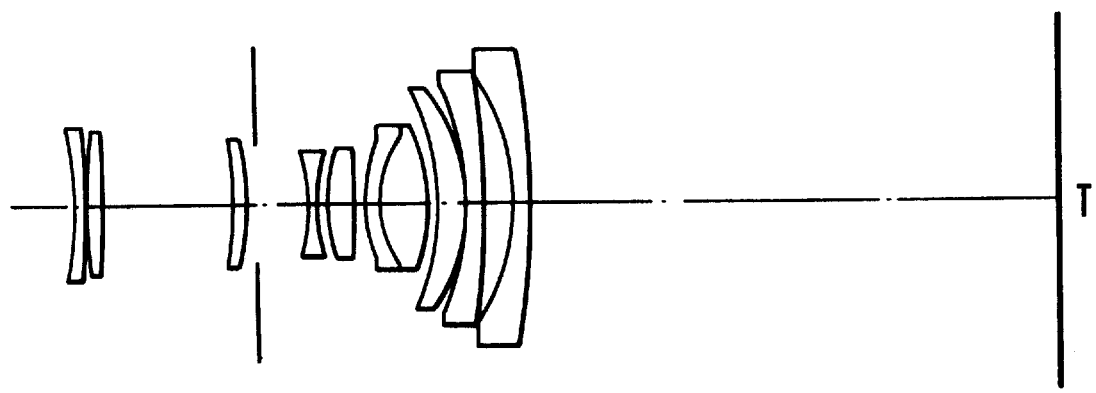
Figure 3A:
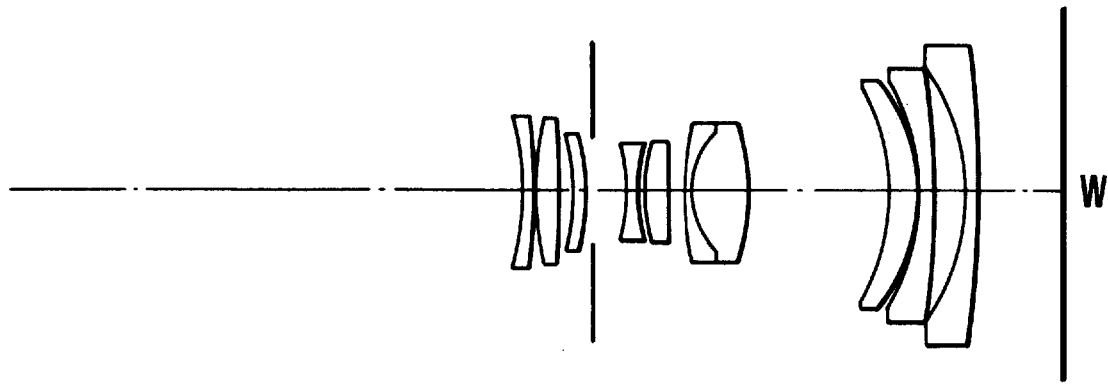
FIGS. 3(A), 3(B) and 3(C) are lens block diagrams of a numerical example 2 of the invention.
Figure 3B:
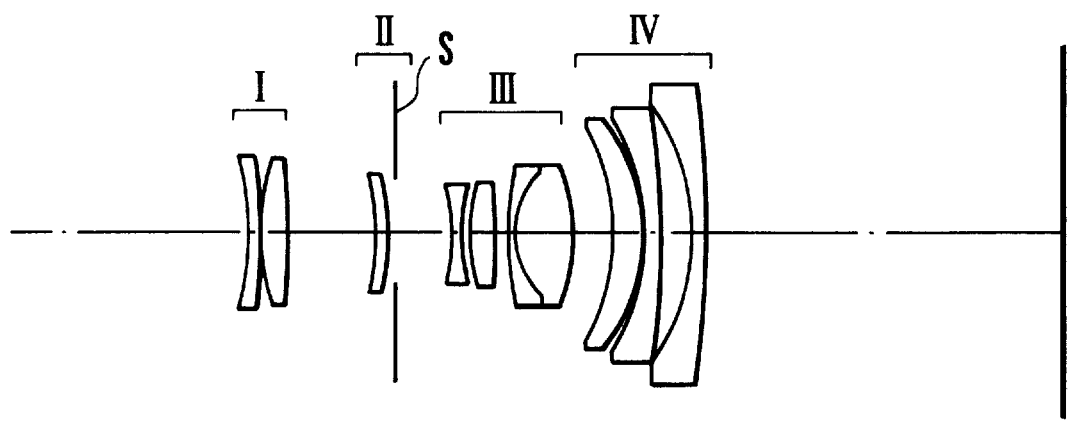
Figure 3C:
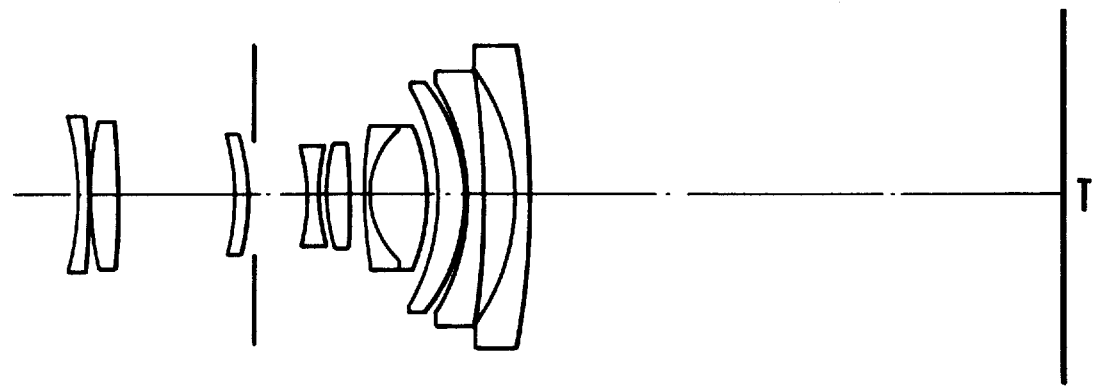
Figure 5A:
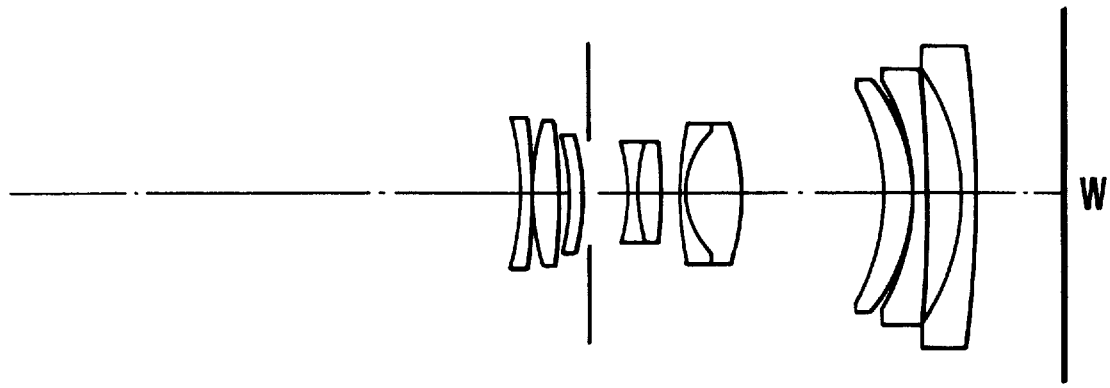
FIGS. 5(A), 5(B) and 5(C) are lens block diagrams of a numerical example 3 of the invention.
Figure 5B:
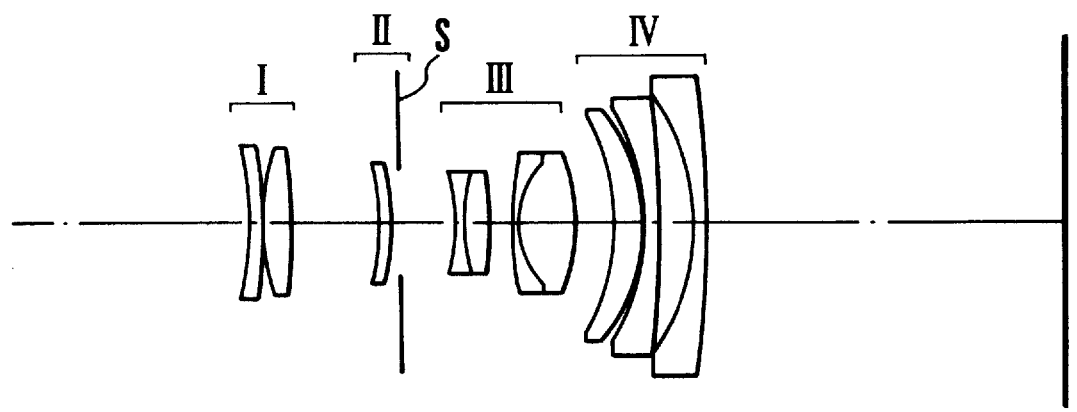
Figure 5C:
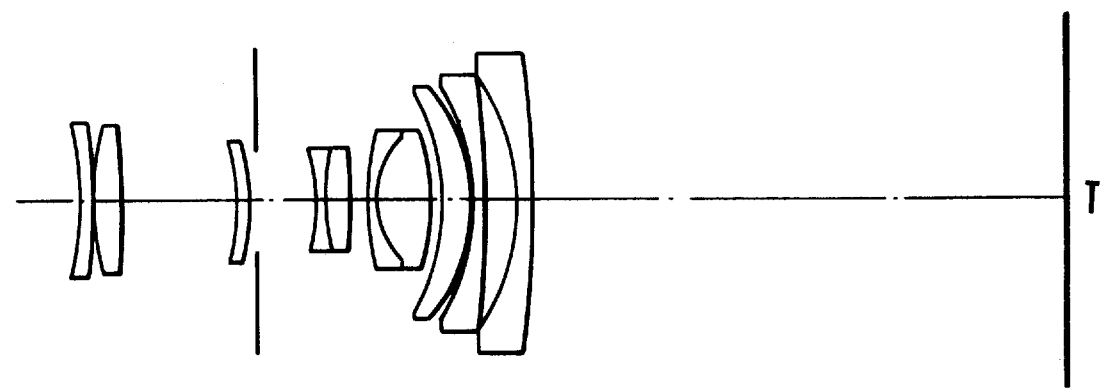
Figure 9A:
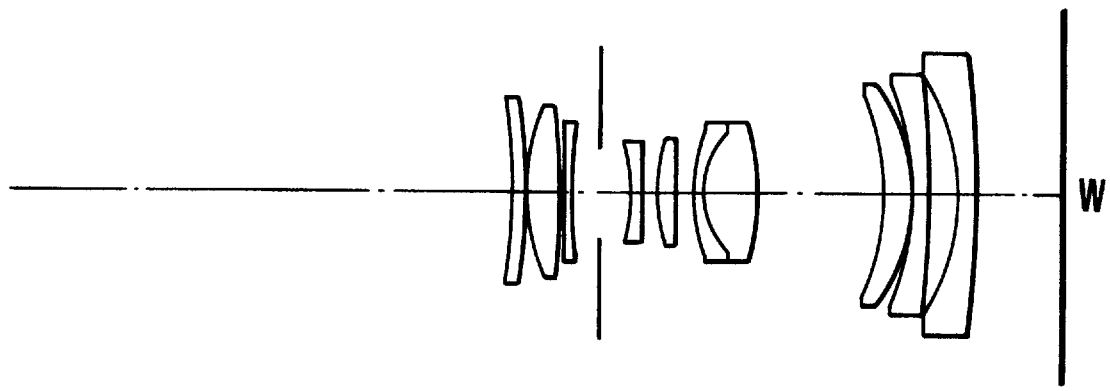
FIGS. 9(A), 9(B) and 9(C) are lens block diagrams of a numerical example 5 of the invention.
Figure 9B:
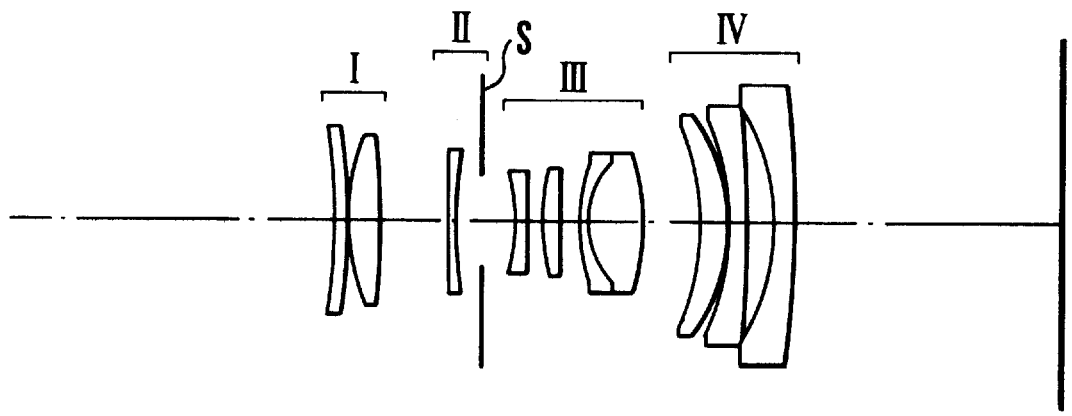
Figure 9C:
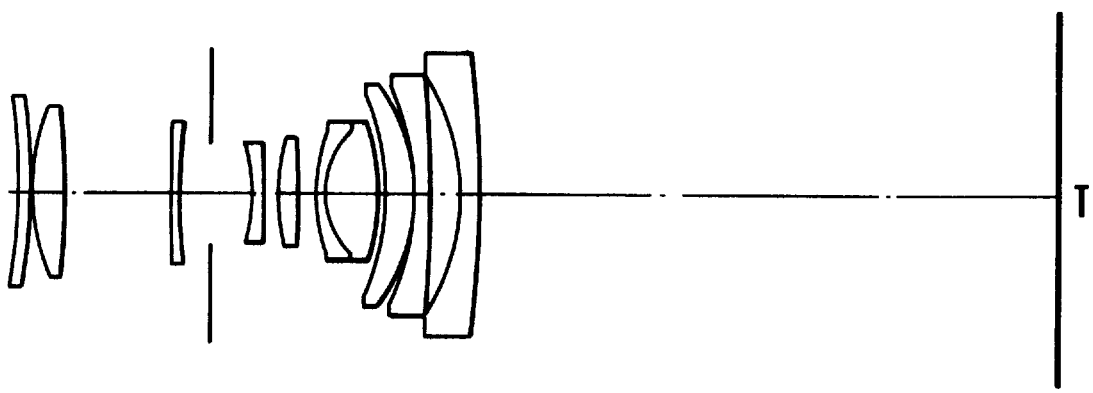
Figure 11A:
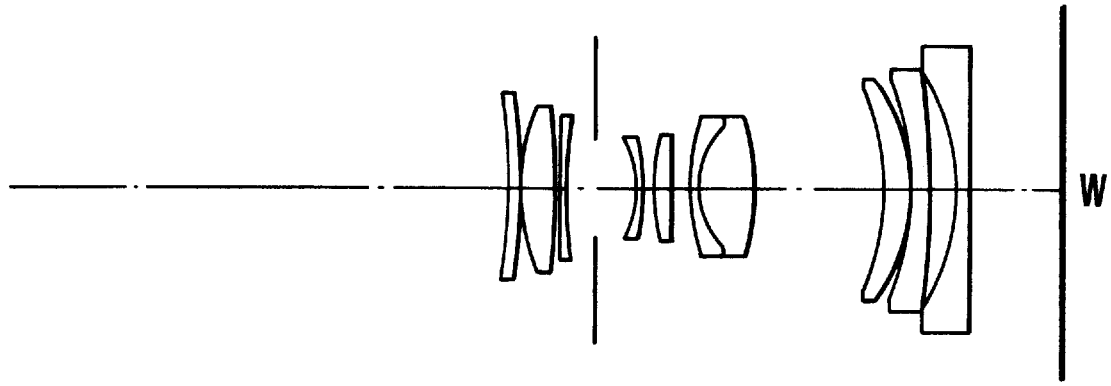
FIGS. 11(A), 11(B) and 11(C) are lens block diagrams of a numerical example 6 of the invention.
Figure 11B:
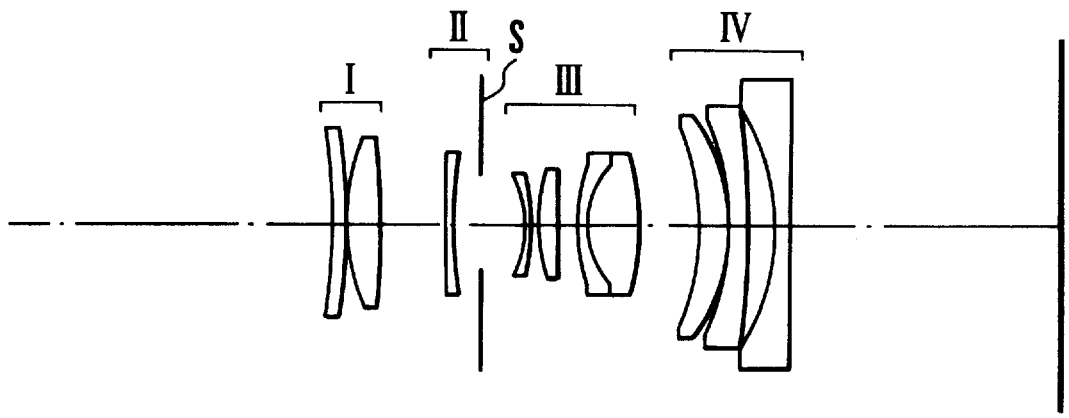
Figure 11C:
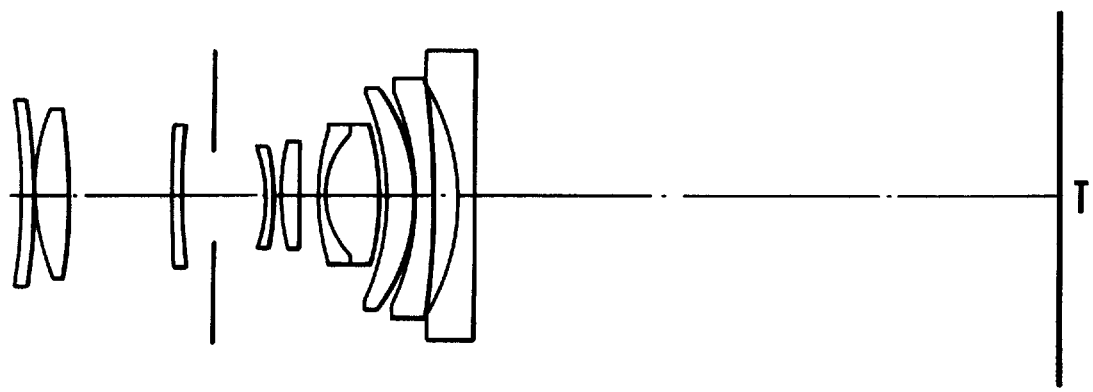
Figure 13A:
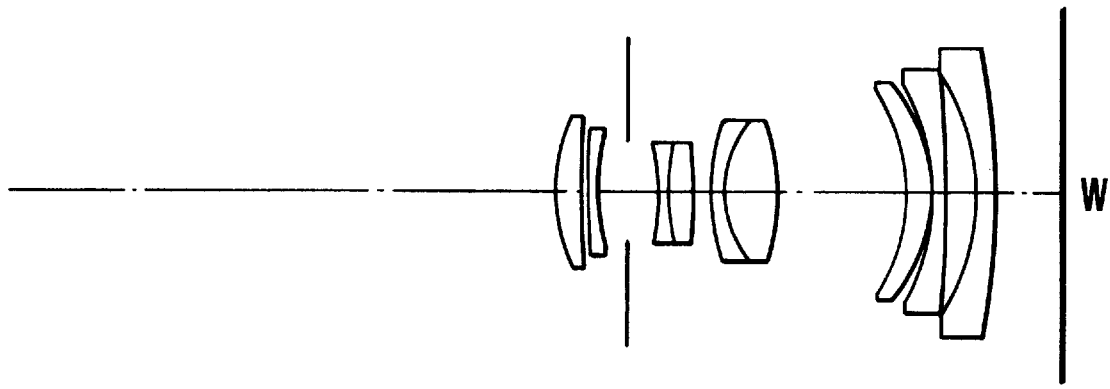
FIGS. 13(A), 13(B) and 13(C) are lens block diagrams of a numerical example 7 of the invention.
Figure 13B:
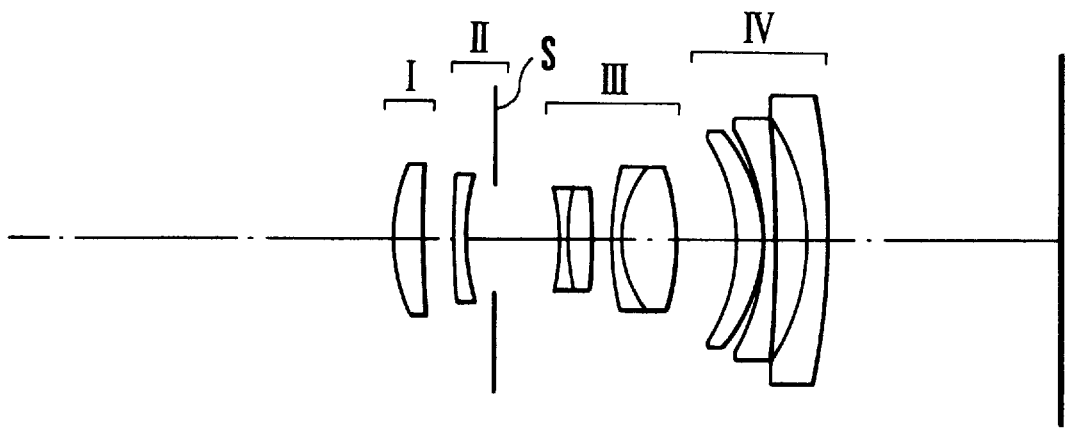
Figure 13C:
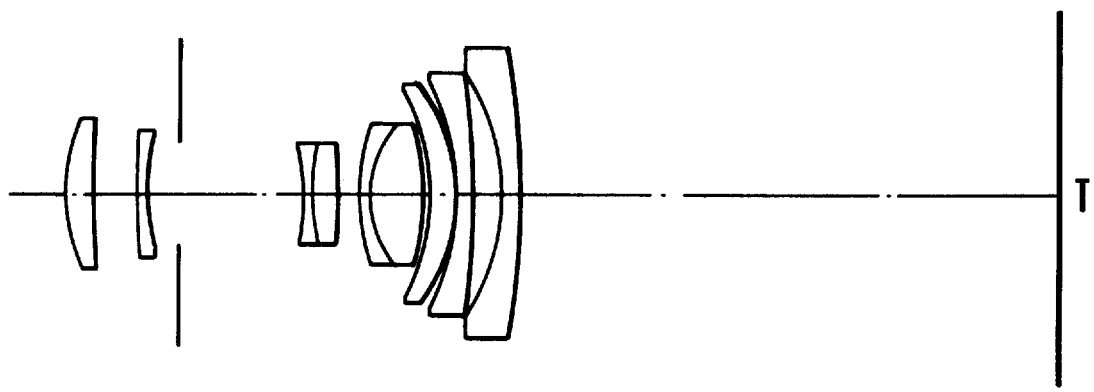

Of the aberration curves, the one labeled S.C represents the sine condition. ΔS stands for the sagittal image surface, and ΔM stands for the meridional image surface.

DETAILED DESCRIPTION OF THE PREFERRED EMBODIMENTS

The present invention is next described in connection with embodiments thereof by making reference to the drawings. FIGS. 1(A), 1(B) and 1(C), FIGS. 3(A), 3(B) and 3(C), FIGS. 5(A), 5(B) and 5(C), FIGS. 7(A), 7(B) and 7(C), FIGS. 9(A), 9(B) and 9(C), FIGS. 11(A), 11(B) and 11(C), and FIGS. 13(A), 13(B) and 13(C) are longitudinal section views of the numerical examples 1 to 7 of zoom lenses of the invention, respectively. In these figures, I denotes a first lens unit having a positive refractive power; II denotes a second lens unit having either a positive refractive power in the numerical examples 1 to 4 or a negative refractive power in the numerical examples 5 to 7; III denotes a third lens unit having a positive refractive power; and IV denotes a fourth lens unit having a negative refractive power. S stands for a stop fixedly mounted to the second lens unit II. Of the diagrams of the aberrations, FIGS. 2(A)(1)–2(A)(4), 4(A)(1)–4(A)(4), 6(A)(1)–6(A)(4), 8(A)(1)–8(A)(4), 10(A)(1)–10(A)(4), 12(A)(1)–12(A)(4) and 14(A)(1)–14(A)(4) are in the wide-angle end, FIGS. 2(B)(1)–2(B)(4) 4(B)(1)–4(B)(4), 6(B)(1)–6(B)(4), 8(B)(1)–8(B)(4), 10(B)(1)–10(B)(4), 12(B)(1)–12(B)(4), and 14(B)(1)–14(B)(4) are in a middle position, and FIGS. 2(C)(1)–2(C)(4), 4(C)(1)–4(C)(4), 6(C)(1)–6(C)(4), 8(C)(1)–8(C)(4), 10(C)(1)–10(C)(4), and 12(C)(1)–12(C)(4) and 14(C)(1)–14(C)(4) are in the telephoto end. When zooming from the wide-angle side to the telephoto side, all the lens units move axially forward in each of the examples as shown by the figures of the corresponding number suffixed (A)(1)–(A)(4), (B)(1)–(B)(4) and (C)(1)–(C)(4). Again, the relation is such that the separation between the first and second lens units and the separation between the second and third lens units widens, while the separation between the third and fourth lens unit narrows. The second lens unit, lying in between the positive first lens unit and the positive third lens unit, is made up from as few a number of lens elements as 1 to 2, to thereby achieve advance of the compactness and reduction of the cost. The aberrations the second lens unit produces are on the other hand, corrected by the first lens unit or the third lens unit. The third lens unit has the strongest positive refractive power in this zoom lens and bears the image forming function. The fourth lens unit bears the main part of the function of varying the focal length of this zoom lens. For such a zoom lens, letting $M_i$ denote the number of lens members in the i-th lens unit (where for the cemented lens, its constituent lenses are counted as if in broken contact), the numbers of members of the respective lens units are determined so as to satisfy the condition:

$$M_1 = M_2 = 1, \text{ or } 1 \leq M_2 \leq M_1 \leq M_4 \leq M_3 \leq 6.$$

Thus, the total length of the complete lens is shortened and the production cost is suppressed to be low.

Another feature is that in the case of constructing the second lens unit in the form of a single positive lens as shown in the numerical examples 1 to 4, the first lens unit is made to include a positive lens having a convex surface facing the object side. Thus, the production of spherical aberration is suppressed.

In another case, the second lens unit takes the form of a single positive lens having a convex surface facing the image side. By this, the comatic and spherical aberrations are corrected in good balance.

Still another feature is that the third lens unit is made to include at least a negative lens and a positive lens. This makes it possible to correct well chromatic aberrations. Again, the positive lens in the third lens unit is made convex toward the image side. This permits the principal point of the third lens unit to be placed relatively near to the fourth lens unit. As the interval between the principal points of the third and fourth lens units shortens, an increase of the zoom ratio is achieved. A further feature is that the fourth lens unit is made to include a positive lens having a convex surface facing the image side and a negative lens having a concave surface facing the object side in order to correct well chromatic, spherical and comatic aberrations.

Particularly, in a zoom lens comprising, from front to rear, a first lens unit of positive refractive power, a second lens unit of positive refractive power, a third lens unit of positive refractive power and a fourth lens unit of negative refractive power, all the separations between the lens units being varied to effect zooming, wherein the first lens unit includes at least one positive lens having a convex surface facing the object side, the second lens unit is a single positive lens, the third lens unit includes at least one negative lens and at least one positive lens having a convex surface facing the image side, and the fourth lens unit includes at least one positive lens having a convex surface facing the image side and at least one negative lens having a concave surface facing the object side, it is desired for the second lens unit to satisfy the following condition:

$$-0.09 < ((R_{2F}+R_{2R})/(R_{2F}-R_{2R}))(f_W/f_2) < 2.51 \quad (1)$$

where $R_{2F}$ and $R_{2R}$ are the radii of curvature of the front and rear surfaces of the second lens unit, respectively;

$f_W$ is the shortest focal length of the entire lens system; and $f_2$ is the focal length of the second lens unit.

The inequalities (1) give a range for the form of the second lens unit. By making this form satisfied, various aberrations such as spherical aberration and distortion are corrected well. Concretely speaking, when the upper limit of the condition (1) is exceeded, as this means that the second lens unit takes too convex a form toward the image side, and also that its refractive power tends to be strong, considerable under-correction of the spherical aberration results. This is objectionable. When the lower limit is exceeded, as this means that the second lens unit changes its form to the reverse or the convex toward the object side and at the same time its refractive power becomes strong, the distortion for the wide-angle end increases to the plus side objectionably.

In another zoom lens comprising, from front to rear, a first lens unit of positive refractive power, a second lens unit of positive refractive power, a third lens unit of positive refractive power and a fourth lens unit having at lease one positive lens and at least one negative lens and getting a negative refractive power as a whole, the separation between any two of the lens units being varied to effect zooming, it is desired to satisfy the following conditions:

$$1.17 < (\phi_1+\phi_2+\phi_3)/\phi_W < 2.22 \quad (2)$$

$$1.17 < |\phi_4|/\phi_W < 2.22 \quad (3)$$

$$0.23 < (B_1+B_2+B_3)/(f_W \cdot \tan \omega_W) 1.50 \quad (4)$$

$$0.11 < SK_W/TD_W < 0.31 \quad (5)$$

$$1.21 < (TD_W+SK_W)/(f_W \cdot \tan \omega_W) < 3.31 \quad (6)$$

where $\phi i$: the refractive power of the i-th lens unit;

$\phi_W$ and $f_W$: the overall refractive power and the overall focal length of the entire system in the wide-angle end, respectively;

$Bi$: the axial length of the i-th lens unit;

$\omega_W$: the semi-angle of field coverage of the entire lens system in the wide-angle end; and $SK_W$ and $TD_W$: the back focal distance and the physical length of the entire lens system in the wide-angle end.

With the use of the plus-plus-plus-minus arrangement of the lens units in this order from the object side, when the conditions (2) to (6) are satisfied, the size of the lens system is minimized in such a manner that good optical performance is maintained.

The inequalities of conditions (2) and (3) are set to rule the refractive powers of the lens units. When either of the upper limits is exceeded, the compact form is improved, but, as it means that the powers are too large, the variation with zooming of the spherical aberration and coma increases objectionably. Conversely when the lower limit is exceeded, the difficulty of obtaining a compact zoom lens tends to increase.

The inequalities of condition (4) are set to rule the thicknesses of the lens units. When the upper limit of this condition (4) is exceeded, the size of the lens system increases largely. When the lower limit is exceeded, it becomes difficult to correct both of on-axial and off-axial aberrations well at once. To further improve the compact form, the upper limit is preferably altered to 1.01.

The inequalities of condition (5) are set to rule the back focal distance relative to the physical length for the wide-angle end of the entire lens system. When the upper limit of this condition is exceeded, this is advantageous for improving the compact form, but as it means that the physical length of the complete zoom lens is too short, the on-axial and off-axial aberrations become difficult to correct well at once. When the lower limit is exceeded, no compactness results.

The inequalities of condition (6) are set to rule the total length of the lens system. When the upper limit of this condition is exceeded, no compactness results. When the lower limit is exceeded, it becomes difficult to correct the on-axial and off-axial aberrations well.

To achieve a further improvement of the zoom lens of the plus-plus-plus-minus power arrangement, it is recommended to satisfy the following condition:

$$-0.23 < d_{SW}/(f_W \cdot \tan \omega_W) < 0.81 \quad (7)$$

where $d_{SW}$ is the distance from the first lens surface to the stop in the wide-angle end.

The inequalities of condition (7) are concerned with the position of the stop. When the upper limit is exceeded, as this means that the stop takes its place considerably near to the image side, the diameter of the front most lens members increases objectionably. When the lower limit is exceeded, as this means that the stop lies in a relatively front position, the diameter of the front most lens members is advantageously reduced but the off-axial aberrations, particularly distortion in the wide angle end, increase in the plus direction objectionably.

Alternatively, a zoom lens comprises, from front to rear, a first lens unit including at least one positive lens and having a positive refractive power, a second lens unit including at least one negative lens and whose refractive power is negative as a whole, a third lens unit including at least one positive lens and at least one negative lens and having a positive refractive power as a whole, and a fourth lens unit including at least one positive lens and at least one negative lens and having a negative refractive power as a whole, the separations between the individual lens units being varied to effect zooming. For this zoom lens, it is desired to satisfy the following conditions:

$$0.49 < f_3/(f_W \cdot \tan \omega_W) < 3.05 \quad (8)$$

$$0.49 < |f_4|/(f_W \cdot \tan \omega_W) < 3.05 \quad (9)$$

$$0 < d_{2W}/(f_W \cdot \tan \omega_W) < 0.55 \quad (10)$$

$$-1.21 < (d_{2T}-d_{2W})/(d_{3T}-d_{3W}) < 0.21 \quad (11)$$

$$0.11 < B_3/f_W < 0.61 \tag{12}$$

where $f_3$ and $f_4$: the focal lengths of the third and fourth lens units, respectively;

$f_W$ and $F_T$: the shortest and longest focal lengths of the entire lens system, respectively;

$\omega_W$: the semi-angle of field coverage of the entire lens system in the wide-angle end;

$d_{2W}$ and $d_{2T}$: the axial separations between the second and third lens units in the wide-angle and telephoto ends, respectively;

$d_{3W}$ and $d_{3T}$: the axial separations between the third and fourth lens units in the wide-angle and telephoto ends, respectively; and $B_3$: the axial length of the third lens unit.

The inequalities of conditions (8) and (9) give ranges for the focal lengths of the third and fourth lens units, respectively. When either of the lower limits is exceeded, an improvement of the compact form results, but, as it means that the refractive powers are too large, the variation with zooming of spherical aberration and coma increases objectionably. Conversely when the upper limit is exceeded, it becomes difficult to get the zoom lens in the compact form.

The inequalities of condition (10) are concerned with the ratio of the separation between the second and third lens units to the focal length and image angle of the entire system in the wide-angle end. When the upper limit is exceeded, as this means that the separation between the second and third lens units is too long, the complete zoom lens gets its physical length increased largely. So, regardless of wherever the stop may take its place in the entire lens system, it becomes difficult to simultaneously minimize the diameters of the front most and rearmost lens surfaces. When the separation between the second and third lens units is too short beyond the upper limit, it will often happen that the second and third lens units mechanically interfere with each other. This should be avoided.

The factor in the condition (11) represents the ratio of the varied separation between the second and third lens units to the varied separation between the third and fourth lens units. When the upper limit is exceeded, the separation between the second and third lens units varies to very large extent during zooming. As a result, the second and third lens units are too far away from each other when zoomed to the wide-angle end. Thus, they get large diameters. When the lower limit is exceeded, as this means that the separation between the second and third lens units is too long in the telephoto end, the amount of zooming movement of the first lens unit increases largely. To allow a high range to be obtained, the physical length for the telephoto end of the complete zoom lens has to be made objectionably long.

The inequalities of condition (12) are concerned with the thickness of the third lens unit. When it is thicker than the upper limit, the entire lens system becomes large in size. When it is thinner than the lower limit, it becomes difficult to correct on-axial and off-axial aberrations in good balance. To further improve the compact form, it is desirable to alter the upper limit to about 0.51.

Particularly in a case where the second lens unit is constructed to have a negative refractive power, it is desired to satisfy the following conditions:

$$0 < d_{2W}/(f_W \cdot \tan \omega_W) < 0.55 \tag{13}$$

$$0.11 < B_3/f_W < 0.61 \tag{14}$$

$$-2.51 < ((R_{2F}+R_{2R})/(R_{2F}-R_{2R})) \cdot (f_W/|f_2|) < 2.51 \tag{15}$$

The inequalities of condition (13) are concerned with the ratio of the separation between the second and third lens units to the focal length and image angle of the entire system in the wide-angle end. When the upper limit is exceeded, as this means that the separation between the second and third lens units is too long, the physical length of the complete zoom lens increases greatly. It is, therefore, difficult to minimize the diameters of the front most and rearmost lens members at once, no matter where the stop may take its place in the entire lens system. When the lower limit is exceeded, as this means that the separation between the second and third lens units is too short, the second and third lens units mechanically interfere with each other. This should be avoided.

The inequalities of condition (14) are concerned with the thickness of the third lens unit. When the third lens unit is thicker than the upper limit, the lens system becomes large in size. When it is thinner than the lower limit, it becomes difficult to correct on-axial and off-axial aberrations in good balance. To further improve the compact form, it is desirable to alter the upper limit to about 0.51.

When the upper limit of the condition (15) is exceeded, the lens constituting the second lens unit takes the concave form toward the image side and its refractive power tends to be strong. Therefore, the distortion for the wide-angle end increases in the plus sense objectionably. When the lower limit is exceeded, the form changes to the opposite or concave shape toward the object side, and its refractive power tends to be strong. So, over-correction of spherical aberration results.

For all its numerical examples, the invention sets forth the following additional conditions for the optical parameters:

$$0.011 < 1/v_{3N} - 1/v_{3P} \tag{16}$$

$$0.011 < 1/v_{4P} - 1/v_{4N} \tag{17}$$

$$-3.42 < f_W/R_{1F} < 3.58 \tag{18}$$

$$-2.42 < f_W/R_{1R} < 2.58 \tag{19}$$

$$-1.26 < f_W \cdot \tan \omega_W/R_{4F} < 0.11 \tag{20}$$

$$-0.67 < f_W \cdot \tan \omega_W/R_{4R} < 0.33 \tag{21}$$

where $v_{3N}$: the Abbe number of at least one negative lens in the third lens unit;

$v_{3P}$: the Abbe number of at least one positive lens in the third lens unit;

$v_{4P}$: the Abbe number of at least one positive lens in the fourth lens unit;

$v_{4N}$: the Abbe number of at least one negative lens in the fourth lens unit;

$R_{iF}$: the radius of curvature of the front most lens surface in the i-th lens unit; and $R_{iR}$: the radius of curvature of the rearmost lens surface in the i-th lens unit.

When the Abbe number difference is smaller than the lower limit of the condition (16), it becomes difficult to correct the third lens unit for longitudinal chromatic aberration.

When the Abbe number difference is smaller than the lower limit of the condition (17), it becomes difficult to correct lateral chromatic aberration over the entire zooming range.

When the upper limit of the condition (18) is exceeded, as this means that the first surface has its curvature too strong convex toward the object side, the back focal distance becomes short and the diameter of the last lens member increases largely. Moreover, distortion for the wide-angle end increases in the plus sense greatly. Conversely when the lower limit is exceeded, objectionable over-correction of spherical aberration results.

When the upper limit of the condition (19) is exceeded, as this means that this surface has almost no positive refractive power, the other lens surfaces in the first lens unit must be strengthened in the positive refractive power in order to make the first lens unit up to a predetermined focal length. Accordingly, when performing good correction of aberrations, a necessity to increase the number of lens elements arises. When the lower limit is exceeded, under-correction of spherical aberration results.

When the upper limit of the condition (20) is exceeded, the fourth lens units has its front principal point moved to the image side, causing the interval between the principal points of the third and fourth lens units to increase in the telephoto end. This is disadvantageous to the increase of the zooming range. When the lower limit is exceeded, variation with zooming of coma increases largely. For a more desired result, it is recommended to alter the lower limit to about −1.10.

When the upper limit of the condition (21) is exceeded, distortion for the wide-angle end is considerably over-corrected. When the lower limit is exceeded, the back focal distance becomes short and the last lens member becomes large in diameter.

To achieve much desired improvements, it is recommended that the lens units have their numbers of lens elements in the relationships: $M_1 < M_4$, and $M_4 < M_3$ and $M_3 \leq 4$.

The stop may otherwise be arranged either in the front most position of the third lens unit, or in an almost middle position within the third lens unit.

Next, numerical examples 1 to 7 of the invention are shown. In the numerical data for the examples 1 to 7, Ri is the radius of curvature of the i-th lens surface when counted from the object side; Di is the i-th lens thickness or air separation when counted from the object side; and Ni and vi are respectively the refractive index and Abbe number of the glass of the i-th lens element when counted from the object side.

The shape of an aspheric surface is expressed in the coordinates with an X axis in the axial direction and an H axis in the direction perpendicular to the optical axis, the direction in which light advances being taken as positive, by the following equation:

$$X = (1/R)H^2/(1 + \sqrt{1 - (H/R)^2}\,) + AH^2 + BH^4 + CH^6 + DH^8 + EH^{10}$$

where R is the radius of the osculating sphere, and A, B, C, D and E are the aspheric coefficients.

The values of the factors in the above-stated conditions (1) to (21) for the numerical examples 1 to 7 are listed in Table-1 below.

TABLE 1

| Numerical Example | 1 | 2 | 3 | 4 | 5 | 6 | 7 |
|---|---|---|---|---|---|---|---|
| $\dfrac{R_{2F} + R_{2R}}{R_{2F} - R_{2R}} \cdot \dfrac{f_W}{f_2}$ | 1.45 | 2.12 | 2.40 | −0.03 | 0.54 | 0.62 | 1.53 |
| $(\phi_1 + \phi_2 + \phi_3)/\phi_W$ | 1.74 | 1.69 | 1.74 | 1.71 | 1.66 | 1.39 | 1.60 |
| $|\phi_4|\phi_W$ | 1.56 | 1.52 | 1.56 | 1.47 | 1.54 | 1.39 | 1.56 |
| $(B_1 + B_2 + B_3)/(f_W \cdot \tan \omega_W)$ | 0.76 | 0.78 | 0.76 | 0.76 | 0.82 | 0.80 | 0.70 |
| $SK_W/TD_W$ | 0.15 | 0.15 | 0.15 | 0.16 | 0.17 | 0.13 | 0.16 |
| $(TD_W + SK_2)/f_W \cdot \tan \omega_W)$ | 2.39 | 2.45 | 2.43 | 2.43 | 2.52 | 2.45 | 2.36 |
| $dS_W/(f_W \cdot \tan \omega_W)$ | 0.30 | 0.33 | 0.31 | 0.32 | 0.40 | 0.39 | 0.34 |
| $d_{2W}/(f_W \cdot \tan \omega_W)$ | 0.19 | 0.20 | 0.20 | 0.22 | 0.27 | 0.27 | 0.30 |
| $B_3/f_W$ | 0.31 | 0.30 | 0.30 | 0.29 | 0.32 | 0.34 | 0.29 |
| $f_3/(f_W \cdot \tan \omega_W)$ | 1.69 | 1.82 | 1.82 | 1.63 | 1.37 | 1.17 | 1.28 |
| $|f_4|/(f_W \cdot \tan \omega_W)$ | 1.13 | 1.19 | 1.16 | 1.23 | 1.18 | 1.20 | 1.16 |
| $(d_{2T} - \phi d_{2W})/(d_{3T} - d_{3W})$ | −0.20 | −0.17 | −0.18 | −0.29 | −0.16 | −0.17 | −0.79 |
| $0.011 < \dfrac{1}{v_{3N}} - \dfrac{1}{v_{3P}}$ | 0.025 | 0.025 | 0.025 | 0.025 | 0.025 | 0.022 | 0.025 |
| $0.011 < \dfrac{1}{v_{4P}} - \dfrac{1}{v_{4N}}$ | 0.024 | 0.024 | 0.024 | 0.024 | 0.024 | 0.024 | 0.021 |
| $f_W/R_{1F}$ | −1.10 | −1.09 | −1.23 | −0.60 | −0.62 | −0.70 | 2.17 |
| $f_W/R_{1R}$ | −0.44 | −0.42 | −0.49 | −0.12 | −0.29 | −0.21 | 0.45 |
| $f_W \cdot \tan \omega_W/R_{4F}$ | −0.94 | −0.89 | −0.94 | −0.90 | −0.78 | −0.92 | −1.01 |
| $f_W \cdot \tan \omega_W/R_{4R}$ | −0.28 | −0.18 | −0.16 | −0.36 | −0.16 | −0.01 | −0.24 |

NUMERICAL EXAMPLE 1

Numerical Example 1 f = 38.12–107.19   Fno. = 1: 3.73–8.28   2ω = 59.2°–22.8°

| R1 = −34.798 | D1 = 1.20 | N1 = 1.80518 | v1 = 25.4 |
| R2 = −84.318 | D2 = 0.15 | | |
| R3 = 35.591 | D3 = 1.90 | N2 = 1.71300 | v2 = 53.8 |
| R4 = −86.953 | D4 = Variable | | |
| R5 = −37.320 | D5 = 1.20 | N3 = 1.60311 | v3 = 60.7 |
| R6 = −32.030 | D6 = 0.70 | | |
| R7 = (Stop) | D7 = Variable | | |
| R8 = −16.527 | D8 = 0.80 | N4 = 1.6031t | v4 = 60.7 |
| R9 = 26.302 | D9 = 0.95 | | |
| R10 = 19.051 | D10 = 2.50 | N5 = 1.80518 | v5 = 25.4 |
| R11 = 512.458 | D11 = 1.48 | | |
| R12 = 25.542 | D12 = 1.00 | N6 = 1.84666 | v6 = 23.8 |
| R13 = 10.340 | D13 = 5.20 | N7 = 1.58313 | v7 = 59.4 |
| R14 = −19.055 | D14 = Variable | | |
| R15 = −23.107 | D15 = 2.60 | N8 = 1.84666 | v8 = 23.8 |
| R16 = −17.072 | D16 = 0.20 | | |

-continued

| | | | |
|---|---|---|---|
| R17 = −22.179 | D17 = 1.30 | N9 = 1.69680 | ν9 = 55.5 |
| R18 = 175.187 | D18 = 3.69 | | |
| R19 = −20.279 | D19 = 1.50 | N10 = 1.69680 | ν10 = 55.5 |
| R20 = −76.626 | | | |

| Variable | Focal Length | | |
|---|---|---|---|
| Separation | 38.12 | 80.00 | 107.19 |
| D4 | 1.24 | 9.49 | 13.06 |
| D7 | 3.50 | 6.22 | 6.01 |
| D14 | 13.81 | 3.86 | 1.06 |

| R14: Aspheric | | | |
|---|---|---|---|
| A | B | C | D |
| −3.20745D-05 | 4.45969D-05 | 2.48125D-07 | −2.33496D-09 |

NUMERICAL EXAMPLE 2

| f = 39.14–106.8 | Fno. = 1: 4.04–8.28 | | 2ω = 57.9°–22.9° |
|---|---|---|---|
| R1 = −35.955 | D1 = 1.20 | N1 = 1.80518 | ν1 = 25.4 |
| R2 = −90.693 | D2 = 0.15 | | |
| R3 = 34.373 | D3 = 2.52 | N2 = 1.71300 | ν2 = 53.8 |
| R4 = −92.665 | D4 = Variable | | |
| R5 = −23.875 | D5 = 1.20 | N3 = 1.51633 | ν3 = 64.2 |
| R6 = −21.873 | D6 = 0.53 | | |
| R7 = (Stop) | D7 = Variable | | |
| R8 = −16.810 | D8 = 0.80 | N4 = 1.58913 | ν4 = 61.2 |
| R9 = 27.360 | D9 = 0.81 | | |
| R10 = 19.858 | D10 = 2.24 | N5 = 1.80518 | ν5 = 25.4 |
| R11 = 498.430 | D11 = 1.80 | | |
| R12 = 25.311 | D12 *= 1.00 | N6 = 1.84666 | ν6 = 23.8 |
| R13 = 10.594 | D13 = 5.20 | N7 = 1.58313 | ν7 = 59.4 |
| R14 = −20.834 | D14 = Variable | | |
| R15 = −24.241 | D15 = 2.80 | N8 = 1.84666 | ν8 = 23.8 |
| R16 = −17.975 | D16 = 0.28 | | |
| R17 = −22.927 | D17 = 1.30 | N9 = 1.69680 | ν9 = 55.5 |
| R18 = −124.980 | D18 = 3.26 | | |
| R19 = −22.468 | D19 = 1.50 | N10 = 1.69680 | ν10 = 55.5 |
| R20 = −122.192 | | | |

| Variable | Focal Length | | |
|---|---|---|---|
| Separation | 39.14 | 80.01 | 106.80 |
| D4 | 1.44 | 9.27 | 12.35 |
| D7 | 3.73 | 6.04 | 6.03 |
| D14 | 14.53 | 4.12 | 1.12 |

| R14: Aspheric | | | |
|---|---|---|---|
| A | B | C | D |
| 0 | 3.77729D-05 | 2.37906D-07 | −3.05853D-09 |

NUMERICAL EXAMPLE 3

| f = 39.14–106.8 | Fno. = 1: 4.10–8.28 | | 2ω = 57.9°–22.9° |
|---|---|---|---|
| R1 = −31.762 | D1 = 1.20 | N1 = 1.80518 | ν1 = 35.4 |
| R2 = −68.184 | D2 = 0.15 | | |
| R3 = 34.373 | D3 = 2.23 | N2 = 1.71300 | ν2 = 53.8 |
| R4 = −80.120 | D4 = Variable | | |
| R5 = −22.044 | D5 = 1.20 | N3 = 1.51633 | ν3 = 64.2 |
| R6 = −20.428 | D6 = 0.48 | | |
| R7 = (Stop) | D7 = Variable | | |
| R8 = −15.254 | D8 = 0.80 | N4 = 1.58913 | ν4 = 61.2 |
| R9 = 46.823 | D9 = 2.79 | N5 = 1.80518 | ν5 = 25.4 |
| R10 = −56.423 | D10 = 2.30 | | |
| R11 = 29.576 | D11 = 1.00 | N6 = 1.84666 | ν6 = 23.8 |
| R12 = 12.817 | D12 = 4.80 | N7 = 1.58313 | ν7 = 59.4 |
| R13 = −18.966 | D13 = Variable | | |
| R14 = −22.913 | D14 = 2.80 | N8 = 1.84666 | ν8 = 23.8 |
| R15 = −17.489 | D15 = 0.25 | | |
| R16 = −22.410 | D16 = 1.30 | N9 = 1.69680 | ν9 = 55.5 |
| R17 = −110.884 | D17 = 3.12 | | |
| R18 = −22.530 | D18 = 1.50 | N10 = 1.69680 | ν10 = 55.5 |
| R19 = −132.448 | | | |

| Variable | Focal Length | | |
|---|---|---|---|
| Separation | 39.14 | 80.01 | 106.80 |
| D4 | 1.47 | 8.96 | 11.98 |
| D7 | 3.79 | 6.17 | 6.11 |
| D13 | 14.45 | 4.19 | 1.20 |

| R13: Aspheric | | | |
|---|---|---|---|
| A | B | C | D |
| 0 | 1.49015D-05 | 2.66283D-07 | −4.77134D-09 |

NUMERICAL EXAMPLE 4

| f = 39.26–106.39 | Fno. = 1: 4.11–8.28 | | 2ω = 57.7°–22.9° |
|---|---|---|---|
| R1 = −65.421 | D1 = 1.20 | N1 = 1.80518 | ν1 = 25.4 |
| R2 = −269.332 | D2 = 0.15 | | |
| R3 = 30.810 | D3 = 2.36 | N2 = 1.60311 | ν2 = 60.7 |
| R4 = −334.589 | D4 = Variable | | |
| R5 = 271.854 | D5 = 1.20 | N3 = 1.49171 | ν3 = 57.4 |
| R6 = −452.343 | D6 = 1.16 | | |
| R7 = (Stop) | D7 = Variable | | |
| R8 = −14.877 | D8 = 0.82 | N4 = 1.51633 | ν4 = 64.2 |
| R9 = 40.105 | D9 = 1.30 | | |
| R10 = 26.105 | D10 = 1.98 | N5 = 1.80518 | ν5 = 25.4 |
| R11 = −75.391 | D11 = 1.48 | | |
| R12 = −46 177 | D12 = 1.00 | N6 = 1.84666 | ν6 = 23.8 |
| R13 = −12.039 | D13 = 4.96 | N7 = 1.58313 | ν7 = 59.4 |
| R14 = −18.620 | D14 = Variable | | |
| R15 = −23.928 | D15 = 2.60 | N8 = 1.84666 | ν8 = 23.8 |
| R16 = −17.982 | D16 = 0.19 | | |
| R17 = −26.178 | D17 = 1.30 | N9 = 1.69680 | ν9 = 55.5 |
| R18 = −415.880 | D18 = 4.06 | | |
| R19 = 19 798 | D19 = 1.50 | N10 = 1.69680 | ν10 = 55.5 |
| R20 = −59.681 | | | |

| Variable | Focal Length | | |
|---|---|---|---|
| Separation | 39.14 | 80.01 | 106.80 |
| D4 | 0.80 | 3.30 | 14.26 |
| D7 | 3.62 | 5.49 | 7.35 |
| D13 | 13.75 | 8.42 | 0.79 |

| R14: Aspheric | | | |
|---|---|---|---|
| A | B | C | D |
| 0 | 3.04430D-05 | 1.27917D-07 | −1.51041D-09 |

NUMERICAL EXAMPLE 5

| f = 39.26–106.39 | Fno. = 1: 3.89–8.28 | | 2ω = 57.7°–23.0° |
|---|---|---|---|
| R1 = −62.990 | D1 = 1.20 | N1 = 1.80518 | ν1 = 25.4 |
| R2 = −186.038 | D2 = 0.15 | | |
| R3 = 24.637 | D3 = 2.87 | N2 = 1.48749 | ν2 = 70.2 |
| R4 = −136.398 | D4 = Variable | | |
| R5 = 144.234 | D5 = 1.00 | N3 = 1.51633 | ν3 = 64.2 |
| R6 = 50.230 | D6 = 2.58 | | |
| R7 = (Stop) | D7 = Variable | | |
| R8 = −15.678 | D8 = 0.80 | N4 = 1.48749 | ν4 = 70.2 |
| R9 = 53.939 | D9 = 1.64 | | |
| R10 = 21.151 | D10 = 1.88 | N5 = 1.80518 | ν5 = 25.4 |
| R11 = 433.396 | D11 = 2.02 | | |
| R12 = 27.232 | D12 = 1.00 | N6 = 1.84666 | ν6 = 23.8 |

-continued f = 39.26–106.39    Fno. = 1: 3.89–8.28    2ω = 57.7°–23.0°

| | | | |
|---|---|---|---|
| R13 = 10.876 | D13 = 5.22 | N7 = 1.58313 | v7 = 59.4 |
| R14 = −22.514 | D14 = Variable | | |
| R15 = −27.749 | D15 = 2.60 | N8 = 1.84666 | v8 = 23.8 |
| R16 = −20.157 | D16 = 0.20 | | |
| R17 = −29.163 | D17 = 1.30 | N9 = 1.69680 | v9 = 55.5 |
| R18 = 73733.961 | D18 = 3.48 | | |
| R19 = −22.636 | D19 = 1.50 | N10 = 1.69680 | v10 = 55.5 |
| R20 = −134.051 | | | |

| Variable | Focal Length | | |
|---|---|---|---|
| Separation | 39.14 | 80.01 | 106.80 |
| D4 | 0.80 | 7.17 | 10.95 |
| D7 | 3.34 | 3.70 | 5.24 |
| D14 | 12.96 | 6.11 | 0.79 |

| R14: Aspheric | | | |
|---|---|---|---|
| A | B | C | D |
| 0 | 5.34714D-05 | 6.61108D-08 | −7.34139D-10 |

NUMERICAL EXAMPLE 6 f = 36.11–101.58    Fno. = 1: 3.87–8.29    2ω = 61.9°–24°

| | | | |
|---|---|---|---|
| R1 = −51.746 | D1 = 1.20 | N1 = 1.80518 | v1 = 25.4 |
| R2 = −148.929 | D2 = 0.15 | | |
| R3 = 28.469 | D3 = 2.77 | N2 = 1.60311 | v2 = 60.7 |
| R4 = −171.588 | D4 = Variable | | |
| R5 = 664.184 | D5 = 1.00 | N3 = 1.48749 | v3 = 70.2 |
| R6 = 29.527 | D6 = 2.60 | | |
| R7 = (Stop) | D7 = Variable | | |
| R8 = −13.837 | D8 = 0.80 | N4 = 1.48749 | v4 = 70.2 |
| R9 = −56.653 | D9 = 0.73 | | |
| R10 = 19.774 | D10 = 2.05 | N5 = 1.80518 | v5 = 25.4 |
| R11 = 267.805 | D11 = 2.11 | | |
| R12 = 30.993 | D12 = 0.98 | N6 = 1.80518 | v6 = 25.4 |
| R13 = 9.562 | D13 = 5.56 | N7 = 1.58313 | v7 = 59.4 |
| R14 = −22.733 | D14 = Variable | | |
| R15 = −23.622 | D15 = 2.80 | N8 = 1.84666 | v8 = 23.8 |
| R16 = −17.496 | D16 = 0.18 | | |
| R17 = −23.624 | D17 = 1.35 | N9 = 1.69680 | v9 = 55.5 |
| R18 = −207.051 | D18 = 2.78 | | |
| R19 = −28.694 | D19 = 1.55 | N10 = 1.69680 | v10 = 55.5 |
| R20 = −1961.185 | | | |

| Variable | Focal Length | | |
|---|---|---|---|
| Separation | 36.11 | 58.97 | 101.58 |
| D4 | 0.80 | 8.84 | 13.98 |
| D7 | 3.20 | 4.85 | 5.49 |
| D14 | 14.10 | 6.71 | 0.87 |

| R14: Aspheric | | | |
|---|---|---|---|
| A | B | C | D |
| 0 | 5.79115D-05 | 1.52487D-07 | −4.84236D-09 |

NUMERICAL EXAMPLE 7 f = 36.11–101.58    Fno. = 1: 3.87–8.29    2ω = 61.9°–24°

| | | | |
|---|---|---|---|
| R1 = 18.078 | D1 = 2.51 | N1 = 1.48749 | v1 = 70.2 |
| R2 = 87.432 | D2 = Variable | | |
| R3 = 72.989 | D3 = 1.00 | N2 = 1.80518 | v2 = 25.4 |
| R4 = 28.479 | D4 = 3.00 | | |
| R5 = (Stop) | D5 = Variable | | |
| R6 = −13.896 | D6 = 0.80 | N3 = 1.48749 | v3 = 70.2 |
| R7 = 44.683 | D7 = 0.3Q | | |
| R8 = 21.066 | D8 = 2.08 | N4 = 1.80518 | v4 = 25.4 |
| R9 = −165.610 | D9 = 1.99 | | |

-continued f = 36.11–101.58    Fno. = 1: 3.87–8.29    2ω = 61.9°–24°

| | | | |
|---|---|---|---|
| R10 = 23.570 | D10 = 1.00 | N5 = 1.84666 | v5 = 23.8 |
| R11 = 10.341 | D11 = 5.41 | N6 = 1.58313 | v6 = 59.4 |
| R12 = −21.866 | D12 = Variable | | |
| R13 = −21.457 | D13 = 2.70 | N7 = 1.80518 | v7 = 25.4 |
| R14 = −16.53b | D14 = 0.15 | | |
| R15 = −23.887 | D15 = 1.30 | N8 = 1.69680 | v8 = 55.5 |
| R16 = −173.494 | D16 = 3.34 | | |
| R17 = −21.396 | D17 = 1.50 | N9 = 1.69680 | v9 = 55.5 |
| R18 = −90.563 | | | |

| Variable | Focal Length | | |
|---|---|---|---|
| Separation | 39.32 | 62.96 | 106.37 |
| D4 | 0.80 | 3.70 | 4.87 |
| D7 | 3.45 | 6.88 | 13.00 |
| D14 | 12.91 | 5.90 | 0.77 |

| R12: Aspheric | | | |
|---|---|---|---|
| A | B | C | D |
| 0 | 6.18066D-05 | 1.71741D-07 | −2.05821D-09 |

It will be appreciated from this embodiment that the first lens unit is made constructed with the negative lens and the positive lens arranged in this order from the object side, thereby giving an advantage of increasing the degree of freedom on correction of the chromatic aberrations of the first lens unit in itself. This leads to make it easy to carry out aberration correction by the third and fourth lens units.

The construction of the second lens unit in the form of a single lens is very advantageous for improving the minimization of the bulk and size. So, this feature contributes to a much desired result.

To construct the third lens unit, it is preferred that a lens $L_{3N}$ of negative refractive power is arranged in a relatively front position, and a lens $L_{3P}$ of positive refractive power is arranged in a relatively rear position, and further that an additional negative lens is cemented to the front of the lens $L_{3P}$, and an additional positive lens is arranged in between the lenses $L_{3N}$ and $L_{3P}$.

Focusing is performed by moving only one of the first, third and fourth lens units. This method is favorable to simplify the structure of the operating mechanism. Another lens unit may be used in combination, although the simplicity of structure of the mechanism is somewhat sacrificed.

An improved embodiment over the foregoing embodiment is described below. FIGS. 15(A), 15(B) and 15(C), FIGS. 16(A), 16(B) and 16(C), FIGS. 17(A), 17(B) and 17(C) show the longitudinal cross-section forms of numerical examples 8, 9 and 10 of zoom lenses, respectively. FIGS. 15(A), 16(A) and 17(A) are in the wide-angle end, FIGS. 15(B), 16(B) and 17(B) in a middle position and FIGS. 15(C), 16(C) and 17(C) in the telephoto end. The zoom lens comprises, from front to rear, a positive first lens unit I, a positive second lens unit II, a positive third lens unit III and a negative fourth lens unit IV, all the air separations between the lens units being varied to effect zooming, wherein the fourth lens unit is constructed with two members of which the first is a positive meniscus lens convex toward the image side and the second is a negative lens, and the front surface is concave toward the object side. This type of zoom lens has a tendency to produce distortion of plus type in a region of from the wide-angle end to the middle position. To correct this distortion, it is desired that the first lens unit has its first surface made concave. To make a compact system, the thickness of a block containing the fourth lens unit is desired to be short. Nonetheless, good correction of aberrations is done, when the fourth lens unit is made by the above-described construction and arrangement of the lens members.

To improve the compact form, what is effective is to decrease the thickness of a block containing the second lens unit. Thus, it is desired to satisfy the following condition:

$$D_2/f_W < 0.05 \quad (22)$$

where $D_2$ is the axial thickness of the second lens unit.

For the purpose of performing good correction of aberrations, it is recommended that the third lens unit is constructed with a negative lens whose front surface is concave, a positive lens whose front surface is convex, a negative lens and a positive lens of bi-convex form, totaling four lenses.

The first lens unit is made up from the two lenses of minus-plus arrangement. A stop is positioned adjacent the second lens unit. The second lens unit is made up from one positive meniscus lens. With the help of these, the diameter of the front lens members can be minimized.

To achieve further improvements of the aberration correction, it is desired to satisfy the following condition:

$$0.5 < ra/rb < 1 \quad (23)$$

where ra: the radius of curvature of the rear surface of the positive meniscus lens in the fourth lens unit; and rb: the radius of curvature of the front surface of the negative lens in the fourth lens unit.

The technical significance of each of the conditions (22) and (23) is described below.

The inequality (22) is concerned with the block thickness of the second lens unit. When the second lens unit is thicker than the upper limit of the inequality (22), as this means that the first lens unit is too far away from the stop, the diameter of the front lens members increases objectionably.

The inequalities (23) are concerned with the ratio of the radii of curvature of the rear surface of the positive lens and the front surface of the negative lens in the fourth lens unit. When the lower limit of the inequalities (23) is exceeded, as this means that the rear surface of the positive lens is too tight in curvature, coma flare at or near the wide-angle end increases largely. This is not desirable. When the curvature of the rear surface of the positive lens is too loose beyond the upper limit, the back focal distance for the wide-angle end becomes short and the diameter of the rear lens members increases largely. This is not desirable.

Referring to FIGS. 15(A), 15(B) and 15(C) to 17(A), 17(B) and 17(C), when zooming from the wide-angle end to the telephoto end, the air spacings are varied in such a manner that the separation between the first and second lens units increases and the separation between the third and fourth lens units decreases, as all the lens units axially move forward.

Since the rules of design for the construction and power arrangement of the lens units are also appropriately set forth, a lens system which, though having as high a range as about 3, gets an ultracompact form, while still permitting good correction of aberrations to be achieved, is realized.

In the examples of this embodiment of the invention, the form and the construction of the elements of each lens unit are as follows: The first lens unit comprises a negative lens of meniscus form concave toward the object side, and a positive lens of bi-convex form, totaling two lenses. The second lens unit comprises only one lens which is positive and has the meniscus form convex toward the image side. The stop is positioned on the image side of the second lens unit. The third lens unit comprises a bi-concave lens, a positive lens whose front surface is tighter in curvature, and a cemented lens consisting of a negative meniscus lens convex toward the object side and a bi-convex lens, totaling four lenses. The fourth lens unit comprises a positive meniscus lens convex toward the image side and a biconcave lens whose front surface is tighter in curvature, totaling two lenses.

Next, numerical examples 8 to 10 of the invention are shown. In the numerical data for the examples 8 to 10, Ri is the radius of curvature of the i-th lens surface when counted from the object side; Di is the i-th axial thickness or air separation when counted from the object side; and Ni and νi are respectively the refractive index and Abbe number of the glass of the i-th lens element when counted from the object side.

The aspheric coefficients A, B, C, D and E are given by the following equation:

$$X = (h^2/R)/(1 + \sqrt{1 - (1+K)(h/R)^2}\ ) +$$

$$Ah^2 + Bh^4 + Ch^6 + Dh^8 + Eh^{10}$$

where X is the amount of axial deviation from the vertex of the lens, h is the height from the optical axis and R is the radius of curvature.

NUMERICAL EXAMPLE 8

| f = 39.5–106.0 | Fno. = 1: 3.9–8.2 | | 2ω = 57.4°–23.1° |
|---|---|---|---|
| R1 = −40.812 | D1 = 1.2.0 | νN1 = 1.80518 | ν1 = 25.4 |
| R2 = −134.120 | D2 = 0.15 | | |
| R3 = 38.199 | D3 = 2.30 | N2 = 1.71300 | ν2 = 53.8 |
| R4 = −67.729 | D4 = Variable | | |
| R5 = −26.178 | D5 = 1.20 | N3 = 1.60311 | ν3 = 60.7 |
| R6 = −24.169 | D6 = 0.70 | | |
| R7 = 0.000 (Stop) | D7 = Variable | | |
| R8 = −16.303 | D8 = 0.80 | N4 = 1.60311 | ν4 = 60.7 |
| R9 = 27.958 | D9 = 0.93 | | |
| R10 = 19.562 | D10 = 2.50 | N5 = 1.84666 | ν5 = 23.8 |
| R11 = 207.838 | D11 = 1.71 | | |
| R12 = 27.870 | D12 = 1.00 | N6 = 1.84666 | ν6 = 23.8 |
| R13 = 10.519 | D13 = 5.17 | N7 = 1.58313 | ν7 = 59.4 |
| R14 = −19.977 | D14 = Variable | | |
| R15 = −19.484 | D15 = 2.60 | N8 = 1.84666 | ν8 = 23.8 |
| R16 = −15.781 | D16 = 1.54 | | |
| R17 = −16.814 | D17 = 1.30 | N9 = 1.71300 | ν9 = 53.8 |
| R18 = 920.971 | | | |

R14: Aspheric
  Paraxial R −1.99773 ×10
    B −3.20541 × $10^{-5}$
    C  3.07948 × $10^{-5}$
    D  2.30241 × $10^{-7}$
    E −2.37021 × $10^{-9}$

| Variable | Focal Length | | |
|---|---|---|---|
| Separation | 36.11 | 58.97 | 101.58 |
| D4 | 1.00 | 10.40 | 12.07 |
| D7 | 3.77 | 3.22 | 4.62 |
| D14 | 17.60 | 5.56 | 0.88 |

NUMERICAL EXAMPLE 9

| f = 39.3–106.2 | Fno. = 1: 3.9–8.2 | 2ω = 57.7°–23.0° |
|---|---|---|

| | | | |
|---|---|---|---|
| R1 = −27.937 | D1 = 1.20 | N1 = 1.80518 | ν1 = 25.4 |
| R2 = −55.917 | D2 = 0.15 | | |
| R3 = 51.951 | D3 = 2.30 | N2 = 1.71300 | ν2 = 53.8 |
| R4 = −44.95i | D4 = Variable | | |
| R5 = −18.764 | D5 = 1.20 | N3 = 1.60311 | ν3 = 60.7 |
| R6 = −17.881 | D6 = 0.70 | | |
| R7 = 0.000 (Stop) | D7 = Variable | | |
| R8 = −15.571 | D8 = 0.80 | N4 = 1.51633 | ν4 = 64.2 |
| R9 = 27.436 | D9 = 0.93 | | |
| R10 = 21.690 | D10 = 2.50 | N5 = 1.84666 | ν5 = 23.8 |
| R11 = 253.918 | D11 = 1.71 | | |
| R12 = 34.686 | D12 = 1.00 | N6 = 1.84666 | ν6 = 23.8 |
| R13 = 11.793 | D13 = 5.17 | N7 = 1.58313 | ν7 = 59.4 |
| R14 = −19.913 | D14 = Variable | | |
| R15 = −21.840 | D15 = 2.60 | N8 = 1.84666 | ν8 = 23.8 |
| R16 = −16.511 | D16 = 1.54 | | |
| R17 = −17.188 | D17 = 1.30 | N9 = 1.77250 | ν9 = 49.6 |
| R18 = 2387.460 | | | |

R14: Aspheric
Paraxial R −1.99125 × 10
B −3.20541 × $10^5$
C 2.16010 × $10^5$
D 2.30241 × $10^7$
E −2.37021 × $10^9$

| Variable | Focal Length | | |
|---|---|---|---|
| Separation | 36.11 | 58.97 | 101.58 |
| D4 | 1.30 | 8.81 | 10.78 |
| D7 | 3.94 | 4.25 | 5.19 |
| D14 | 18.12 | 5.60 | 1.01 |

NUMERICAL EXAMPLE 10

| f = 39.3–106.3 | Fno. = 1: 3.9–8.2 | 2ω = 57.6°–23.0° |
|---|---|---|

| | | | |
|---|---|---|---|
| R1 = −47.903 | D1 = 1.20 | N1 = 1.84666 | ν1 = 23.8 |
| R2 = −145.503 | D2 = 0.15 | | |
| R3 = 39.074 | D3 = 2.30 | N2 = 1.69680 | ν2 = 55.5 |
| R4 = −74.902 | D4 = Variable | | |
| R5 = −13.834 | D5 = 1.20 | N3 = 1.51633 | ν3 = 64.2 |
| R6 = −13.829 | D6 = 0.70 | | |
| R7 = 0.000 (Stop) | D7 = Variable | | |
| R8 = −16.903 | D8 = 0.80 | N4 = 1.48749 | ν4 = 70.2 |
| R9 = 25.980 | D9 = 0.93 | | |
| R1 = 21.287 | D10 = 2.50 | N5 = 1.84666 | ν5 = 23.8 |
| R11 = 121.182 | D11 = 1.71 | | |
| R12 = 29.815 | D12 = 1.00 | N6 = 1.84666 | ν6 = 23.8 |
| R13 = 11.390 | D13 = 5.17 | N7 = 1.58313 | ν7 = 59.4 |
| R14 = −21.338 | D14 = Variable | | |
| R15 = −21.366 | D15 = 2.6Q | N8 = 1.84666 | ν8 = 23.8 |
| R16 = −16.241 | D16 = 1.54 | | |
| R17 = −17.189 | D17 = i.30 | N9 = 1.77250 | ν9 = 49.6 |
| R18 = 702.648 | | | |

R14: Aspheric
Paraxial R −2.13379 × 10
B −3.20541 × $10^{-5}$
c 2.15045 × $10^9$
D 2.30241 × $10^{10}$
E −2.37021 × $10^0$

| Variable | Focal Length | | |
|---|---|---|---|
| Separation | 36.11 | 58.97 | 101.58 |
| D4 | 1.50 | 8.73 | 12.27 |
| D7 | 3.99 | 4.23 | 4.55 |
| D14 | 17.66 | 5.62 | 1.05 |

The values of the factors in the above-stated conditions (22) and (23) for the numerical examples 8 to 10 are listed in Table-2 below.

TABLE 2

| | Numerical Example | | |
|---|---|---|---|
| | 8 | 9 | 10 |
| D2/fw | 0.03 | 0.03 | 0.03 |
| ra/rb | 0.94 | 0.96 | 0.94 |

Figure 21:
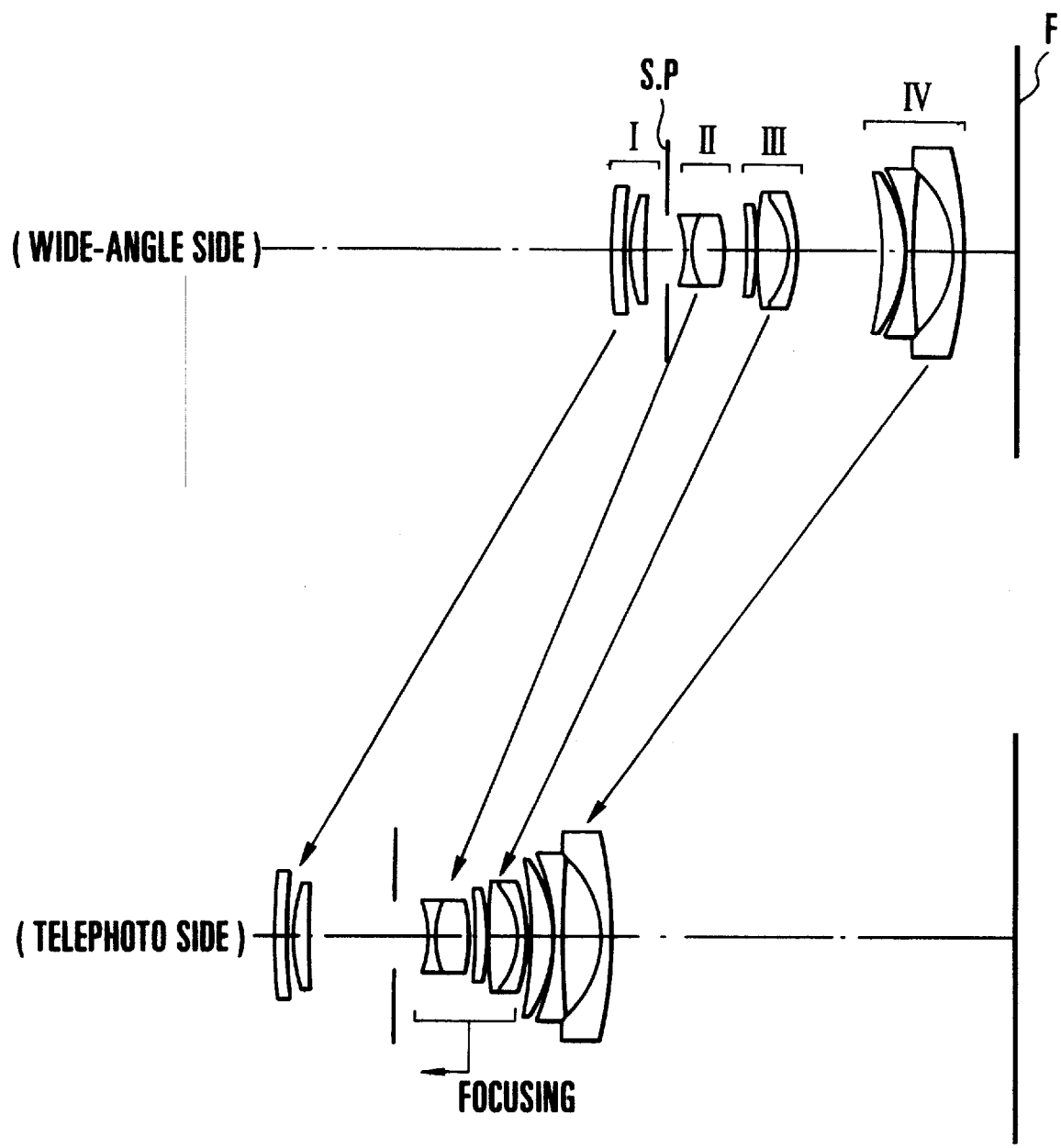
FIG. 21 is lens block diagrams of a numerical example 11 of the invention.
Figure 22:
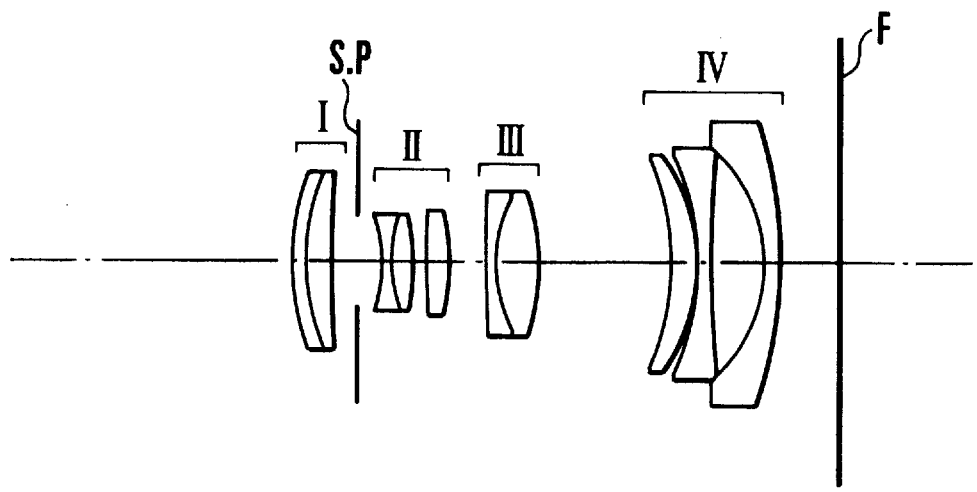
FIG. 22 is a lens block diagram of a numerical example 12 of the invention.
Figure 23:
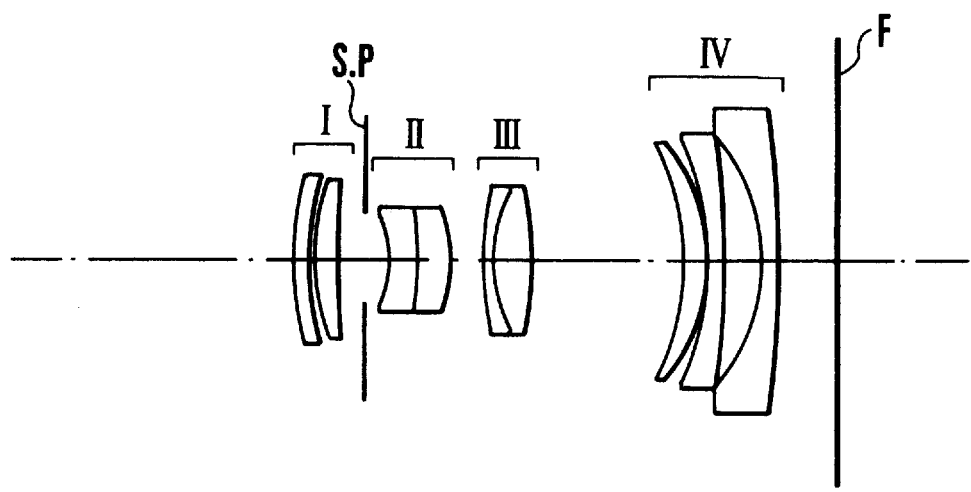
FIG. 23 is a lens block diagram of a numerical example 13 of the invention.
Figure 30A:
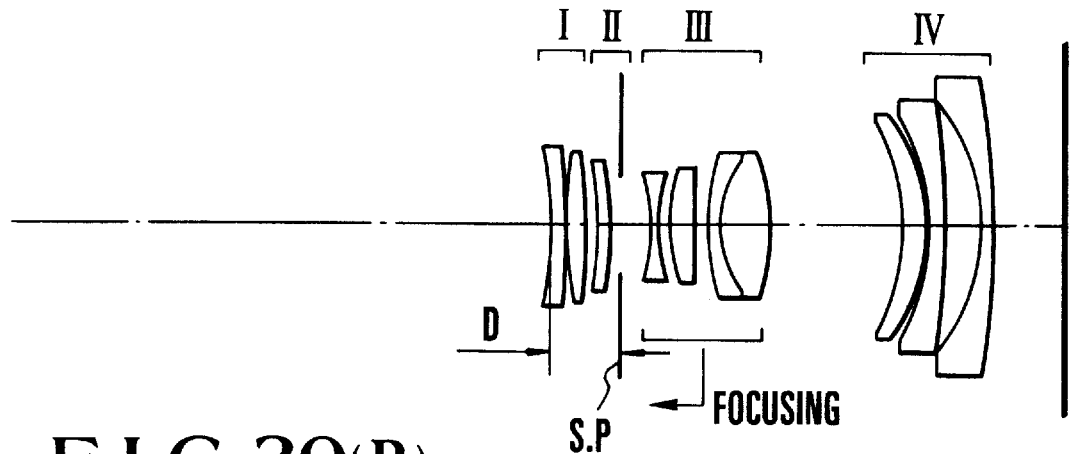
FIGS. 30(A), 30(B) and 30(C) are lens block diagrams of a numerical example 14 of the invention.
Figure 30B:
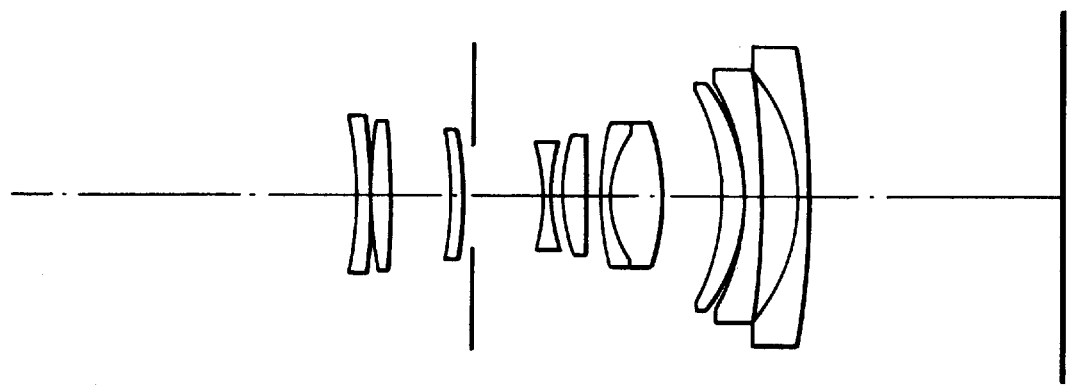
Figure 30C:
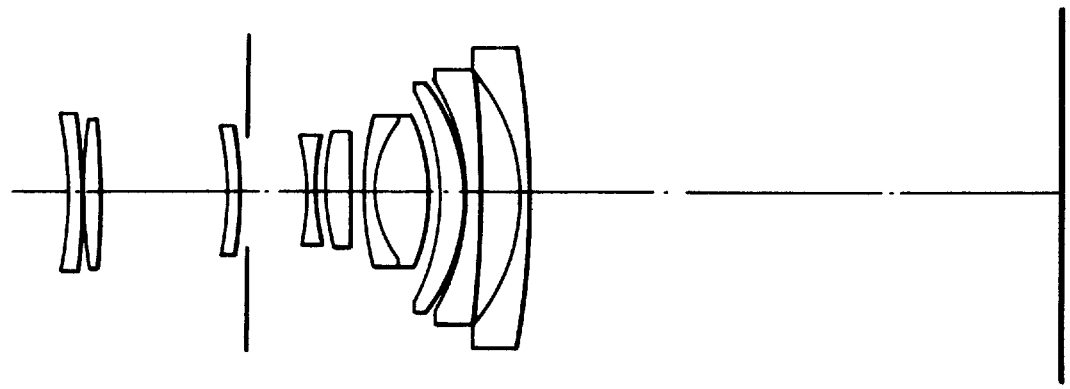
Figure 31A:
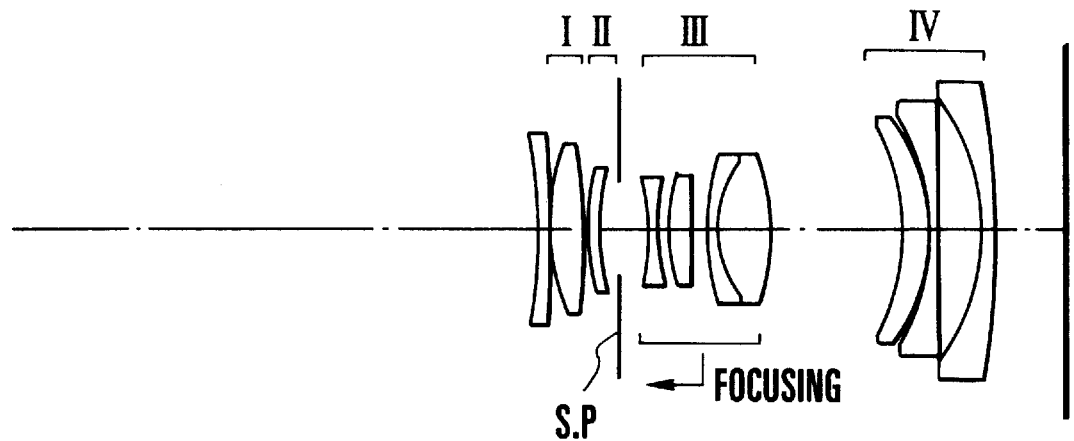
FIGS. 31(A), 31(B) and 31(C) are lens block diagrams of a numerical example 15 of the invention.
Figure 31B:
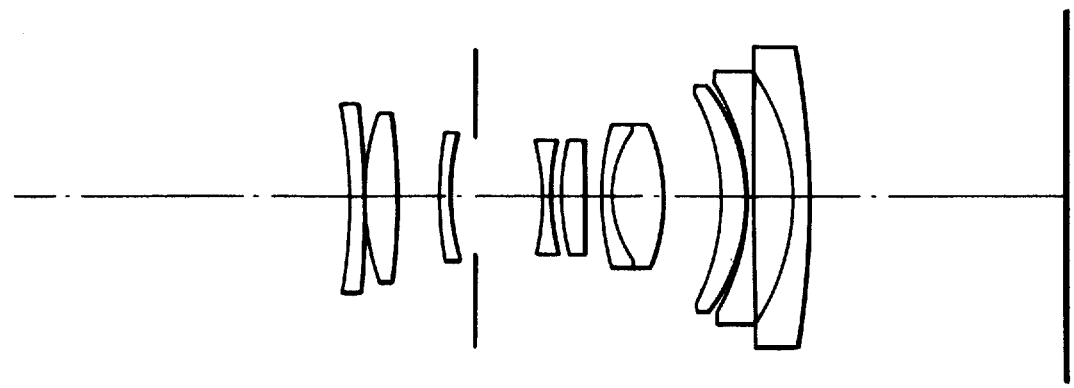
Figure 31C:
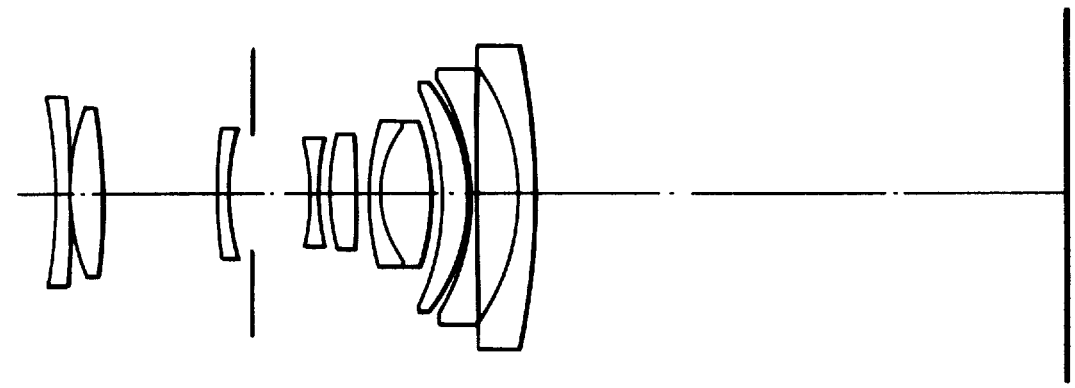
Figure 32A:
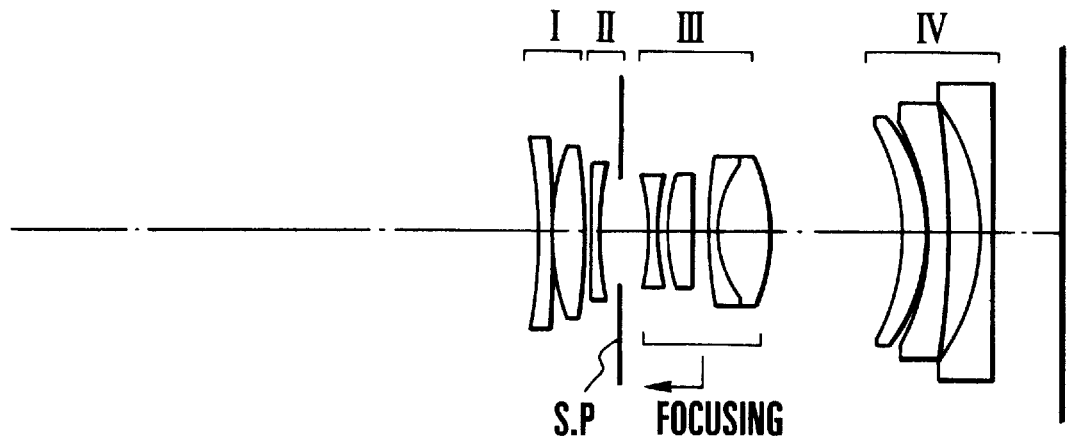
FIGS. 32(A), 32(B) and 32(C) are lens block diagrams of a numerical example 16 of the invention.
Figure 32B:
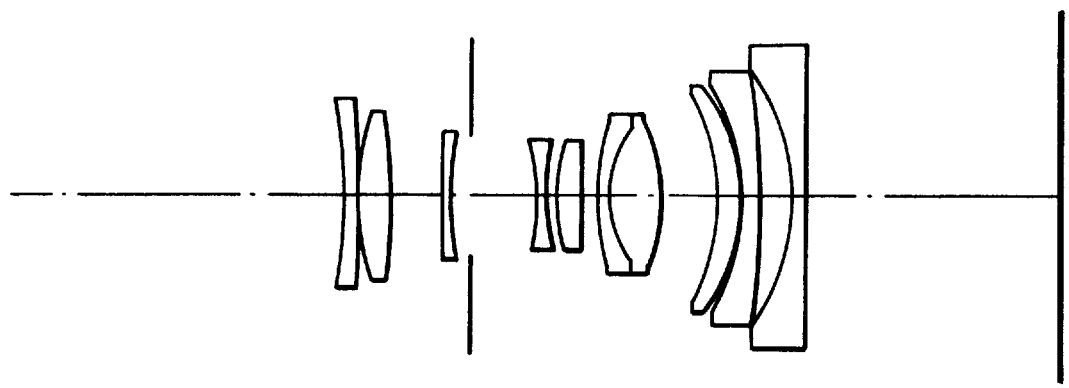
Figure 32C:
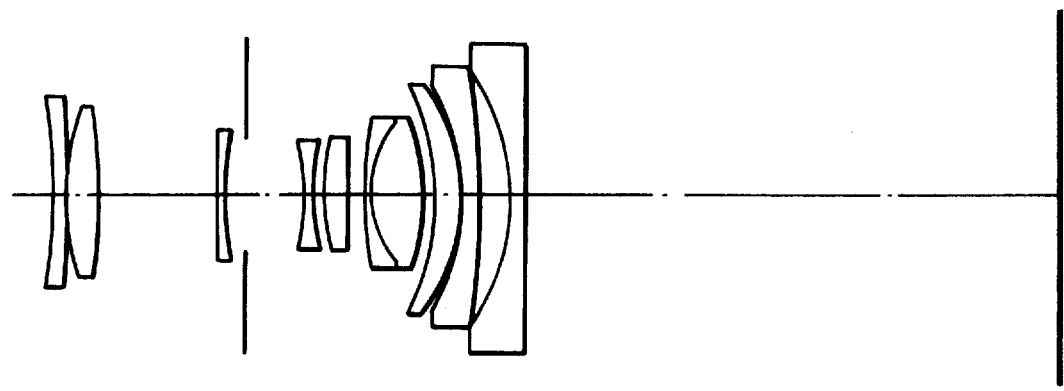
Figure 39:
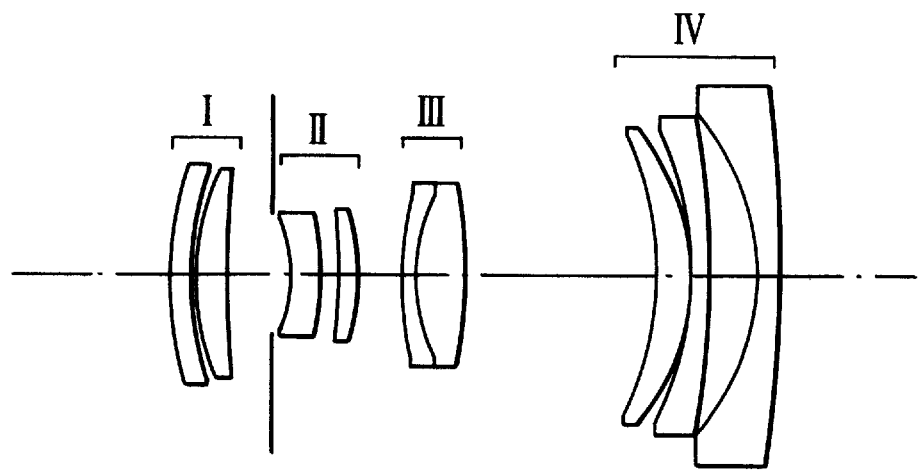
FIG. 39 is a lens block diagram of a numerical example 17 of the invention.
Figure 40:
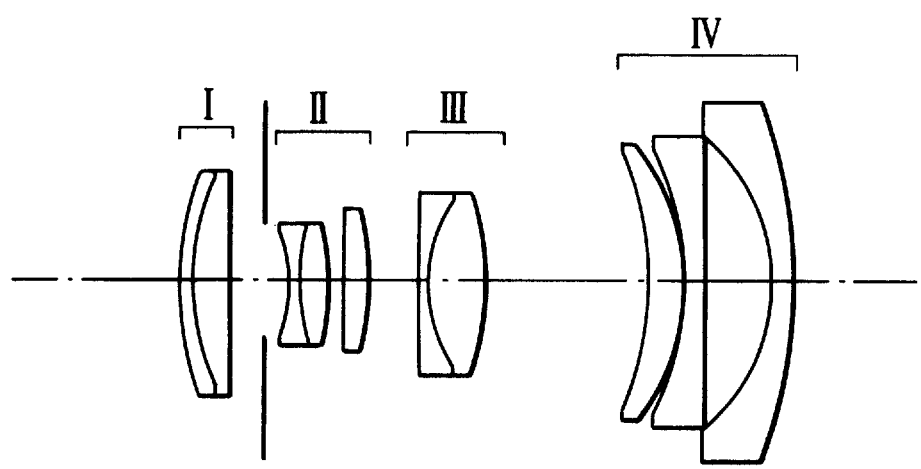
FIG. 40 is a lens block diagram of a numerical example 18 of the invention.

Another embodiment of the invention is described from the standpoint of performing focusing. FIG. 21 is block diagrams of a numerical example 11 of a zoom lens of the invention. FIGS. 22 and 23 are block diagrams of numerical examples 12 and 13 of zoom lenses of the invention in the wide-angle end. FIGS. 24(A)(1)–24(A)(4) and 24(B)(1)–24(B)(4) and FIGS. 25(A) and 25(B) are graphic representations of the aberrations of the numerical example 11 in the wide-angle and telephoto ends, respectively. FIGS. 26(A)(1)–26(A)(4) and 26(B)(1)–26(B)(4) and FIGS. 27(A)(1) –27(A)(4) and 27(B)(1)–27(B)(4) are graphic representations of the aberrations of the numerical example 12 of the invention in the wide-angle and telephoto ends, respectively. FIGS. 28(A)(1)–28(A)(4) and 28(B)(1)–28(B)(4) and FIGS. 29(A)(1)–29(A)(4) and 29(B)(1)–29(B)(4) are graphic representations of the aberrations of the numerical example 13 of the invention in the wide-angle and telephoto ends, respectively. Of the aberration graphs, FIGS. 24(A)(1)–24(A)(4), 25(A)(1)–25(A)(4), 26(A)(1)–26(A)(4), 27(A)(1)–27(A)(4), 28(A)(1)–28(A)(4), and 29(A)(1)–29(A)(4) are shown when focused on an infinitely distant object. FIGS. 24(B)(1)–24(B)(4), 25(B)(1)–25(B)(4), 26(B)(1)–26(B)(4), 27(B)(1)–27(B)(4), 28(B)(1)–28(B)(4), and 29(B)(1)–29(B)(4) are shown when focused to an object distance of 800 mm.

In the block diagrams, I denotes a first lens unit of positive refractive power, II a second lens unit of positive or negative refractive power, III a third lens unit of positive refractive power and IV a fourth lens unit of negative refractive power. SP stands for a stop positioned before (on the object side of) the second lens unit. F is an image plane.

During zooming from the wide-angle end to the telephoto end, all the lens units are axially moved forward as indicated by arrows. As compared with when in the wide-angle end, it is when in the telephoto end that the first and second lens units are spaced longer, the second and third lens units are spaced shorter, and the third and fourth lens units are spaced shorter. The stop is moved in unison with the second or the third lens unit during zooming. By this, the structure of the operating mechanism is simplified.

Particularly with the help of the features that, as zooming from the wide angle to the telephoto end, the second and third lens units come close to each other, while the stop simultaneously moves forward in unison with the third lens unit, a space that allows the focusing lens (the second and third lens units) to move to full length therein is created in the telephoto positions. In other words, since it is required that the space for the certain focusing range be wider when on the telephoto side than when on the wide-angle side, this requirement is effectively fulfilled.

Another feature of the present embodiment is that at least one of the lenses of the second lens unit is positioned on the image side of the stop SP. In the example of FIG. 21, all the lenses of the second lens unit lie on the image side of the stop SP. By this, as viewed from the second lens unit, the stop SP takes its place at the front, thereby bringing the entrance pupil close to the front lens members. Thus, the diameter of the front lens members is minimized.

In the present embodiment, focusing from an infinitely distant object to a close object is performed by moving the second and third lens units in unison forward, that is, the rear focusing method is employed. As compared with the conventional 4-unit zoom lens which uses the first lens unit for focusing, the one of the present embodiment gets its first lens unit advantageously prevented from greatly increasing in the effective diameter by employing such a rear focusing method.

The focusing function includes a factor that is to drive motion. The present embodiment, therefore, has also an aim to simplify the structure of the focusing control mechanism and reduce its size. The diaphragm control mechanism is a part occupying a relatively large proportion of the mechanical mounting for the zoom lens. In the present embodiment, therefore, the stop SP is made stationary during focusing. This contributes to a simplification of the mechanical mounting.

To attain more desired results, the invention sets forth further conditions as follows:

$$0.45 < f1/fT < 1.35 \quad (24)$$

$$0.2 < f2,3/fT < 0.45 \quad (25)$$

where f1 is the focal length of the first lens unit; f2,3 is the overall focal length of the second and third lens units in the telephoto end; and $F_T$ is the longest focal length of the entire system.

The two conditions described above put the total focusing movement in an appropriate range. When the upper limit of the condition (24) is exceeded, as this means that the combined magnification of the second and third lens units is too small, the amount of focusing movement of these lens units becomes large. As a result, the camera using this zoom lens gets the whole size increased largely. When the lower limit is exceeded, the light beam going to the second lens unit is caused to converge strongly. So, variation with focusing of aberrations, particularly spherical aberration and coma, is intensified objectionably.

When the upper limit of the condition (25) is exceeded, the amount of focusing movement of the lens units therefor increases greatly. As a result, the camera becomes large in size as a whole. When the lower limit is exceeded, a larger number of lens elements becomes necessary to use for the purpose of correcting the variation of the aberrations with focusing. As a result, the size of the whole camera increases objectionably.

Within the framework of the invention that the zoom ratio is 3 and the F-number is about 3.5, to assure high optical performance to be maintained throughout the entire zooming range and throughout the entire focusing range, it is preferred to construct the lens units as follows:

The first lens unit comprises a negative lens of meniscus form convex toward the object side in either broken or cemented contact with a positive lens of meniscus form convex toward the object side. The second lens unit comprises a negative lens having a concave surface facing the object side and one or two positive lenses or lenses. The third lens unit comprises two positive lenses and one negative lens, totaling three lenses, or one negative lens and one positive lens, totaling two lenses. The fourth lens unit comprises a positive lens of meniscus form convex toward the image side, a negative lens and a negative lens of meniscus form convex toward the image side, totaling three lenses.

Next, numerical examples 11 to 13 of the invention are shown. In the numerical data for the examples 11 to 13, Ri is the radius of curvature of the i-th lens surface when counted from the object side, Di is the i-th axial thickness or air separation when counted from the object side, and Ni and vi are respectively the refractive index and Abbe number of the glass of the i-th lens element when counted from the object side.

The shape of an aspheric surface is expressed in the coordinates with an X axis in an axial direction and an H axis in the direction perpendicular to the optical axis, the direction in which light advances being taken as positive, by the following equation:

$$X = (1/R)H^2/(1 + \sqrt{1 - (1+K)(H/R)^2}) + BH^4 + CH^6 + DH^8 + EH^{10}$$

where R is the radius of the osculating sphere, and B, C, D and E are the aspheric coefficients.

NUMERICAL EXAMPLE 11

| f = 39.0 | Fno. = 1: 3.5–8.2 | | 2ω = 58°–23.6° |
|---|---|---|---|
| R1 = 98.66 | D1 = 1.50 | N1 = 1.84666 | v1 = 23.9 |
| R2 = 57.57 | D2 = 1.00 | | |
| R3 = 22.81 | D3 = 2.00 | N2 = 1.48749 | v2 = 70.2 |
| R4 = 90.45 | D4 = Variable | | |
| R5 = (Stop) | D5 = 0.00 | | |
| R6 = −13.55 | D6 = 1.00 | N3 = 1.51633 | v3 = 64.2 |
| R7 = 10.22 | D7 = 4.52 | N4 = 1.58267 | v4 = 46.4 |
| R8 = −19.87 | D8 = Variable | | |
| R9 = −80.16 | D9 = 1.50 | N5 = 1.51633 | v5 = 64.2 |
| R10 = −37.21 | D10 = 0.12 | | |
| R11 = 55.02 | D11 = 4.40 | N6 = 1.51633 | v6 = 64.2 |
| R12 = 10.11 | D12 = 1.10 | N7 = 1.84666 | v7 = 23.9 |
| R13 = 19.58 | D13 = Variable | | |
| R14 = 45.42 | D14 = 3.00 | N8 = 1.84666 | v8 = 23.8 |
| R15 = 19.3 | D15 = 0.12 | | |
| R16 = 26.61 | D16 = 1.20 | N9 = 1.69680 | v9 = 55.5* |
| R17 = 181.75 | D17 = 5.50 | | |
| R18 = 14.54 | D18 = 1.50 | N10 = 1.71300 | v10 = 53.8 |
| R19 = −55.95 | | | | f1/fT = 0.96
f2,3/fT = 0.31

| Variable | Focal Length | |
|---|---|---|
| Separation | 39.00 | 103.42 |
| D4 | 3.00 | 11.64 |
| D6 | 2.50 | 4.65 |
| D9 | 2.98 | 0.84 |
| D14 | 11.82 | 0.72 |

NUMERICAL EXAMPLE 12

| f = 39.07 | Fno = 1:3.5–8.2 | | 2ω = 58°–23.6° |
|---|---|---|---|
| R1 = 27.24 | D1 = 1.30 | N1 = 1.84666 | v1 = 23.8 |
| R2 = 22.42 | D2 = 2.80 | N2 = 1.48749 | v2= 70.2 |
| R3 = 263.66 | D3 = Variable | | |
| R4 = (Stop) | D4 = 2.75 | | |
| R5 = −15.71 | D5 = 0.80 | N3 = 1.74320 | v3 = 49.3 |
| R6 = 17.56 | D6 = 2.20 | N4 = 1.48749 | v4 = 70.2 |
| R7 = −38.95 | D7 = 1.26 | | |
| R8 = 93.44 | D8 = 2.36 | N5 = 1.84666 | v5 = 23.8 |
| R9 = −25.24 | D9 = Variable | | |
| R10 = 188.68 | D10 = 1.10 | N6 = 1.84666 | v6 = 23.8 |
| R11 = 14.87 | D11 = 4.50 | N7 = 1.71300 | v7 = 53.8 |
| R12 = −24.97 | D12 = Variable | | |
| R13 = −32.62 | D13 = 2.80 | N8 = 1.84666 | v8 = 23.8 |
| R14 = −19.22 | D14 = 0.15 | | |

-continued

| f = 39.07 | Fno = 1:3.5–8.2 | 2ω = 58°–23.6° |
|---|---|---|
| R15 = −26.53 | D15 = 1.40 | N9 = 1.69350  ν9 = 53.2 |
| R16 = −226.61 | D16 = 5.56 | |
| R17 = −16.01 | D17 = 1.70 | N10 = 1.74320  ν10 = 49.3 |
| R18 = −41.29 | | | f1/fT = 0.65
f2, 3/fT = 0.27

| Variable | Focal Length | |
|---|---|---|
| Separation | 39.07 | 111.86 |
| D3 | 2.50 | 22.34 |
| D9 | 3.76 | 1.57 |
| D12 | 13.82 | 0.99 |

NUMERICAL EXAMPLE 13

| f = 39.44 | Fno = 1:3.5–8.2 | 2ω = 58°–23.6° |
|---|---|---|
| R1 = 31.42 | D1 = 1.40 | N1 = 1.84666  ν1 = 23.8 |
| R2 = 25.59 | D2 = 0.70 | |
| R3 = 22.50 | D3 = 2.40 | N2 = 1.48749  ν2 = 70.2 |
| R4 = 98.17 | D4 = Variable | |
| R5 = (Stop) | D5 = Variable | |
| R6 = −12.34 | D6 = 2.80 | N3 = 1.51742  ν3 = 52.4 |
| R7 = −43.74 | D7 = 3.35 | N4 = 1.72825  ν4 = 28.5 |
| R8 = −17.42 | D8 = Variable | |
| R9 = 31.99 | D9 = 1.10 | N5 = 1.84666  ν5 = 23.8 |
| R10 = 14.81 | D10 = 4.00 | N6 = 1.58313  ν6 = 59.4 |
| R11 = −38.58 | D11 = Variable | |
| R12 = −28.32 | D12 = 2.50 | N7 = 1.84666  ν7 = 22.8 |
| R13 = −19.53 | D13 = 0.45 | |
| R14 = −29.98 | D14 = 1.40 | N8 = 1.71300  ν8 = 53.8 |
| R15 = −121.19 | D15 = 4.09 | |
| R16 = −20.81 | D16 = 1.70 | N9 = 1.74320  ν9 = 49.3 |
| R17 = −134.92 | | | f1/fT = 0.81
f2, 3/fT = 0.31

| Variable | Focal Length | |
|---|---|---|
| Separation | 39.45 | 111.49 |
| D4 | 2.80 | 22.28 |
| D5 | 2.68 | 4.34 |
| D8 | 3.49 | 1.83 |
| D11 | 15.98 | 1.10 |

R11: Aspheric
K = −7.59 × 10$^{-1}$    B = 8.4 × 10$^{-7}$    C = 7.95 × 10$^{-8}$
D = −2.29 × 10$^{-9}$    E = 1.23 × 10$^{-11}$ Another embodiment of the invention is described where the focusing provision is made in the third lens unit only.

FIGS. 30(A), 30(B) and 30(C), FIGS. 31(A), 31(B) and 31(C), and FIGS. 32(A), 32(B) and 32(C) are block diagrams of numerical examples 14 to 16 of zoom lenses of the invention, where I denotes a first lens unit of positive refractive power, II a second lens unit in the example 14 of positive refractive power, or in the examples 15 and 16 of negative refractive power, III a third lens unit of positive refractive power, and IV a fourth lens unit of negative refractive power. SP stands for a stop.

FIGS. 30(A), 31(A) and 32(A), FIGS. 30(B), 31(B) and 32(B) and FIGS. 30(C), 31(C) and 32(C) are in the wide-angle end, a middle focal length position and the telephoto end, respectively. As is apparent from these figures, all the separations between the lens units are varied to effect zooming. In particular, the separations between the first and second lens units and between the second and third lens units increase while the separation between the third and fourth lens units decreases, during zooming from the wide-angle end to the telephoto end. The stop is arranged adjacent to the second lens unit and positioned on the object side of the third lens unit. Focusing is performed by moving the third lens unit III along the optical axis.

With the use of this arrangement, particularly because, in the wide-angle end, the stop comes close to the first lens unit, it becomes possible to minimize the diameter of the front lens members.

To minimize the size, it is desired to satisfy the following additional condition:

$$0.08 < D/fW < 0.45 \qquad (26)$$

where D is the distance from the front vertex to the stop, and fw is the shortest focal length of the entire system.

The inequalities of condition (26) give a range for the distance of the stop from the front vertex. When the upper limit is exceeded, the diameter of the front members becomes too large. Conversely when the lower limit is exceeded, the space the lens units which lie on the object side of the stop occupy becomes so short that the sufficient lens design is impossible. Thus, good correction of aberrations cannot be attained.

Further, since the third lens unit is used for focusing, or the inner focus method is employed, the diameters of the front and rear lens members can be prevented from increasing largely.

To further improve the minimization of the size, it is desired to make the stop stationary during focusing. For a focusing lens unit to move, if the focusing lens unit is light in weight and small in size, it is favorable to the driving control. On this account, during focusing, the stop which is a relatively large part in the interior of the lens barrel is left stand alone separately from the focusing lens unit. This leads to a possibility of reducing the size of the actuator for focusing and shortening the space for use in focusing. As a result, it becomes possible to minimize the bulk and size of the entirety of the camera.

In particular, it is desirable to unify the stop and the second lens unit. If so, zooming is performed with the stop and the second lens unit moving in unison. This leads to a reduction in the number of movable members of the operating mechanism. Therefore, the structure of the mechanical mounting for the zoom lens can be simplified, thereby contributing to a minimization of the size of the camera whole.

By the way, the use of the inner focus method in the zoom lens differentiates the total focusing movement between the wide-angle and telephoto ends. In application to the type of zoom lens of the invention, the total focusing movement is longer on the telephoto side than on the wide-angle side, and when focusing down to shorter object distances, forward movements result.

Therefore, the separation between the second and third lens units is made longer on the telephoto side than on the wide-angle side. This permits the required space for the given range of movement of the focusing lens unit to be created with high efficiency. Particularly for the wide-angle side, because the distance from the stop to the fourth lens unit can be reduced to a minimum, it becomes possible to prevent the diameter of the rear lens members from increasing largely.

Next, numerical examples 14 to 16 of the invention are shown. In the numerical data for the examples 14 to 16, Ri is the radius of curvature of the i-th lens surface when counted from the object side, Di is the i-th axial thickness or air separation when counted from the object side, and Ni and vi are respectively the refractive index and Abbe number of the glass of the i-th lens element when counted from the object side.

The shape of an aspheric surface is expressed in the coordinate with X in an axial direction and Y in the direction perpendicular to the optical axis by the following equation:

$$X = (Y^2/r)/(1 + \sqrt{1 + (Y/r)^2}) + BY^4 + CY^6 + DY^8$$

where r is the radius of the osculating sphere and B, C and D are the aspheric coefficients.

NUMERICAL EXAMPLE 14

| f = 38.12–107.2 | Fno = 1:3.73 | | 574 | 8.28 |
|---|---|---|---|---|
| R1 = −34.798 | D1 = 1.20 | N1 = 1.80518 | v1 = 25.4 | |
| R2 = −84.318 | D2 = 0.15 | | | |
| R3 = 35.591 | D3 = 1.90 | N2 = 1.71300 | v2 = 53.8 | |
| R4 = −86.953 | D4 = Variable | | | |
| R5 = −37.320 | D5 = 1.20 | N3 = 1.60311 | v3 = 60.7 | |
| R6 = 32.030 | D6 = 0.70 | | | |
| R7 = (Stop) | D7 = Variable | | | |
| R8 = −16.527 | D8 = 0.80 | N4 = 1.60311 | v4 = 60.7 | |
| R9 = 26.302 | D9 = 0.95 | | | |
| R10 = 19.051 | D10 = 2.50 | N5 = 1.80518 | v5 = 25.4 | |
| R11 = 512.458 | D11 = 1.48 | | | |
| R12 = 25.542 | D12 = 1.OO | N6 = 1.84666 | v6 = 23.8 | |
| R13 = 10.340 | D13 = 5.20 | N7 = 1.58313 | v7 = 59.4 | |
| R14 = −19.032 | D14 = Variable | | | |
| R15 = −23.107 | D15 = 2.60 | N8 = 1.84666 | v8 = 23.8 | |
| R16 = −17.072 | D16 = 0.20 | | | |
| R17 = −22.179 | D17 = 1.30 | N9 = 1.69680 | v9 = 55.5 | |
| R18 = −175.187 | D18 = 3.69 | | | |
| R19 = −20.279 | D19 = 1.50 | N10 = 1.69680 | v10 = 55.5 | |
| R20 = −76.626 | | | | |

| Variable | Focal Length | | |
|---|---|---|---|
| Separation | 38.12 | 65.01 | 107.20 |
| D4 | 1.24 | 5.96 | 13.06 |
| D7 | 3.50 | 7.08 | 6.00 |
| D14 | 13.81 | 6.13 | 1.06 |

R14: Aspheric
| B | C | D |
|---|---|---|
| 4.45969 × 10⁻⁵ | 2.48125 × 10⁻⁷ | −2.33196 × 10⁻⁹ |

D/fw = 0.16

NUMERICAL EXAMPLE 15

| f = 39.26–106.32 | Fno = 1:3.89 | | 5.69 | 8.28 |
|---|---|---|---|---|
| R1 = −62.990 | D1 = 1.20 | N1 = 1.80518 | v1 = 25.4 | |
| R2 = −186.038 | D2 = 0.15 | | | |
| R3 = 24.637 | D3 = 2.87 | N2 = 1.48749 | v2 = 70.2 | |
| R4 = −136.398 | D4 = Variable | | | |
| R5 = 144.234 | D5 = 1.00 | N3 = 1.51633 | v3 = 64.2 | |
| R6 = 50.230 | D6 = 2.58 | | | |
| R7 = (Stop) | D7 = Variable | | | |
| R8 = −15.678 | D8 = 0.80 | N4 = 1.48749 | v4 = 70.2 | |
| R9 = 53.939 | D9 = 1.64 | | | |
| R10 = 21.151 | D10 = 1.88 | N5 = 1.80518 | v5 = 25.4 | |
| R11 = 433.396 | D11 = 2.02 | | | |
| R12 = 27.232 | D12 = 1.00 | N6 = 1.84666 | v6 = 23.8 | |
| R13 = 10.876 | D13 = 5.22 | N7 = 1.58313 | v7 = 59.4 | |
| R14 = −22.514 | D14 = Variable | | | |
| R15 = −27.749 | D15 = 2.60 | N8 = 1.84666 | v8 = 23.8 | |

-continued

| f = 39.26–106.32 | Fno = 1:3.89 | | 5.69 | 8.28 |
|---|---|---|---|---|
| R16 = −20.157 | D16 = 0.20 | | | |
| R17 = −29.163 | D17 = 1.30 | N9 = 1.69680 | v9 = 55.5 | |
| R18 = −73733.961 | D18 = 3.48 | | | |
| R19 = −22.636 | D19 = 1.50 | N10 = 1.69680 | v10 = 55.5 | |
| R20 = −134.051 | | | | |

| Variable | Focal Length | | |
|---|---|---|---|
| Separation | 39.26 | 64.17 | 106.32 |
| D4 | 0.80 | 4.76 | 10.95 |
| D7 | 3.34 | 6.23 | 5.24 |
| D14 | 12.96 | 6.07 | 0.79 |

R14: Aspheric
| B | C | D |
|---|---|---|
| 5.34714 × 10⁻⁵ | 6.61108 × 10⁻⁸ | −7.34139 × 10⁻¹⁰ |

D/fw = 0.22

NUMERICAL EXAMPLE 16

| f = 36.11–101.58 | Fno = 1:3.87 | | 5.73 | 8.28 |
|---|---|---|---|---|
| R1 = −51.746 | D1 = 1.20 | N1 = 1.80518 | v1 = 25.4 | |
| R2 = −148.929 | D2 = 0.15 | | | |
| R3 = 28.469 | D3 = 2.77 | N2 = 1.60311 | v2 = 60.7 | |
| R4 = −171.588 | D4 = Variable | | | |
| R5 = 664.184 | D5 = 1.00 | N3 = 1.48749 | v3 = 70.2 | |
| R6 = 29.527 | D6 = 2.60 | | | |
| R7 = (Stop) | D7 = Variable | | | |
| R8 = −13.837 | D8 = 0.80 | N4 = 1.48749 | v4 = 70.2 | |
| R9 = −56.653 | D9 = 0.73 | | | |
| R10 = 19.774 | D10 = 2.05 | N5 = 1.80518 | v5 = 25.4 | |
| R11 = 267.805 | D11 = 2.11 | | | |
| R12 = 30.993 | D12 = 0.98 | N6 = 1.80518 | v6 = 25.4 | |
| R13 = 9.562 | D13 = 5.56 | N7 = 1.58313 | v7 = 59.4 | |
| R14 = −22.733 | D14 = Variable | | | |
| R15 = −23.622 | D15 = 2.80 | N8 = 1.84666 | v8 = 23.8 | |
| R16 = −17.496 | D16 = 0.18 | | | |
| R17 = −23.624 | D17 = 1.35 | N9 = 1.69680 | v9 = 55.5 | |
| R18 = −207.051 | D18 = 2.78 | | | |
| R19 = −28.694 | D19 = 1.55 | N10 = 1.69680 | v10 = 55.5 | |
| R20 = −1961.185 | | | | |

| Variable | Focal Length | | |
|---|---|---|---|
| Separation | 39.26 | 64.17 | 106.32 |
| D4 | 0.80 | 5.94 | 13.98 |
| D7 | 3.20 | 6.26 | 5.49 |
| D14 | 14.10 | 6.77 | 0.87 |

R14: Aspheric
| B | C | D |
|---|---|---|
| 5.79115 × 10⁻⁵ | 1.52487 × 10⁻⁷ | −4.84236 × 10⁻⁹ |

D/fw = 0.23

A further improved embodiment of the invention is described below. FIGS. 39 to 42 are block diagrams of numerical examples 17 to 20 of zoom lenses of the invention, where a first lens unit I of positive refractive power, a second lens unit II of positive refractive power, a third lens unit III of positive refractive power and a fourth lens unit IV of negative refractive power are arranged in this order from the object side.

The first lens unit I, the second lens unit II and the fourth lens unit IV, when zooming from the wide angle end to the telephoto end, move along a common optical axis in differential relation so as to depict linear loci, while the third lens unit III simultaneously moves along the optical axis so as to depict a non-linear locus in order to compensate for the shift of an image plane.

The zoom lenses shown in FIGS. 39 to 42 are of thick lens system, and their lens data are to be described later.

The first lens unit I described above satisfies the following condition:

$$0<Bd/Fw<1.3 \qquad (27)$$

where Bd is the entire length (axial thickness), and Fw is the shortest focal length of the entire lens system.

This condition is concerned with a shortening of the physical length of the entire lens system and the minimization of the diameter of the front lens members. The lower limit of the condition means that it has a finite thickness. Meanwhile, when the upper limit is exceeded, as this implies that the entire length of the first lens unit is too long, the physical length of the entire lens system is caused to increase. Particularly in application to the case where the stop is positioned on the image side of the first lens unit, because the entrance pupil takes its place moved to the image side, the diameter of the front lens members increases greatly. Therefore, it becomes difficult to achieve a compact lens system.

Another feature is that the second lens unit is constructed with at least one negative lens and at least one positive lens, thereby correcting well chromatic aberrations over the entire zooming range. Further, the second lens unit has a front most or first lens surface of concave curvature facing the object side and a rearmost or last lens surface of convex curvature facing the image side.

This first lens surface has a strong negative power, causing the Petzval sum to increase in the negative sense and producing an effect of correcting spherical aberration and outward coma. The aforesaid last lens surface has a positive power and, therefore, plays a role of compensating for the over-correction by the last lens surface.

Meanwhile, the third lens unit is better constructed with at least one negative lens and at least one positive lens. By this construction and arrangement, the residual chromatic and spherical aberrations the second lens unit produces are corrected well. It should be pointed in connection with the present embodiment that, on consideration of improving the compact form of the lens system and reducing its production cost, the number of constituent lenses is limited to the fewest negative and positive ones and the cemented form is adopted. It is, however, to be understood that the number of constituent lenses may be increased, and it is also recommendable to introduce an aspheric surface, and even the combination of these is possible.

Turning again to the second lens unit, letting the focal length of its first surface be denoted by fa and the focal length of its last surface by fb, if the following condition is satisfied, improved results are attained.

$$0.5<|fa|/fb<1.5 \qquad (28)$$

The inequalities of condition (28) give a range for the ratio of the power of the last lens surface to that of the first lens surface. When the upper limit is exceeded, as this means that the power of the first lens surface is weak compared with the power of the last lens surface, under-correction of spherical aberration results. The Petzval sum also increases in the positive sense. Therefore, curvature of field tends to be under-corrected, which is difficult to correct. When the lower limit is exceeded, over-corrected spherical aberrations of higher order are liable to produce. So, this should be avoided.

Also, in the third lens unit, letting the average of the Abbe numbers of the positive lenses be denoted by vp, and the average of the Abbe numbers of the negative lenses by vn, it is desired to satisfy the following condition:

$$15<vp-vn \qquad (29)$$

When beyond the range given by the inequality of condition (29), the third lens unit is under-corrected for chromatic aberrations. Even by any design of the other lens units, it is difficult to maintain good correction of chromatic aberrations throughout the entire zooming range. It is to be noted here that in the examples of the present embodiment, the negative and positive lenses constituting the third lens unit are each only one in number. On consideration of the general case where a plurality of positive lenses and a plurality of negative lenses are included, the expression is made like an "average" of the Abbe numbers.

The fourth lens unit is constructed with a positive meniscus lens concave toward the object side and two negative lenses having concave surfaces facing the object side.

The focusing method employed in the examples of this embodiment is to move the second lens unit II and the third lens unit III in unison forward to effect focusing down to shorter object distances. However, the first, second and third lens units may otherwise be used instead for focusing purposes as they move in unison. Otherwise, the fourth lens unit may be moved rearward.

Next, numerical examples 17 to 20 of the invention are shown. In the numerical data for the examples 17 to 20, Ri is the radius of curvature of the i-th lens surface when counted from the object side, Di is the i-th axial thickness or air separation when counted from the object side, and Ni and vi are respectively the refractive index and Abbe number of the glass of the i-th lens element when counted from the object side.

The shape of an aspheric surface is expressed by the following equation:

$$X = (h^2/R)/(1 + \sqrt{1 - (1+K)(h/R)^2}\ ) + Ah^2 + Bh^4 + Ch^6 + Dh^8 + Eh^{10}$$

where X is the amount of axial deviation from the vertex of the surface, h is the height from the optical axis and R is the radius of the osculating sphere.

The values of the factors in the above-stated conditions (27) to (29) for the examples 17 to 20 are listed in Table-3.

NUMERICAL EXAMPLE 17

| f = 39.90–111.53 | Fno = 1:4.0–8.37 | | 2ω =56.9°–22.0° |
|---|---|---|---|
| R1 = 31.200 | D1 = 1.40 | N1 = 1.84666 | v1 = 23.8 |
| R2 = 25.790 | D2 = 0.70 | | |
| R3 = 23.305 | D3 = 2.40 | N2 = 1.48749 | v2 = 70.2 |
| R4 = 85.886 | D4 = Variable | | |
| R5 = (Stop) | D5 = 1.80 | | |
| R6 = −12.893 | D6 = 2.24 | N3 = 1.51742 | v3 = 52.4 |
| R7 = −35.766 | D7 = 1.51 | | |
| R8 = −44.576 | D8 = 1.80 | N4 = 1.72825 | v4 = 28.5 |
| R9 = −18.235 | D9 = Variable | | |
| R10 = 32.919 | D10 = 1.10 | N5 = 1.84666 | v5 = 23.8 |
| R11 = 15.271 | D11 = 4.00 | N6 = 1.58313 | v6 = 59.4 |
| R12 = −39.957 | D12 = Variable | | |
| R13 = −28.321 | D13 = 2.50 | N7 = 1.84666 | v7 = 23.8 |
| R14 = −19.575 | D14 = 0.15 | | |
| R15 = −30.748 | D15 = 1.40 | N8 = 1.71300 | v8 = 53.8 |
| R16 = −99.460 | D16 = 4.09 | | |
| R17 = −20.250 | D17 = 1.70 | N9 = 1.74320 | v9 = 49.3 |
| R18 = −145.856 | | | |

-continued f = 39.90–111.53    Fno = 1:4.0–8.37    2ω =56.9°–22.0°

R12: Aspheric
K = −8.01946 × 10⁻¹
A = 0
B = 4.98881 × 10⁻⁷
C = 7.41598 × 10⁻¹⁸
D = −2.34470 × 10⁻⁹
E = 2.25125 × 10⁻¹¹¹

| Variable | Focal Length | | |
|---|---|---|---|
| Separation | 39.26 | 64.17 | 106.32 |
| D4 | 3.55 | 14.13 | 26.27 |
| D9 | 3.54 | 2.70 | 0.91 |
| D12 | 15.95 | 7.04 | 1.08 |

NUMERICAL EXAMPLE 18 f = 39.04–111.52    Fno = 1:4.0–8.0    2ω =58.9°–22.0°

R1 = 27.243    D1 = 1.30    N1 = 1.84666    ν1 = 23.8
R2 = 22.421    D2 = 2.80    N2 = 1.48749    ν2 = 70.2
R3 = 263.666   D3 = Variable
R4 = (Stop)    D4 = 2.15
R5 = −15.714   D5 = 0.80    N3 = 1.74320    ν3 = 49.3
R6 = 17.564    D6 = 2.20    N4 = 1.48749    ν4 = 70.2
R7 = −38.955   D7 = 1.26
R8 = 93.447    D8 = 2.36    N5 = 1.84666    ν5 = 23.8
R9 = −25.249   D9 = Variable
R10 = 188.681  D10 = 1.10   N6 = 1.84666    ν6 = 23.8
R11 = 14.870   D11 = 4.50   N7 = 1.71300    ν7 = 53.8
R12 = −24.971  D12 = Variable
R13 = −32.620  D13 = 2.80   N8 = 1.84666    ν8 = 23.8
R14 = −19.223  D14 = ,0.15
R15 = −26.534  D15 = 1.40   N9 = 1.69350    ν9 = 53.2
R16 = 226.619  D16 = 5.56
R17 = −16.011  D17 = 1.70   N10 = 1.74320   ν10 = 49.3
R18 = −41.299

| Variable | Focal Length | | |
|---|---|---|---|
| Separation | 39.26 | 64.17 | 106.32 |
| D3 | 2.90 | 11.91 | 22.74 |
| D9 | 3.76 | 2.49 | 1.51 |
| D12 | 13.82 | 6.60 | 1.04 |

NUMERICAL EXAMPLE 19 f = 39.33–111.52    Fno = 1:3.97–8.44    2ω =57.7°–22.0°

R1 = 31.200    D1 = 1.40    N1 = 1.84666    ν1 = 23.8
R2 = 25.773    D2 = 0.70
R3 = 23.262    D3 = 2.20    N2 = 1.48749    ν2 = 70.2
R4 = 77.729    D4 = Variable
R5 = (Stop)    D5 = 3.15
R6 = −12.954   D6 = 2.09    N3 = 1.51633    ν3 = 64.2
R7 = −32.704   D7 = 1.60
R8 = −48.800   D8 = 1 80    N4 = 1.72825    ν4 = 28.5
R9 = −19.647   D9 = Variable
R10 = 33.349   D10 = 1 10   N5 = 1.84666    ν5 = 23.8
R11 = 15.041   D11 = 4 00   N6 = 1.58913    ν6 = 61.2
R12 = −35.709  D12 = Variable
R13 = −27.500  D13 = 2 80   N7 = 1.84666    ν7 = 23.8
R14 = −18.907  D14 = 0 15
R15 = −29.649  D15 = 1.40   N8 = 1.71300    ν8 = 53.8
R16 = −81.659  D16 = 4.25
R17 = −18.302  D17 = 1.70   N9 = 1.74320    ν9 = 49.3
R18 = −125.129 f = 39.33–111.52    Fno = 1:3.97–8.44    2ω =57.7°–22.0°

| Variable | Focal Length | | |
|---|---|---|---|
| Separation | 39.33 | 66.41 | 111.52 |
| D4 | 2.90 | 13.56 | 25.46 |
| D9 | 3.28 | 2.53 | 0.90 |
| D12 | 15.17 | 6.89 | 1.08 |

NUMERICAL EXAMPLE 20 f = 39.33–111.52    Fno = 1:3.97–8.44    2ω =57.7°–22.0°

R1 = 31.422    D1 = 1.40    N1 = 1.84666    ν1 = 23.8
R2 = 25.593    D2 = 0.70
R3 = 22.503    D3 = 2.40    N2 = 1.48749    ν2 = 70.2
R4 = 98.172    D4 = Variable
R5 = ∞(Stop)   D5 = 2.68
R6 = −12.340   D6 = 2.80    N3 = 1.51742    ν3 = 52.4
R7 = −43.740   D7 = 3.35    N4 = 1.72825    ν4 = 28.5
R8 = −17.421   D8 = Variable
R9 = 31.996    D9 = 1.10    N5 = 1.84666    ν5 = 23.8
R10 = 14.811   D10 = 4.00   N6 = 1.58313    ν6 = 59.4
R11 = −38.589  D11 = Vatiable
R12 = −28.321  D12 = 2.50   N7 = 1.84666    ν7 = 23.8
R13 = −19.532  D13 = 0.15
R14 = −29.987  D14 = 1.40   N8 = 1.71300    ν8 = 53.8
R15 = −121.199 D15 = 4.09
R16 = −20.813  D16 = 1.70   N9 = 1.74320    ν9 = 49.3
R17 = −134.922

R11: Aspheric
K = −7.58857 × 10⁻¹
A = 0
B = 8.39990 × 10⁻⁷
C = 7.94711 × 10⁻⁸
D = −2.28707 × 10⁻⁹
E = 1.23435 × 10⁻¹¹

| Variable | Focal Length | | |
|---|---|---|---|
| Separation | 39.45 | 67.07 | 111.68 |
| D4 | 2.80 | 13.31 | 24.53 |
| D8 | 3.49 | 2.70 | 1.24 |
| D11 | 15.98 | 7.20 | 1.09 |

TABLE 3

| | Numerical Example | | | |
|---|---|---|---|---|
| | 17 | 18 | 19 | 20 |
| Bd/fw | 0.11 | 0.11 | 0.11 | 0.11 |
| \|fa\|/fb | 0.10 | 0.71 | 0.93 | 0.10 |
| νp - νn | 35.6 | 30.0 | 37.4 | 35.6 |

What is claimed is:

1. A zoom lens comprising, from front to rear, a first lens unit of positive refractive power, a second lens unit, a third lens unit of positive refractive power, and a fourth lens unit of negative refractive power, separations between said lens units being varied to effect zooming, wherein said zoom lens satisfies the following condition:

$$M_1 = M_2 = 1,$$

where Mi is the number of lens elements in said i-th lens unit, wherein, for a cemented lens, its constituent elements are counted as if in broken contact, and wherein said first lens unit moves at the time of zooming.

2. A zoom lens according to claim 1, wherein said first lens unit includes at least one positive lens having a convex surface facing the object side, said third lens unit includes at least one negative lens and a positive lens having a convex surface facing the image side, and said fourth lens unit includes at least one positive lens having a convex surface facing the image side and a negative lens having a concave surface facing the object side.

3. A zoom lens according to claim 1, wherein said second lens unit has a negative refractive power and the following conditions are satisfied:

$$0<d_{2W}/(f_W\cdot\tan\omega_W)<0.55$$

$$0.11<B_3/f_W<0.61$$

$$-2.51<((R_{2F}+R_{2R})/(R_{2F}-R_{2R}))\cdot(f_W/|f_2|)<2.51$$

where $d_{2W}$: the separation between said second lens unit and said third lens unit in a wide-angle end;

$f_W$: the shortest focal length of the entire system;

$\omega_W$: the semi-angle of field coverage of the entire system in the wide-angle end;

$B_3$: the axial length of said third lens unit;

$R_{2F}$: the radius of curvature of the frontmost surface in said second lens unit;

$R_{2R}$: the radius of curvature of the rearmost surface in said second lens unit; and $f_2$: the focal length of said second lens unit.

4. A zoom lens according to claim 1, wherein said first lens unit moves toward the object side at the time of zooming from a wide-angle end to a telephoto end.

5. A compact zoom lens comprising, from front to rear, a first lens unit including at least one positive lens and having a positive refractive power as a whole, a second lens unit including at least one negative lens and having a negative refractive power as a whole, a third lens unit including at least one positive lens and at least one negative lens, and a fourth lens unit including at least one positive lens and at least one negative lens, separations between said lens units being varied to effect zooming, and said zoom lens satisfying the following conditions:

$$0.49<f_3/(f_W\cdot\tan\omega_W)<3.05$$

$$0.49<|f_4|/(f_W\cdot\tan\omega_W)<3.05$$

$$0<d_{2W}/(f_W\cdot\tan\omega_W)<0.55$$

$$-1.21<(d_{2T}-d_{2W})/(d_{3T}-d_{3W})<0.21$$

$$0.11<B_3/f_W<0.61$$

where $f_3$ and $f_4$: the focal lengths of said third lens unit and said fourth lens unit, respectively;

$f_W$ and $f_T$: the shortest and longest focal lengths of the entire system, respectively;

$\omega_W$: the semi-angle of field coverage of the entire system in a wide-angle end;

$d_{2W}$ and $d_{2T}$: the separations between said second lens unit and said third lens unit in the wide-angle end and in a telephoto end, respectively;

$d_{3W}$ and $d_{3T}$: the separations between said third lens unit and said fourth lens unit in the wide-angle end and in the telephoto end, respectively; and $B_3$: the axial length of said third lens unit.

6. A compact zoom lens comprising, from front to rear, a first lens unit of positive refractive power, a second lens unit of positive refractive power, a third lens unit of positive refractive power and a fourth lens unit of negative refractive power, separations between said lens units being varied to effect zooming, wherein said first lens unit includes at least one positive lens having a convex surface facing the object side, said second lens unit is constructed with a single lens satisfying the following condition, said third lens unit includes at least one negative lens and a positive lens having a convex surface facing the image side, and said fourth lens unit includes at least one positive lens having a convex surface facing the image side and a negative lens having a concave surface facing the object side, said condition being:

$$-0.09<(R_{2F}+R_{2R})/(R_{2F}-R_{2R})\cdot(f_W/f_2)<2.51$$

where $R_{2F}$ and $R_{2R}$: the radii of curvature of the front and rear lens surfaces of said second lens unit, respectively;

$f_W$: the shortest focal length of the entire system; and $f_2$: the focal length of said second lens unit.

7. A compact zoom lens comprising, from front to rear, a first lens unit of positive refractive power, a second lens unit of positive refractive power, a third lens unit of positive refractive power and a fourth lens unit including at least one positive lens and one negative lens and having a negative refractive power as a whole, separations between said lens units being varied to effect zooming, and said zoom lens satisfying the following conditions:

$$1.17<(\phi_1+\phi_2+\phi_3)/\phi_W<2.22$$

$$1.17<|\phi_4|/\phi_W<2.22$$

$$0.23<(B_1+B_2+B_3)/(f_W\cdot\tan\omega_W)<1.50$$

$$0.11<SK_W/TD_W<0.31$$

$$1.21<(TD_W+SK_W)/(f_W\cdot\tan\omega_W)<3.31$$

where $\phi i$: the refractive power of the i-th lens unit;

$\phi_W$ and $f_W$: the overall refractive power and overall focal length of the entire lens system in a wide-angle end, respectively;

$Bi$: the axial length of the i-th lens unit;

$\omega_W$: the semi-angle of field coverage of the entire lens system in the wide-angle end; and $SK_W$ and $TD_W$: the back focal distance and physical length of the entire lens system in the wide-angle end.

8. A zoom lens comprising, from front to rear, a positive first lens unit, a positive second lens unit, a positive third lens unit and a negative fourth lens unit, air separations between said lens units being varied to effect zooming, wherein said first lens unit has a frontmost surface of concave curvature and said fourth lens unit includes a positive meniscus lens convex toward an image side followed toward the image side by a negative lens.

9. A zoom lens comprising, from front to rear, a positive first lens unit, a positive second lens unit, a positive third lens unit and a negative fourth lens unit, air separations between said lens units being varied to effect zooming, and said zoom lens satisfying the following condition:

$$0<D_2/f_W<0.05$$

where $D_2$ is the distance from the first lens surface to the last lens surface of said second lens unit, and $f_W$ is the shortest focal length of the entire system.

10. A zoom lens according to claim 9, wherein said fourth lens unit includes a meniscus lens convex toward the image side and a negative lens.

11. A zoom lens according to claim 9, wherein said first lens unit has its first lens surface of concave curvature facing an object side.

12. A zoom lens according to claim 9, wherein said third lens unit includes a negative lens having a concave surface facing an object side, a positive lens having a convex surface facing the object side, a negative lens and a bi-convex lens arranged in this order.

13. A zoom lens comprising, from front to rear, a positive first lens unit, a positive second lens unit, a positive third lens unit and a negative fourth lens unit, air separations between said lens units being varied to effect zooming, wherein said third lens unit includes a negative lens having a concave surface facing an object side, a positive lens having a convex surface facing the object side, a negative lens and a bi-convex lens arranged in this order, and said fourth lens unit includes a positive meniscus lens convex toward an image side followed toward the image side by a negative lens.

14. A zoom lens comprising, from front to rear, a positive first lens unit, a positive second lens unit, a positive third lens unit and a negative fourth lens unit, wherein said first lens unit includes negative and positive lenses, said second lens unit has a stop movable in unison with said second lens unit, and said fourth lens unit includes a positive lens and a negative lens in this order.

15. A zoom lens comprising, from front to rear, a positive first lens unit, a positive second lens unit, a positive third lens unit and a negative fourth lens unit, air separations between said first lens unit and said second lens unit, between said second lens unit and said third lens unit, and between said third lens unit and said fourth lens unit being varied to effect zooming, wherein said second lens unit comprises a positive meniscus lens convex toward an image side, and said fourth lens unit comprises positive and negative lenses, totaling two lenses.

16. A zoom lens comprising, from front to rear, a positive first lens unit, a positive second lens unit, a positive third lens unit and a negative fourth lens unit, air separations between said lens units being varied to effect zooming, wherein said fourth lens unit includes a positive meniscus lens convex toward an image side followed toward the image side by a negative lens and satisfies the following condition:

$$0.5 < ra/rb < 1$$

where ra is the radius of curvature of a rear surface of said positive meniscus lens, and rb is the radius of curvature of a front surface of said negative lens.

17. A zoom lens having a stop and comprising, from front to rear, a first lens unit of positive refractive power, a second lens unit of relatively weak refractive power, a third lens unit of positive refractive power and a fourth lens unit of negative refractive power, wherein during zooming from a wide-angle end to a telephoto ends, a separation between said first lens unit and said second lens unit increases, a separation between said second lens unit and said third lens unit varies and a separation between said third lens unit and said fourth lens unit decreases, wherein at least one lens included in said second lens unit lies on an image side of said stop, and wherein said second lens unit and said third lens unit are moved forward to effect focusing from an infinitely distant object to shorter object distances.

18. A zoom lens according to claim 17, wherein said stop is stationary during focusing.

19. A zoom lens according to claim 17, wherein said second lens unit and said third lens unit are moved in unison to effect focusing.

20. A zoom lens according to claim 17, wherein either said second lens unit or said third lens unit, during zooming, moves in unison with said stop.

21. A zoom lens according to claim 17, wherein during zooming from the wide-angle end to the telephoto end, said first lens unit to said fourth lens unit are all moved forward.

22. A zoom lens according to claim 17, wherein said stop is located on an object side of said second lens unit.

23. A compact zoom lens comprising, from front to rear, a first lens unit of positive refractive power, a second lens unit, a third lens unit of positive refractive power and a fourth lens unit of negative refractive power, said lens units being moved along an optical axis to effect zooming, a stop being arranged on an object side of said third lens unit, and focusing being performed by moving said third lens unit.

24. A compact zoom lens according to claim 23, wherein said stop and said second lens unit are constructed in unified form.

25. A zoom lens according to claim 23 or 24, wherein a separation between said second lens unit and said third lens unit is wider in a telephoto end than in a wide-angle end.

26. A zoom lens according to claim 23, satisfying the following condition:

$$0.08 < D/fW < 0.45$$

where D is the distance from a front vertex of said zoom lens to said stop, and fw is the shortest focal length of the entire system.

27. A zoom lens comprising, from front to rear, a first lens unit of positive refractive power, a second lens unit of positive refractive power, a third lens unit of positive refractive power and a fourth lens unit of negative refractive power, said first, said second, said third and said fourth lens units being moved along an optical axis in the same direction during zooming, and said zoom lens satisfying the following condition:

$$0 < Bd/Fw < 1.3$$

where Bd is the entire length of said first lens unit, and FW is the shortest focal length of the entire system.

28. A zoom lens according to claim 27, wherein said second lens unit includes at least one negative lens and at least one positive lens, and has its first lens surface of concave curvature facing an object side and its last surface of convex curvature facing an image side.

29. A zoom lens according to claim 28, satisfying the following condition:

$$0.5 < |fa|/fb < 1.5$$

where fa is the focal length of the first lens surface of said second lens unit, and fb is the focal length of the last lens surface of said second lens unit.

30. A zoom lens according to claim 27 or 28, wherein said third lens unit includes at least one negative lens and at least one positive lens.

31. A zoom lens according to claim 30, wherein said third lens unit satisfies the following condition:

$$15 < vp - vn$$

wherein vp is the average of the Abbe numbers of positive lenses of said third lens unit, and vn is the average of the Abbe number of negative lenses of said third lens unit.

32. A zoom lens according to claim 27, wherein said fourth lens unit includes a positive meniscus lens having a concave surface facing said third lens unit, and, on an image side of said positive meniscus lens, a negative lens having a concave surface facing said third lens unit.

33. A zoom lens comprising, from front to rear, a first lens unit of positive refractive power, a second lens unit, a third lens unit of refractive power, and a fourth lens unit of negative refractive power, separations between said lens units being varied to effect zooming, wherein said zoom lens satisfies the following condition:

$$1 \leq M_2 < M_1 \leq M_4 < M_3 \leq 6$$

where Mi is the number of lens elements in said i-th lens unit, and wherein, for a cemented lens, its constituent elements are counted as if in broken contact.

34. A zoom lens according to claim 33, wherein said first lens unit includes at least one positive lens having a convex surface facing the object side, said third lens unit includes at least one negative lens and a positive lens having a convex surface facing the image side, and said fourth lens unit includes at least one positive lens having a convex surface facing the image side and a negative lens having a concave surface facing the object side.

35. A zoom lens according to claim 33, wherein said second lens unit has a negative refractive power and the following conditions are satisfied:

$$0 < d_{2W}/(f_W \cdot \tan \omega_W) < 0.55$$

$$0.11 < B_3/f_W < 0.61$$

$$-2.51 < ((R_{2F}+R_{2R})/(R_{2F}-R_{2R})) \cdot (f_W/|f_2|) < 2.51$$

where $d_{2W}$: the separation between said second lens unit and said third lens unit in a wide-angle end;

$f_W$: the shortest focal length of the entire system;

$\omega_W$: the semi-angle of field coverage of the entire system in the wide-angle end;

$B_3$: the axial length of said third lens unit;

$R_{2F}$: the radius of curvature of the front most surface in said second lens unit;

$R_{2R}$: the radius of curvature of the rearmost surface in said second lens unit; and $f_2$: the focal length of said second lens unit.

* * * * *